(12) United States Patent
Chen et al.

(10) Patent No.: US 8,300,685 B2
(45) Date of Patent: Oct. 30, 2012

(54) NON-LINEAR DECISION FEEDBACK EQUALIZER

(75) Inventors: Chung-Jue Chen, Irvine, CA (US); Vasudevan Parthasarthy, Irvine, CA (US); Sudeep Bhoja, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1086 days.

(21) Appl. No.: 11/845,779

(22) Filed: Aug. 27, 2007

(65) Prior Publication Data

US 2008/0069199 A1 Mar. 20, 2008

Related U.S. Application Data

(60) Provisional application No. 60/840,123, filed on Aug. 25, 2006.

(51) Int. Cl.
*H04B 1/38* (2006.01)

(52) U.S. Cl. ........ 375/233; 375/340; 375/316; 375/232; 375/326; 375/344; 375/229; 375/230; 375/231; 375/317; 375/324; 375/345; 714/769; 360/65; 360/46

(58) Field of Classification Search .......... 375/233, 375/340, 316, 232, 326, 344, 229, 230, 231, 375/317, 324, 345; 714/769; 360/65, 46
See application file for complete search history.

(56) References Cited

U.S. PATENT DOCUMENTS

| | | | |
|---|---|---|---|
| 5,353,312 A | 10/1994 | Cupo et al. | |
| 5,604,460 A | 2/1997 | Sehrig et al. | |
| 5,638,409 A | 6/1997 | Awata et al. | |
| 5,684,431 A | 11/1997 | Gilbert et al. | |
| 5,870,042 A | 2/1999 | Noda | |
| 6,055,119 A | 4/2000 | Lee | |
| 6,177,899 B1 | 1/2001 | Hsu | |
| 6,195,386 B1* | 2/2001 | Oh | 375/233 |
| 6,204,784 B1 | 3/2001 | Hatfield | |
| 6,363,112 B1* | 3/2002 | Azadet et al. | 375/233 |
| 6,466,629 B1 | 10/2002 | Isaksson et al. | |
| 6,522,282 B1 | 2/2003 | Elbornsson | |

(Continued)

FOREIGN PATENT DOCUMENTS

EP 1006697 A2 7/2000

(Continued)

OTHER PUBLICATIONS

Sanjay Kasturia and Jack H. Winters, "Techniques for High-Speed Implementation of Nonlinear Cancellation" IEEE Journal on Selected Areas in Communications, vol. 9, No. 5, Jun. 1991.*

(Continued)

*Primary Examiner* — Zewdu Kassa
(74) *Attorney, Agent, or Firm* — Brake Hughes Bellermann LLP

(57) ABSTRACT

Embodiments include a decision feedback equalizer (DFE) that includes a first comparator configured to receive as inputs a soft value and a first threshold, a second comparator configured to receive as inputs the soft value and a second threshold, a selector configured to select an output of either the first comparator or the second comparator as a DFE output based on one or more previous bits output by the selector; an error calculator configured to determine an error for the first comparator and the second comparator, and a threshold adjuster configured to adjust the first threshold and the second threshold, the first threshold and the second threshold each being a non-linear combination of one or more previous outputs of the selector.

12 Claims, 26 Drawing Sheets

U.S. PATENT DOCUMENTS

| | | | |
|---|---|---|---|
| 6,570,410 B2 | 5/2003 | Manganaro | |
| 6,603,415 B1 | 8/2003 | Somayajula | |
| 6,653,959 B1 | 11/2003 | Song | |
| 6,653,966 B1 | 11/2003 | van der Goes et al. | |
| 6,707,868 B1 | 3/2004 | Camagna et al. | |
| 6,965,651 B1 | 11/2005 | Chou | |
| 6,982,664 B1 | 1/2006 | Nairn | |
| 7,010,269 B2 | 3/2006 | Meehan et al. | |
| 7,027,503 B2 | 4/2006 | Smee et al. | |
| 7,050,419 B2 | 5/2006 | Azenkot et al. | |
| 7,053,804 B1 | 5/2006 | Nairn | |
| 7,133,657 B2 | 11/2006 | Kuenen et al. | |
| 7,148,828 B2 | 12/2006 | Fernandez et al. | |
| 7,215,274 B2 | 5/2007 | Liu | |
| 7,233,270 B2 | 6/2007 | Lin | |
| 7,260,377 B2 | 8/2007 | Burns et al. | |
| 7,292,101 B2 | 11/2007 | Kocaman et al. | |
| 7,313,198 B2 | 12/2007 | Rahman et al. | |
| 7,324,038 B2 | 1/2008 | van der Goes et al. | |
| 7,355,476 B2 | 4/2008 | Kasha et al. | |
| 7,471,339 B2 | 12/2008 | Smith et al. | |
| 7,525,462 B2 | 4/2009 | Parthasarthy et al. | |
| 7,525,470 B2 | 4/2009 | Parthasarthy et al. | |
| 7,560,986 B2 | 7/2009 | Kocaman | |
| 7,755,426 B2 | 7/2010 | Kocaman et al. | |
| 7,830,987 B2 | 11/2010 | Bhoja et al. | |
| 2001/0016926 A1 | 8/2001 | Riggle | |
| 2001/0043658 A1* | 11/2001 | Voorman et al. | 375/340 |
| 2002/0122503 A1* | 9/2002 | Agazzi | 375/316 |
| 2003/0142697 A1 | 7/2003 | Parhi | |
| 2003/0174783 A1 | 9/2003 | Rahman et al. | |
| 2005/0019042 A1 | 1/2005 | Kaneda et al. | |
| 2005/0040891 A1 | 2/2005 | Sobel | |
| 2005/0084028 A1* | 4/2005 | Yu et al. | 375/267 |
| 2005/0130617 A1 | 6/2005 | Burns et al. | |
| 2005/0270212 A1 | 12/2005 | Smith et al. | |
| 2006/0067699 A1 | 3/2006 | Chandrasekhar et al. | |
| 2007/0024484 A1 | 2/2007 | Liu | |
| 2007/0133719 A1 | 6/2007 | Agazzi et al. | |
| 2008/0049825 A1 | 2/2008 | Chen et al. | |
| 2008/0049847 A1 | 2/2008 | Telang et al. | |
| 2008/0069198 A1 | 3/2008 | Bhoja et al. | |
| 2008/0187082 A1 | 8/2008 | Bhoja et al. | |
| 2008/0240325 A1 | 10/2008 | Agazzi et al. | |
| 2008/0258814 A1 | 10/2008 | Kocaman et al. | |
| 2008/0272952 A1 | 11/2008 | Wood | |
| 2009/0310665 A1 | 12/2009 | Agazzi et al. | |

FOREIGN PATENT DOCUMENTS

| | | |
|---|---|---|
| KR | 10-2006-0001004 | 1/2006 |
| WO | 02/13424 A2 | 2/2002 |
| WO | 02/071616 | 9/2002 |
| WO | 02/071616 A2 | 9/2002 |

OTHER PUBLICATIONS

Mueller, K. H. et al., "Timing Recovery in Digital Synchronous Data Receivers", IEEE Transactions on Communications, vol. Com-24, No. 5, May 1976, pp. 516-531.

Office Action received for U.S. Appl. No. 11/731,481, mailed on Aug. 20, 2008, 6 pages.

Notice of Allowance received for U.S. Appl. No. 11/845,765, mailed on Oct. 10, 2008, 10 pages.

European Search Report for U.S. Appl. No. 11/837,278, mailed on Dec. 6, 2007, 3 pages.

Notice of Allowance received for U.S. Appl. No. 11/845,762, mailed on Dec. 3, 2008, 14 pages.

Notice of Allowance received for U.S. Appl. No. 11/845,765, mailed on Dec. 18, 2008, 12 pages.

European Search Report for U.S. Appl. No. 11/837,301, mailed on Dec. 6, 2007, 3 pages.

Office Action received for U.S. Appl. No. 12/135,720, mailed on Mar. 19, 2009, 8 pages.

Notice of Allowance received for U.S. Appl. No. 11/845,762, mailed on Aug. 11, 2008, 10 pages.

Adaptive Electronic Dispersion Compensator for Chromatic and Polarization-Mode Dispersions in Optical Communications Systems, Bell Labs, Lucent Technologies, USA, Apr. 1, 2004; EURASIP Journal on Applied Signal Processing 2005:10, 1584-1592; 2005 Hindlaw Publishing Corporation.

Advanced Topics in Circuit Design: High-Speed Electrical Interfaces, EE209C-Spring 2004; Lecture 16: Components, Decision Feedback Equalizers, pp. 1-19, Mar. 11, 2004.

Office Action received for U.S. Appl. No. 11/837,278, mailed on Nov. 10, 2010, 12 pages.

Notice of Allowance received for U.S. Appl. No. 11/837,301, mailed on Jul. 28, 2010, 11 pages.

Notice of Allowance received for U.S. Appl. No. 11/731,481, mailed on Feb. 10, 2009, 9 pages.

Notice of Allowance received for U.S. Appl. No. 12/135,720, mailed on Feb. 23, 2010, 10 pages.

Notice of Allowance received for U.S. Appl. No. 12/135,720, mailed on Oct. 19, 2009, 12 pages.

Notice of Allowance received for U.S. Appl. No. 11/845,762, mailed on Mar. 24, 2009, 5 pages.

Stojanovic, Vladimir et al., "Adaptive Equalizer and Data Recovery in a Dual-Mode (PAM2/4) Serial Link Transceiver", Rambus, Inc., Los Altos CA 94022, USA; Department of Electrical Engineering, Stanford University, CA 94305, USA, (2004), 1-4 pages.

U.S. Appl. No. 11/837,278, Non-Final Office Action mailed Mar. 29, 2010, 25 pages.

U.S. Appl. No. 11/837,301, Notice of Allowance mailed Apr. 14, 2010, 32 pages.

U.S. Appl. No. 11/845,777, Non-Final Office Action mailed Jun. 21, 2010, 25 pages.

U.S. Appl. No. 11/845,781 Non-Final Office Action mailed Jul. 13, 2010, 30 pages.

Bergmans, J W., et al., "Dual Decision Feedback Equalizer", vol. 45, IEEE, (1997), pp. 514-518.

Response to Non-Final Office Action filed for U.S. Appl. No. 11/837,278, filed on Aug. 27, 2010, 16 pages.

Response to Non-Final Office Action filed for U.S. Appl. No. 11/845,777, filed on Nov. 22, 2010, 10 pages.

Final Office Action Received for U.S. Appl. No. 11/845,781, mailed on Feb. 8, 2011, 20 pages.

Amendment after Notice of Allowance received for U.S. Appl. No. 12/135,720, filed on May 19, 2010, 2 pages.

Notice of Allowance received for U.S. Appl. No. 11/837,278, mailed on Feb. 17, 2011, 5 pages.

Office Action Response filed for U.S. Appl. No. 11/837,278, filed on Feb. 10, 2011, 11 pages.

Final Office Action received for U.S. Appl. No. 11/845,777, mailed on Mar. 1, 2011, 21 pages.

Non Final Office Action Response filed for U.S. Appl. No. 11/845,781, filed on Nov. 15, 2010, 8 pages.

* cited by examiner

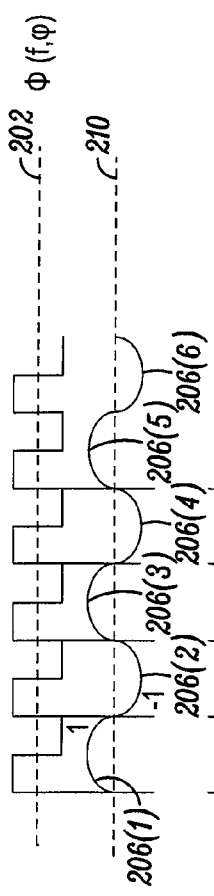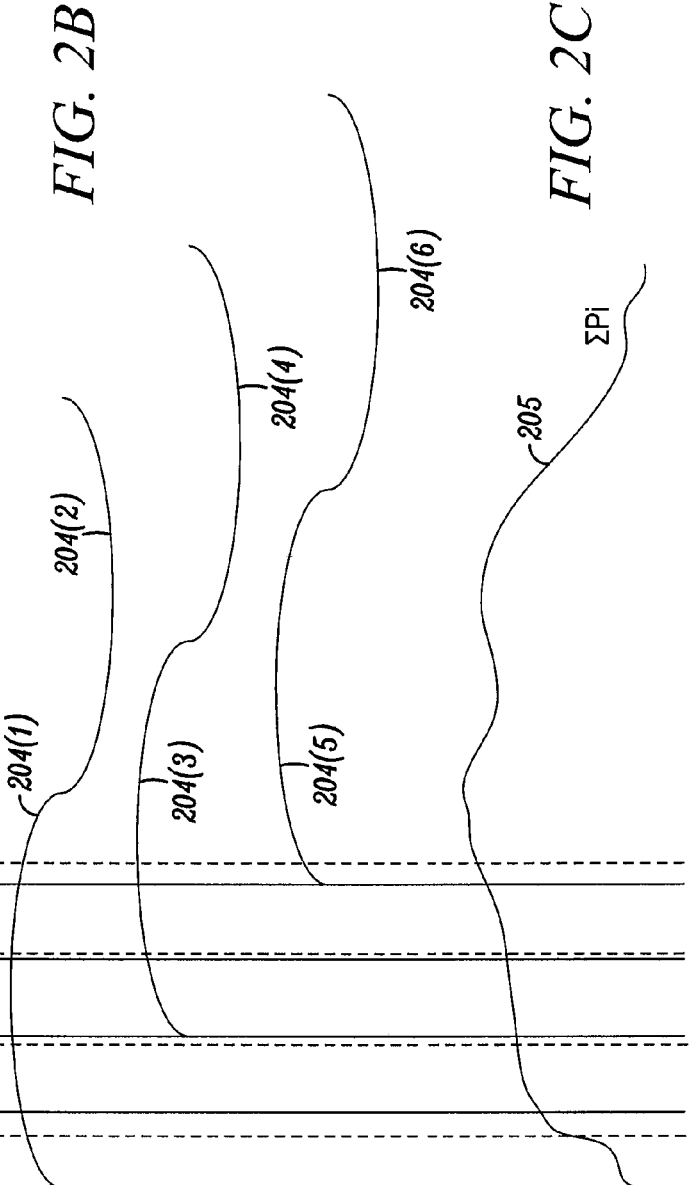

NON-LINEAR DECISION FEEDBACK EQUALIZER

CROSS-REFERENCE TO RELATED APPLICATION

This application claims priority under 35 U.S.C. §119(e) to Provisional Patent Application 60/840,123, filed Aug. 25, 2006, and titled "DIGITAL ELECTRONIC DISPERSION COMPENSATION FOR MULTI-MODE FIBER," which is incorporated herein by reference in its entirety.

TECHNICAL FIELD

This description relates to digital integrated circuits and signal processing. In particular, this description relates to performing electronic dispersion compensation, and also relating to an equalizer with reorder.

BACKGROUND

A telecommunication system may include a transmitter for encoding information to be transmitted as an electromagnetic wave, a transmission medium which provides a conduit for the transmission of the electromagnetic wave and a receiver for receiving and processing the information bearing electromagnetic wave. A telecommunication system may utilize a waveguide as a transmission medium. A waveguide is a structure that guides or constrains the propagation of electromagnetic radiation. A waveguide may comprise a system of material boundaries in the form of a solid dielectric. In telecommunications, optical fibers are often utilized as waveguides.

It is desirable to increase the bandwidth or transmission rate of a telecommunication system for several reasons. First, greater bandwidth is required to support modern telecommunication applications such as that employed in data centers, or for live video and audio, multimedia and other bandwidth intensive applications. In addition, for efficiency and cost reasons it is desirable to increase the bandwidth of telecommunication systems. Therefore, it is important to address the physical limitations of waveguides for transmitting high bandwidth electromagnetic signals.

Dispersion is a significant physical phenomenon limiting the ability to successfully transmit and recover an information bearing electromagnetic wave over a communication channel. The phase velocity of any spectral component within a transmission medium will depend upon the index of refraction for the physical medium. Typically, the index of refraction of a transmission medium will be frequency dependent. Waveguide dispersion occurs when the speed of a wave in a waveguide such as optical fiber depends upon its frequency. The transverse modes for waves confined with a waveguide generally have different speeds depending upon the frequency. A similar phenomenon is modal dispersion caused by a waveguide having multiple modes at a given frequency, each of which propagates at a different speed.

Waveguide dispersion leads to signal degradation in telecommunication systems because the varying delay in arrival time between different components of a signal effectively degrades the pulse characteristic of pulses transmitted through the waveguide. This phenomenon is often referred to as intersymbol interference ("ISI"). Adjacent symbols represented as pulses effectively "run into" one another, and energy may exist at a particular sample instant of one symbol that actually includes energy associated with an adjacent symbol Thus, it is necessary to correct for error sources such as dispersion and associated ISI that may be introduced in a received signal transmitted over a communication channel. Typically, a receiver will be equipped with a signal processing system to correct for dispersion effects introduced by the communication channel. These signal processing systems often analyze statistical properties of the communication channel in order to cancel the ISI. The signal processing system typically utilizes one or more equalizers to perform these corrections. One type of equalizer often used is a feed forward equalizer ("FFE"), which attempts to correct for pre-cursor ISI (in which a current symbol is affected by a following symbol). Often an FFE may be combined with a decision feedback equalizer ("DFE"), which attempts to correct for post-cursor ISI (in which a current symbol is affected by a preceding symbol).

There are a number of technical challenges that may arise in building signal processing systems to correct for dispersion and ISI, which become particularly acute in communication systems employing a high baud rate or symbol rate. First, it is desirable to perform signal processing operations in the digital domain as it is often easier to achieve a higher SNR than an equivalent analog system. Second, digital systems offer the advantage of significantly lower complexity in signal layout and design and the opportunity to easily modify the signal processing routines employed.

A digital signal processing system necessitates a conversion of a received analog signal into a digital format. In general, it may be difficult and expensive to build a serial ADC to operate at baud rates in excess of 1.5-2 GHz. This is problematic because it is often desirable to build communication systems that operate around the order of at least 10 GHz. Similar issues exist for designing and building equalizers that may operate at high data rates.

A second technical issue relates to the time varying nature of communication channels, which impacts the performance of timing recovery operations at a receiver. A transmitter will typically include a clock, which is used to encode a data signal onto a carrier signal for transmission over the channel. The transmitter clock will determine the rate at which symbols are provided over the communication channel.

The receiver will typically also require a clock, which ideally should be phase locked to the transmitter clock in order to accurately recover the symbols transmitted by the transmitter over the communication channel. However, the transmitter and receiver clocks typically will experience a drift with respect to one another resulting in a frequency offset between the two. The phase being the integral of the frequency, will therefore suffer an offset between the transmitter and receiver clocks. Thus, receivers in communication systems typically include a timing recovery circuit to attempt to synchronize the transmitter clock with the receiver clock.

Digital communication systems may employ a method referred to as baud rate or symbol rate sampling, in which the received signal is sampled at the baud rate. Because the entire analog signal need not be recovered in a communication system, it is not necessary to sample at the Nyquist rate. However, baud rate sampling imposes significant constraints on the accuracy of the timing recovery operations performed at the receiver in order that the receiver samples a valid and stable signal.

As noted above, communication systems require a physical medium for the transmission of communication signals. The nature of the physical medium underlying the communication system may often be time varying. Typically this time dependence will be on a time scale relatively long compared with the baud rate. In the case where the communication channel may be approximated by its first order behavior, higher order effects are small, the channel characteristic is time invariant and initial conditions are known, the effect of the channel on a transmitted signal may be characterized by a impulse response or Green's function, which describes the response of the channel to an impulse signal. In conventional timing recovery systems utilizing conventional algorithms, the time varying nature of the channel characteristic may not be accounted for, reducing the ability of the signal processing system to perform accurate baud rate sampling and thereby effectively cancel the undesirable ISI effects.

SUMMARY

The details of one or more implementations are set forth in the accompanying drawings and the description below. Other features will be apparent from the description and drawings, and from the claims.

BRIEF DESCRIPTION OF THE DRAWINGS

FIGS. 2a-2c are timing diagrams illustrating effects of dispersion on an electromagnetic signal transmitted over a communication channel.

DETAILED DESCRIPTION

Figure 1:
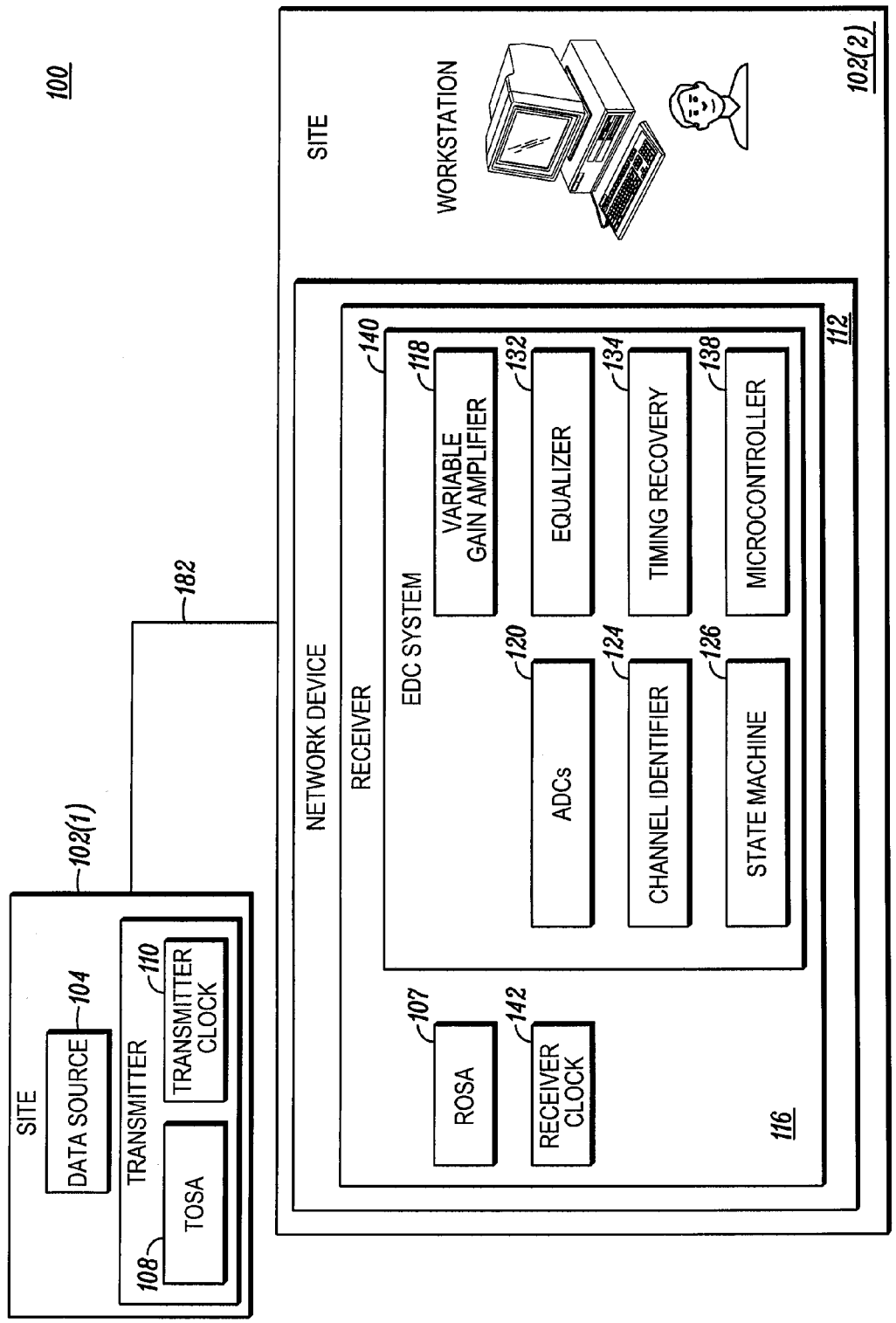
FIG. 1 is a block diagram of a telecommunication system.

FIG. 1 is a block diagram of a telecommunication system 100. The communication system 100 may include any number of sites 102 among which information may be exchanged over any number of communication channels 182. FIG. 1 illustrates two sites 102(1), 102(2), one of which includes a transmitter 108 and functions as a transmission site and the other includes a receiver 116 and functions as a receiver site. This is merely exemplary and it will be understood that a communication system may include any number of sites 102, each of which may provide solely transmission capabilities, solely receiver capabilities or a combination of both transmission and receiver capabilities.

The sites 102(1), 102(2) within the telecommunication system 100, may be, for example, data centers. Or, each site 102 may be a particular structure within a data center such as a data archival system or mass storage device (e.g., a disk storage array), a server or other front-end system. In a data center application, the access and transmission of large quantities of data at high data rates may be particularly important.

Each transmission site 102(1) may include a data source 104, which may be any system for archiving or generating data that is to be transmitted to a receiver site 102(2). Information to be transmitted between the transmission site 102(1) and the receiver site 102(2) may include any type of data such as multimedia information including audio and visual information, text information and may be stored in any appropriate format. The data source 104 may archive data for transmission from the transmission site 102(1) to the receiver site 102(2). Or, the data source 104 may provide real-time or near real-time data for transmission. For example, the data source 104 may be a multimedia device such as a video camera or microphone, which respectively generates video and audio signals. Or, the data source 104 may be an archived multimedia file such as an MPEG file. The data source 104 may include any combination analog and digital information. The data source 104 may include data stored in any type of format including raw data or compressed data.

The transmission site 102(1) may transmit information from the data source 104 to the receiver site 102(2) via the communication channel 182 using electromagnetic signals. The electromagnetic signals transmitted over the communication channel 182 may utilize optical wavelengths or other wavelengths necessary to achieve a desired symbol rate. Thus, the communication channel 182 may be, for example, a fiber optic cable or other physical medium suitable for the transmission of optical wavelength electromagnetic signals. According to one embodiment, the transmission channel 182 may be multi-mode fiber optic cable over which a bit rate of 10 gigabits-per-second ("gbps") is achieved between transmission site 102(1) and the receiver site 102(2). In a more specific example embodiment, the bit rate may be 10.3125 gbps.

The transmission site 102 may also include a transmitter 108. The transmitter 108 may further include a TOSA 106 ("Transmitter Optical Sub Assembly"), which provides an interface to the optical physical layer (e.g., an optical communication channel). The TOSA 106 may include a laser. In particular, the TOSA 106 may modulate an electromagnetic carrier signal generated by a laser (not shown) using the information provided by the data source 104 and provide this modulated signal to the communication channel 182. As the transmission site 102(1) and receiver site 102(2) may exchange digital information, the TOSA 106 may perform digital modulation of an optical carrier signal. Thus, the TOSA 106 may provide a plurality of electromagnetic signals for transmission over the communication channel 182, which correspond to data provided by the data source 104.

In the case of digital communications between the transmission site 102(1) and the receiver site 102(2), the data source 104 may provide a plurality of numbers representing information to be transmitted between the transmission site 102(1) and the receiver site 116. These numbers may be represented in binary or base 2 as a stream of bits (0 or 1). For each bit to be transmitted, the transmitter 108 may generate a first pulse electromagnetic signal to represent a digital 1 and a second pulse electromagnetic signal to represent a digital 0.

The transmitter 108 may also be equipped with a transmit clock 110, which controls a symbol rate by which the transmitter 108 transmits information over the communication channel 182. According to one embodiment, the transmit clock 110 may operate at 10 Gbps.

The receiver site 102(2) may include a network device 112 coupled to the communication channel 182, which provides a system for receiving and processing a signal transmitted by the transmission site 102(1) over the communication channel 182. In particular, the network device 112 may include a receiver 116, which includes various functional blocks for receiving and processing signals transmitted by the transmission site 102(1) over the communication channel 182.

The receiver 116 may include a ROSA ("Receiver Optical Sub Assembly"). The ROSA may include a photoelectric diode (not shown) which converts a light signal into an electronic signal. In particular, the photoelectric diode may convert a light signal into a current. A transimpedance amplifier in the ROSA (not shown) may further convert the current into a voltage, which can be further processed. The receiver 116 may include a receiver clock 142 that is designed to operate at the same frequency as the transmitter clock 110. Typically, however, the receiver clock 142 will not be perfectly synchronized with the transmitter clock 110 (i.e., there will be a drift or phase offset), which must be corrected for by the receiver. In order to correct for drift between the transmitter clock 110 and receiver clock 142, the receiver 116 may include a timing recovery block 134.

The receiver 116 may further include a variable gain amplifier ("VGA"), analog to digital converters ("ADCs") 120, an equalizer block 132, a channel identifier block 124, a timing recovery block 134, a state machine 126 and a microcontroller 138. The overall operations of the receiver 116 may be controlled by a microcontroller 138, which may coordinate the interactions between various functional blocks on the receiver 116. The state machine 126 may control startup and convergence activities of the receiver. Further example aspects of the EDC system 140, including example operations of the components just mentioned, are provided in more detail, herein.

FIGS. 2*a*-2*c* illustrate the effects of dispersion on an electromagnetic signal transmitted over a communication channel on a physical medium such as, for example, a multi-mode fiber optic cable. FIG. 2*a* illustrates an idealized pulse train comprising a plurality of pulses 206(1)-206(6). Each pulse may be sequenced to a transmitter clock signal 202 characterized by a frequency and phase ($\phi(f, \phi)$). As shown in FIG. 2*a*, each pulse may correspond to a +1 or a −1 depending upon whether the pulse is positive or negative. Thus, pulses 206(1), 206(3) and 206(5) correspond to a +1, while pulse 206(2), 206(4) and 206(6) correspond to a −1. The +1/−1 pulses may respectively be translated to a 0 or 1 bit at a receiver.

In the ideal scenario shown in FIG. 2*a*, a receiver clock (not shown in FIGS. 2*a*-2*c*) that tracked the transmitter clock signal 202 perfectly in frequency and phase could be implemented at a receiver. In addition, under this ideal scenario, the pulse train 210 generated at a receiver could be transmitted without any signal distortion or degradation to a receiver. The receiver may utilize the receiver clock signal 208 to clock the sampling of a received signal from a transmitter. In particular, the receiver may perform baud rate sampling of the received signal in order to recover the bits encoded at the transmitter.

These ideal conditions, however, are not attainable in practice. FIG. 2*b* illustrates certain non-idealities that may occur in transmission of electromagnetic signals between a transmitter and a receiver. In particular, FIG. 2*b* shows a receiver clock signal 208 characterized by a frequency and phase $\phi'$ ($f', \phi'$). The receiver clock signal 208 may have a phase offset, and a frequency offset with respect to the transmitter clock signal 210. This frequency and associated phase offset may occur due to drift between the two clocks.

A second condition limiting the operation of a digital communication system relates to non-idealities of the transmission medium itself including dispersion effects and associated intersymbol interference. FIG. 2*b* also shows pulse characteristics for a plurality of pulses that have been transmitted from a receiver through a communication channel such as a fiber optic cable. In particular, received pulses 204(1)-204(6) may correspond respectively to transmitted pulses 206(1)-206(6). Each of the transmitted pulses 206(1)-206(6) undergo dispersion due to the characteristics of the communication channel. In particular, the index of refraction of the communication channel may be frequency dependent, resulting in the propagation of various frequency components of each pulse at different velocities. In the case where the communication channel 182 is a multi-mode fiber, dispersion of transmitted pulses may occur. As shown in FIG. 2*b*, the received pulses 204(1)-204(6) may be spread or smeared in time.

FIG. 2*c* shows a composite signal of the linear superposition of the pulses 204(1)-204(6). This composite signal may represent the actual communication signal received by the receiver. The characteristic of the transmitted pulse train 210 communication signal received by a receiver. The identity of each individual pulse signal (e.g., 206(1)-206(6)) may be distorted due to this linear superposition. This phenomenon is commonly referred to as intersymbol interference ("ISI"). In order to recover the transmitted signal and/or perform effective baud rate sampling, the ISI introduced by a communication channel must be significantly minimized.

Figure 3A:
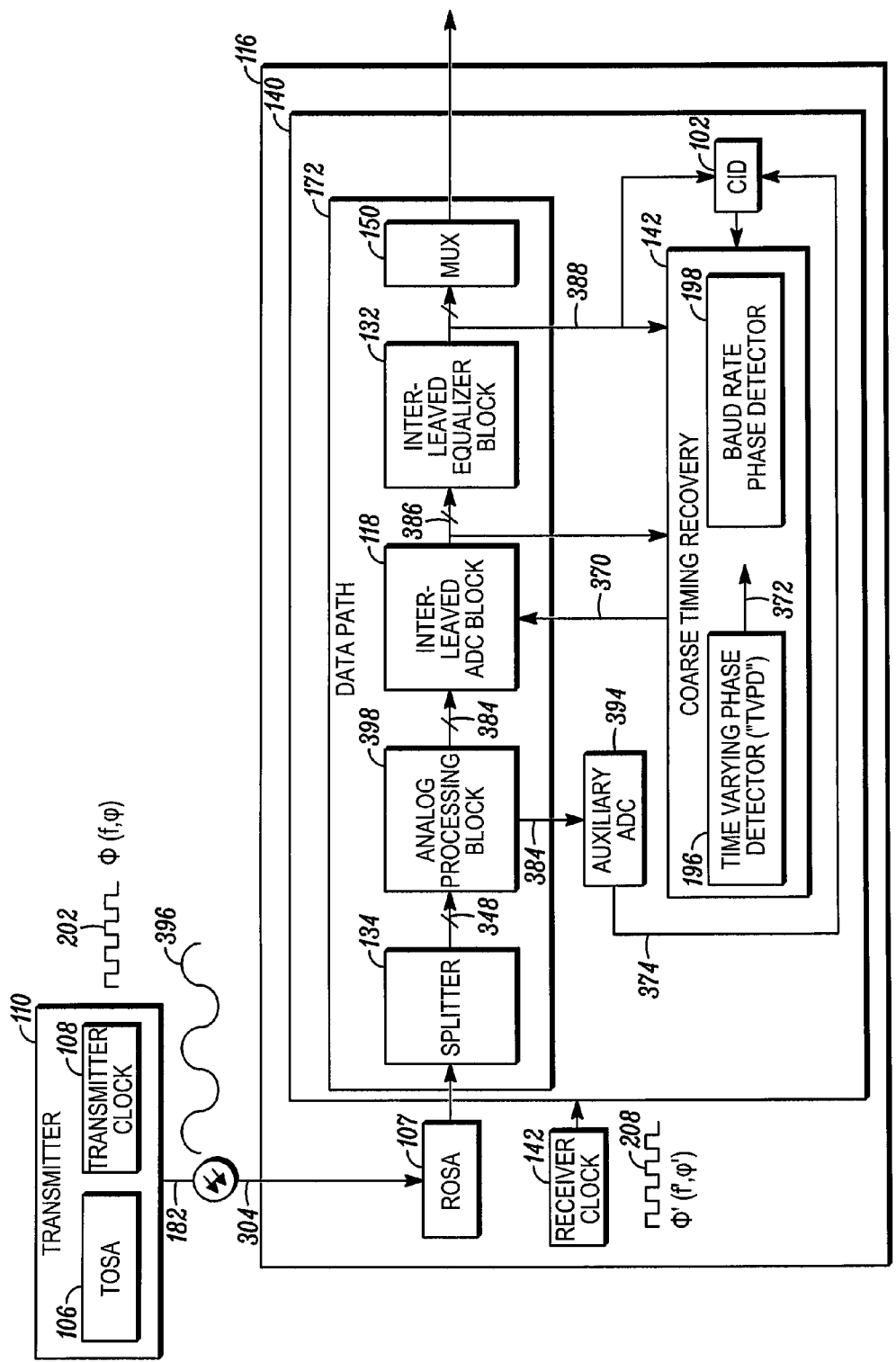
FIG. 3a is a block diagram of a signal processing system for correcting signal distortion in a signal received at a receiver in a communication system.

FIG. 3*a* is a block diagram of a signal processing system for correcting signal distortion such as waveguide dispersion and associated ISI in a signal received at a receiver in a communication system. A pulse signal 206 is generated at a transmitter 108 encoding data at a baud rate as a function of a transmitter clock 110, which generates a transmitter clock signal 202. The pulse signal is provided to a communication channel via a TOSA 106 at the transmitter 108. The communication channel may be implemented using a multi-mode fiber optic cable.

A transmitter 108 may generate an information bearing signal 396 comprising a plurality of pluses synchronized to a transmitter clock 110, which generates a transmitter clock signal 202. The transmitter clock signal 202 may define a baud rate or symbol rate defining a number of distinct signal changes provided to the communication channel 182 per second. The transmitter clock may encode data at any baud rate. For example, according to one embodiment the baud rate is 10 Gbps.

A TOSA 106 at the transmitter 108 may cause the transmission of the information bearing signal 396 over a communication channel 182, which may be a multi-mode fiber optic communication channel. The information bearing signal 396 may undergo various transformations and/or distortions due to a channel characteristic of the communication channel 182. These distortions and transformations may cause the received signal 304 received at a ROSA 107 to be been significantly altered from the information bearing signal 396 generated at the transmitter 108. These distortions may include among other things ISI and dispersion. The channel characteristic may be characterized by an impulse response of the communication channel 182. These distortions may result in significant difficulties in recovering the information originally encoded in the information bearing signal 396.

The received signal 304 may be provided to a signal processing system 140 in order to compensate for the signal distortions introduced by the communication channel 182. In particular, the signal processing system 140 may perform signal conditioning on the received signal 304 to correct for distortions introduced by the communication channel 182. In general, the signal processing system 140 may perform processing on the received signal 304 in both the analog and digital domains. In order to perform digital processing, the signal processing system 140 may perform analog to digital conversion of a signal derived from the received signal 304 (described below).

Because the information bearing signal 396 may encode data at a high baud rate, the signal processing system 140 may include one or more interleaved structures that may individually operate at a clock rate lower than the baud rate. This may be useful to perform processing in the digital domain. Thus, as shown in FIG. 3a, the signal processing system 140 may include an interleaved ADC block 118 and an interleaved equalizer block 132. As described in more detail below, the interleaved ADC block 118 may include a plurality of ADCs, each operating at a lower clock rate than the baud rate. Similarly, the interleaved equalizer block 132 may include a plurality of equalizer structures each operating at a lower clock rate than the baud rate. The interleaved ADC block 118 and interleaved equalizer block 132 may operate at the same clock rate or different clock rates, with respect to one another.

The interleaved ADC block 118 may utilize baud rate sampling so that the combined operation of the plurality of ADCs comprising the interleaved ADC block 118 may effectively sample the received signal 396 at the baud rate. The receiver may include a receiver clock 142, which generates a receiver clock signal 208. Ideally the receiver clock 142 would be precisely locked with the transmitter clock 110 in frequency to allow for precision sampling of the received signal 396 at the baud rate. However, in practice the receiver clock 142 will typically drift in frequency with respect to the transmitter clock 110, resulting in a phase offset between the transmitter clock 110 and receiver clock 142. In order to compensate for this frequency drift, the signal processing system 140 may include a baud rate phase detector 198. The baud rate phase detector 198 may operate to recover timing information relating to the received signal 396. The timing information may be utilized to enforce the condition that each sampling instant at which the interleaved ADC samples the received signal 396 corresponds to a valid and stable symbol condition as it was encoded at the transmitter 108. The timing recovery operation performed by the baud rate phase detector 198 facilitates the use of baud rate sampling by the interleaved ADC block 118 and helps to ensure the samples obtained at the baud rate correspond to valid symbols. According to one embodiment, the baud rate phase detector 198 may utilize an algorithm derived from the Mueller-Muller algorithm. The receiver clock signal 208 may be utilized by the interleaved ADC block 118 to trigger a sampling operation.

As just noted, the baud rate phase detector 198 may perform a variant of the Mueller-Muller algorithm in order to perform timing recovery operations. In order to carry out this algorithm, the baud rate phase detector may assume that the communication channel 182 has a particular channel characteristic, which may be expressed as an impulse response for the communication channel 182. However, due to fluctuating physical conditions, the channel characteristic of the communication channel 182 may, in fact, vary in time. Typically, the time variation of the channel characteristic may vary at a rate significantly slower than the baud rate. For example, in the case of a multi-mode fiber, the time variation of the channel characteristic may occur as a result of a physical movement or vibration of the fiber, which may occur relatively infrequently with respect to the baud rate.

In order to account for the time varying nature of the channel characteristic, the signal processing system 140 may include a time varying phase detector ("TVPD") 196. The TVPD 196 may periodically determine a channel characteristic of the time varying communication channel 182. The channel characteristic may be an estimated impulse response of the communication channel 182. As described below, the TVPD 196, or related circuitry within the CID block 102, may compute the estimated impulse response of the communication channel 182 for each of a plurality of sampling phases. These plurality of sampling phases may then be used to provide estimates of the impulse response that are over sampled compared to the baud rate. The TVPD 196, or related circuitry within the CID block 102, may periodically compute an optimum phase among the plurality of phases using a metric. The TVPD 196, or related circuitry within the CID block 102, may then compute timing information data 372 which it may provide to a phase locked loop (PLL), (not shown in FIG. 3a) used to control a sampling operation of the interleaved ADC block 118.

Referring to FIG. 3a, the received signal 304 after being received by a ROSA 107 on the receiver 116 may be provided to a data path 172 comprising a splitter 134, an analog processing block, an interleaved ADC block 118, an interleaved equalizer block 133 and a multiplexer ("MUX") 150. The splitter 134 may split the received signal 304 into a parallel analog signal 348 comprising a plurality of analog signals. The parallel analog signal 348 may then be provide to an analog processing block 398. The analog processing block 398 may perform any signal conditioning on the parallel analog signal 348 generating a processed analog signal 384. The nature of the signal conditioning performed by the analog processing block 398 will be described in more detail below. In general, however, signal conditioning may include gain adjustment or analog filtering. The analog processing block 398 may then generate a processed analog signal 384, which may be provided to an interleaved ADC block 118. The interleaved ADC block 118 may effectively perform analog to digital conversion of the processed analog signal 384 at the baud rate. As described in more detail below, the interleaved ADC block 118 may comprise a plurality of ADCs, each operating at a lower clock rate than the baud rate such that the combined operation of the plurality of ADCs is to sample the processed analog signal 384 at the baud rate.

The interleaved ADC block 118 may output a digital signal 386, which may then be provided to an interleaved equalizer block 132. As described in more detail below the digital signal 386 provided by the interleaved ADC block 118 to the interleaved equalizer block 118 may comprise a plurality of digital signals each corresponding to a separate ADC on the interleaved ADC block 118. The interleaved equalizer block 132 may perform digital equalization on the digital signal 386. As described below, the equalization performed by the interleaved equalizer block 132 may correct for dispersion and ISI introduced by the communication channel 182. The interleaved equalizer block 132 may comprise any combination of a feed forward equalizer ("FFE"), decision feedback equalizer ("DFE") and sequence DFE as described below.

The interleaved equalizer block 132 may generate a decision signal 388, which may be provided to a multiplexer ("MUX") 150. The MUX 150 may generate a multiplexed output, as shown.

The decision signal 388 may also be provided to the TVPD 196. The processed analog signal 384 may be provided to an auxiliary ADC 394 which may sample the processed analog signal 384 and generate a digital signal 374 for processing by the TVPD 196 in conjunction with the decision signal 388. The auxiliary ADC 394 may operate at a sampling rate significantly lower than the baud rate. According to one embodiment, the auxiliary ADC may operate at 10 MHz.

As described below, the CID block 102 may compute the estimated impulse response of the communication channel 182 for each of a plurality of sampling phases, and may periodically compute an optimum phase among the plurality of phases using a metric. The TVPD 196 may thus determine a regenerated or reference waveform using the calculated optimum phase information, so that the timing recovery may be performed (e.g., by a PLL 804, as shown in FIG. 7b) based on an error calculation performed between this regenerated or reference waveform and the actual output 386 of the interleaved ADC block 118.

Figure 3B:
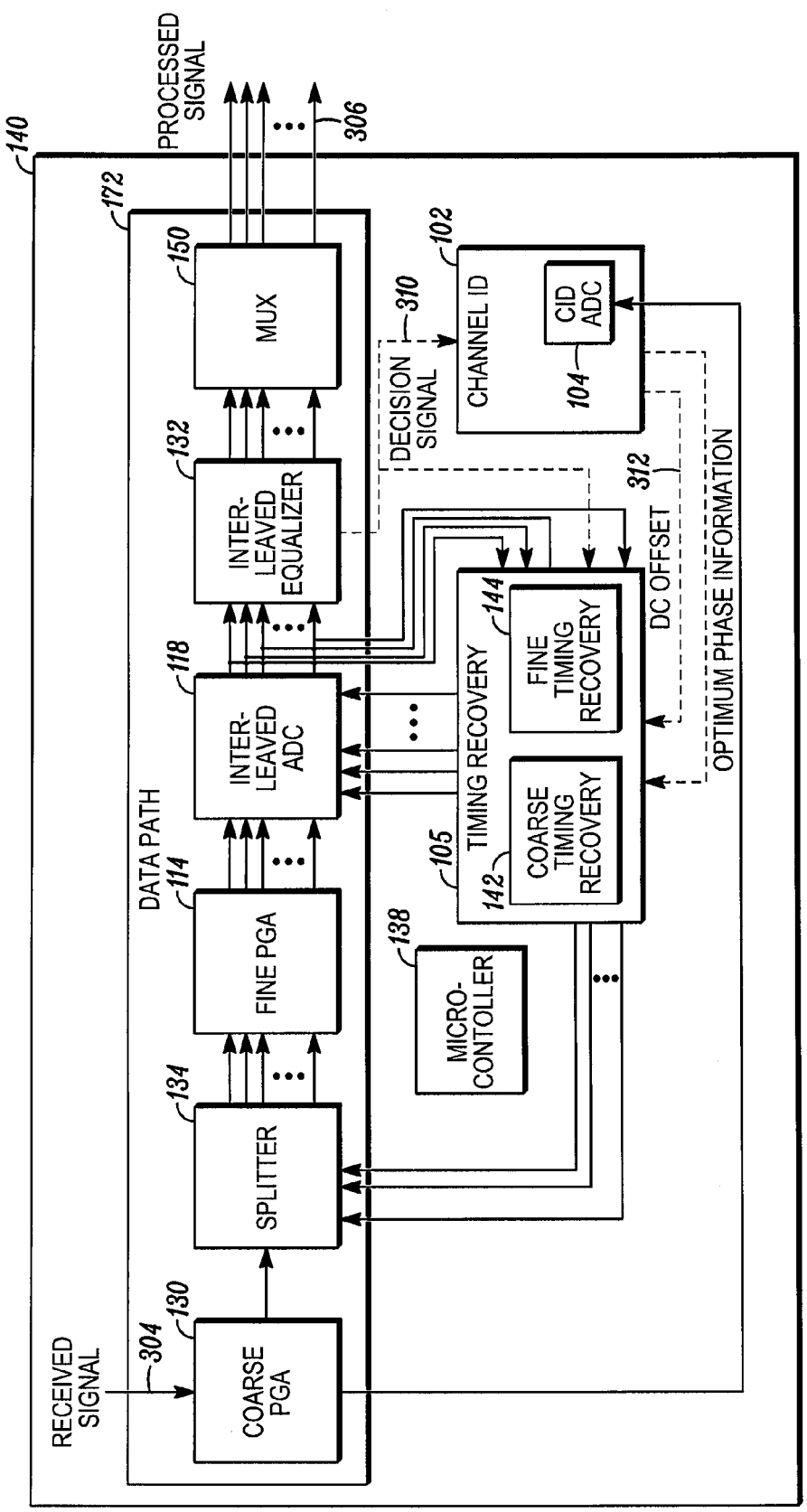
FIG. 3b depicts a detailed view of a signal processing system.

FIG. 3b depicts a more detailed view of the signal processing system 140. As shown in FIG. 1, the signal processing system 140 may include the microcontroller 138, which may orchestrate the operation and interoperation of the various components comprising the signal processing system 140. For example, the microcontroller 138 may trigger various functional blocks on the signal processing system 140 at various points in time.

In order to handle high data rates, the signal processing system 140 may utilize one or more interleaved components. An interleaved architecture may allow a particular component to operate at a clock rate lower than symbol rate. For example, to the extent that the signal processing system may perform a portion of the signal processing in the digital domain, the signal processing system 140 may include an interleaved analog to digital converter ("ADC") block 118. According to one embodiment, the signal processing system 140 may utilize baud rate sampling in which the received signal 304 is sampled at the symbol rate. Thus, for example, if the symbol rate is 10 Gbps, the signal processing system 140 may utilize an interleaved ADC block 118 employing a parallel array of ADCs (not shown in FIG. 3) each operating at a sampling rate of 1.25 Gbps to achieve the desired baud rate sampling of 10 Gbps. The bandwidth of each of the parallel array of ADCs may be set, for example, to approximately 5 GHz.

In addition, the signal processing system 140 may include an interleaved equalizer block 132 to correct for various signal distortions including dispersion and ISI. The interleaved equalizer block 132 and interleaved ADC block 118 may both utilize the same or a different number of parallel substructures. For example, according to one embodiment, the interleaved ADC 118 includes eight parallel ADCs each operating at a sampling rate of approximately 1.25 GHz. The interleave equalizer block 132 may include a parallel array of 16 equalizer slices each operating at a clock rate of approximately 625 MHz. In general, the interleaved ADC block 118 and interleaved equalizer block 132 may each respectively utilize any number of parallel substructures and may individually operate at any suitable clock rate. Further, the above values are merely for the sake of example, and may be adjusted as needed, e.g., if an actual data rate varies from the 10 Gbps example (e.g., is 10.3125 Gbps or some other desired value).

The signal processing system 140 may also include a timing recovery block 105 to perform symbol synchronization or timing recovery. A receiver clock or clocks (not shown in FIG. 3) may be continuously adjusted in its frequency and phase to optimize the sampling instants of the received signal 304 and to compensate for frequency drifts between oscillators used in the transmitter clock and receiver clock circuits (not shown in FIG. 3). The timing recovery block 105 may provide timing information to the interleaved ADC block 118 in order to ensure that the interleaved ADC block 118 performs its sampling operations precisely. In particular, for example, if the signal processing system 140 performs baud rate sampling, the timing recovery block 105 causes the interleaved ADC block 118 to perform sampling at the symbol rate.

More specifically, the timing recovery block 105 may output timing information to the splitter 134, in order to cause the splitter 134 to split the incoming signal from the coarse PGA 130 into a number of signals that are appropriately spaced from one another (e.g., are 100 ps apart). Further, the timing recovery block 105 may output to the interleaved ADC block 118 by way of a plurality of interpolators, so that the interleaved ADcs may sample the baud in very fine steps (e.g., 1.5 ps with 100 ps baud interval and 64 phase interpolator). Additional details regarding example embodiments of the timing recovery block 105 are provided below, for example, with respect to FIG. 5a.

The timing recovery block 105 may include both a coarse timing recovery block 142 and a fine timing recovery block 138. The purpose of these two structures will be described in more detail below. However, in general the coarse timing recovery block 142 may control the best sampling rate for the channel while the fine timing recovery block 138 may correct for timing mismatches that may occur due to the presence of the plurality of ADCs in the interleaved ADC block 118, and/or due to the presence and operation of the splitter 134 in splitting the received amplified signal from the coarse PGA 130 into a plurality of signals corresponding to the number interleaved ADCs.

The signal processing system 140 may also include a channel identification ("channel ID") block 102, which may output to the TVPD 196 of FIG. 3a, as shown therein. The structure and function of the channel ID block 102 will be described in more detail below. However, in general, the channel ID block 102 may determine representations of the communication channel characteristic at various instants in time. The channel characteristic may include, for example, an impulse response of the communication channel. As shown in FIG. 3b, the channel ID block 102 may provide information to the timing recovery block 105 to allow more efficient and accurate timing recovery operation. In particular, as shown in FIG. 3b, the channel ID block 102 may provide a parameter referred to herein as a DC offset 312 to the timing recovery block 105.

A channel ID ADC 104 (analogous to, or associated with, the auxiliary ADC 394 of FIG. 3a) may be provided for the channel ID block 102 to sample an input signal provided to the channel ID 102. As the channel ID 102 functions to determine a channel characteristic, which may be changing at a significantly lower rate than the symbol rate, the channel ID ADC 14 may operate at a different sampling rate than that of the ADCs comprising the interleaved ADC 118. According to one embodiment, the channel ID 104 operates at a sampling rate of 10 MHz.

As described in more detail below, the channel ID 102 may construct representations of the channel characteristic at any number of different phases. Representations for each phase may be stored at the channel ID block 102 and periodically a best phase may be determined. According to one embodiment a best representation of the channel is chosen that maximizes signal energy after accounting for dispersion and ISI.

A data path for the signal processing system 140 will now be described. A received analog signal 304 may first be received by a coarse programmable gain amplifier ("PGA") block 130. The PGA may be a variable gain amplifier. The coarse PGA block 130 may perform amplification on the received signal 304 to achieve a desired uniform amplitude level for the received signal 304. A digital control circuit (not shown in FIG. 3) may receive one or more numerical values, which are used to control the overall gain of the coarse PGA circuit 130. The PGA circuit 130 may utilize any combination of passive and active circuit elements to achieve gain correction.

The received signal 304 having been processed by the PGA block 130 may then be provided to a splitter 134, which generates an appropriate number of replicas of the signal received from the PGA block 130. The splitter 134 may function to prepare the requisite number of inputs for the interleaved ADC block 118. For example, according to one embodiment, the interleaved ADC block 118 includes eight parallel ADCs. In this case, the splitter generates eight replicas of the signal received from the PGA block 130. The set of signals generated by the splitter 134 may not be of uniform amplitude due to component mismatch in the splitter 134 circuitry. In order to correct for this non-uniformity, each of the signals generated by the splitter 134 may be passed to a fine PGA block 114. The fine PGA block 114 may include a plurality of fine PGAs (not shown in FIG. 3) each respectively providing individual amplitude amplification for each of the signals generated by the splitter 134.

The collection of parallel signals may then be passed to an interleaved ADC block 118. In particular, each of the fine PGAs comprising the fine PGA block 114 may pass its respective signal to an individual ADC within the interleaved ADC block 118. The interleaved ADC block 118 may perform baud rate sampling utilizing the set of received signals from the fine PGA 114. The structure and function of the interleaved ADC block 118 will be discussed in further detail below. In general, the ADC block 118 may comprise a plurality of ADCs, each operating at a sampling rate that may be significantly lower than the overall symbol rate of the telecommunications system. For example, according to one embodiment the symbol rate of the channel may be 10 Gbps and the interleaved ADC 118 includes 8 parallel ADCs each operating at a sampling rate of 1.25 Gbps.

As referenced above, and as described in more detail below, the CID block 102 may use the decision signal 310 and the output of the CID ADC 104 to determine information about an optimum phase information related to the communication channel. Then, the TVPD 196, e.g., within the coarse timing recovery block 142, may provide a regenerated or reference waveform, based on the optimum phase information, and the coarse timing recovery block 142 may compare the reference waveform to the actual output of the interleaved ADC block 118 to determine error information therebetween that may then be used to assist in performing timing recovery, e.g., by outputting a phase signal that may be used by a phase-locked loop (in a conventional manner) to instruct the sampling of the amplified received signal at the splitter 134 and at the interleaved ADC's 118.

Figure 4:
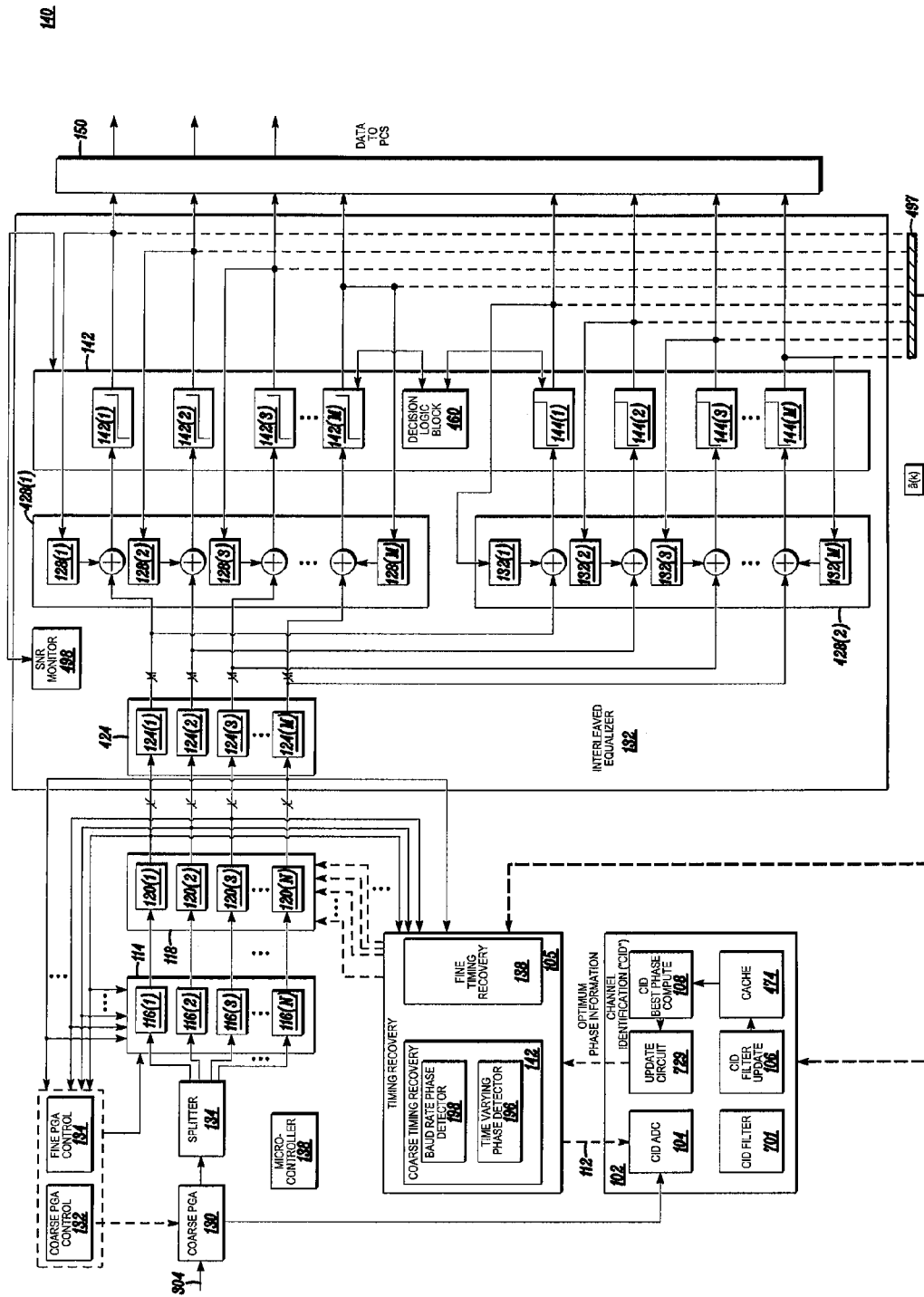
FIG. 4 further depicts a signal flow through a signal processing system for correcting for signal distortions introduced by a communication channel.

FIG. 4 further depicts a signal flow through a signal processing system for correcting for signal distortions introduced by a communication channel. A received signal 304 is provided to a coarse programmable gain amplifier ("PGA") 130. The coarse PGA 130 provides overall gain adjustment for the received signal 304. The output of the coarse PGA 130 may then be provided to a splitter circuit 134. The splitter circuit 134 may generate a plurality of copies (N) of the gain adjusted signal, which are each respectively provided to a fine PGA block 114. In particular, each of the outputs of the splitter block 134 is respectively provided to a parallel fine PGA circuit 116(1)-116(N). Each of the parallel fine PGA circuits 116(1)-116(N) may perform independent gain adjustment on the received signal 304, at the instruction of a digital control circuit such as the fine PGA control 134. The parallel fine PGA circuits 116(1)-116(N) may allow for gain adjustments that may be necessary to correct for non-uniform signal levels in the interleaved structures comprising the signal processing system 140.

Each parallel fine PGA circuit 116(1)-116(N) may provide an output to a respective ADC 120(1)-120(N) comprising an interleaved ADC 118. Each ADC 120(1)-120(N) may convert a respective analog signal provided by a corresponding fine PGA circuit 120(1)-120(N) into a digital signal. The structure and function of an interleaved ADC 118 will be described in detail below. However, in general, each ADC 120(1)-120(N) may sample an incoming signal from the fine PGA block 14 at a clock rate lower than the baud rate such that the effective sampling rate of the combined ADCs 120(1)-120(N) is the baud rate. This may be achieved, as described below, by introducing a phase offset for each ADC 120(1)-120(N) with respect to one another. For example, according to one embodiment, the baud rate is 10 Gbps while the interleaved ADC block 118 comprises 8 ADCs each operating at a sampling rate of 1.25 Gbps yielding an effective sampling rate of 10 Gbps. Each ADC 120(1)-120(N) may also operate at a particular bit resolution. According to one embodiment, each ADC 120(1)-120(N) provides 6 bit resolution.

The outputs of the interleaved ADC block 118 may be provided to an interleaved equalizer block 132 comprising an interleaved FFE 424, interleaved parallel decision feedback equalizer blocks 428(1), 428(2) and sequence DFE block 142. The interleaved FFE block 424 may perform signal processing operations to correct for precursor ISI. The interleaved FFE block 424 may include a plurality of FFE cells 124(1)-124(M). The number of FFE cells (M) may correspond to or may be different from the number of parallel ADCs 120(1)-120(N). Thus, each interleaved FFE cell 124(1)-124(M) may operate at a different clock rate than the clock rate of each ADC 120(1)-120(N). A buffer circuit (not shown in FIG. 4) may function to allow negotiation of the N outputs of the interleaved ADC block 118 (120(1)-120(N)) to be provided to M inputs of the interleaved FFE block 424 (124(1)-124(M)). According to one embodiment, the interleaved FFE block 424 comprises 16 FFE cells 124(*l*)-124(M)

each operating at a clock rate of 625 MHz. The structure and function of each of the FFE cells 124(1)-124(M) will be described in detail below.

The interleaved PDFE blocks 428(1) and 428(2) may operate to correct for postcursor ISI. Each PDFE block 428(1) and 428(2) may include a plurality of summation blocks that respectively compute a summation of an output signal from a respective interleaved FFE cell 124(1)-124(M), and an output from a PDFE cell 128(1)-128(M) and 132(1)-132(M).

The output of each summing block may be provided to a respective slicer 142(1)-142(M), 144(1)-144(M) in the sequence DFE block 144. Each slicer 142(1)-142(M), 144(1)-144(M) may receive an input signal from a respective PDFE cell 128(1)-128(M), 132(1)-132(M), compare the input signal with a threshold value and output a decision signal â(k) indicating whether the signal value falls below or above the threshold value. According to one embodiment each decision signal â(k) may be a one bit signal representing +1 or −1 value. Each decision signal â(k) may be routed back to a respective PDFE cell 128(1)-128(M), 132(1)-132(M). Each PDFE cell 128(1)-128(M), 132(1)-132(M) may receive a decision signal â(k) from a respective slicer 142(1)-142(M), 144(1)-144(M) and output a value to a respective summing block. According to one embodiment, the output value of each PDFE cell 128(1)-128(M), 132(1)-132(M) may be a 16 bit value.

A decision logic block 480 in the sequence DFE block 142 may select a current valid PDFE from one of the PDFEs 428(1) and 428(2) as providing valid and correct data. More specifically, for example, when an output(s) of the FFE 424 falls within an uncertainty range, then the interleaved PDFE 428(1) and 428(2) may be forced to different values (e.g., 1 and −1), and the decision logic block may accumulate an error measurement for each PDFE 428(1), 428(2) over a number of following (e.g., sequentially following) bit periods, and then select the PDFE having the lower error over that number of bit periods.

Any number of the plurality of decision signals from each slicer for the current valid PDFE (i.e., either 142(1)-142(M) or 144(1)-144(M)) may be routed to a CID block 102 and/or a timing recovery block 105. As noted with respect to FIG. 3b, the CID block 102 may provide optimum phase information for a TVPD functionality and the timing recovery block 105 also may provide baud rate phase detector functionality.

The CID block may include a CID ADC 104, which may sample the received signal 304 (after processing by the coarse PGA 130). Because the channel characteristic may be changing at a relatively low rate with respect to the baud rate, the CID ADC 104 may operate at a much lower clock rate than the baud rate. According to one embodiment, for example, the CID ADC 104 may operate at 10 MHz. Because the CID block 102 may operate at a significantly lower rate than the baud rate, according to one embodiment, only a subset of the decision signals â(k) may be routed to the CID block 102 and timing recovery block 105. This may be accomplished using a multiplexer or buffer 497, which may select one or more decision signals â(k) to route to the CID block 102 and/or timing recovery block 105.

The CID block 102 may also include a CID filter update block 106, a CID filter 701, an update circuit 729, a cache 474 and a CID best phase compute block 108. The CID filter update block 106 may receive a subset of decision signals â(k) from the current valid PDFE and based upon this information as well as the sampled received signal 304, the CID filter 701 may be used to update a current channel characteristic for the channel parameterized by a phase, as described in detail with respect to FIGS. 7a and 7b, below. Generally, as noted above, the CID block 102 may compute a channel characteristic for a plurality of phases. According to one embodiment, the CID block computes a channel characteristic for 16 different phases. The timing recovery block 105 may send a CID phase update signal 112 to the CID ADC 104 to control the sampling phase for the plurality of channel characteristic phase computations. According to one embodiment, the CID phase update signal 112 may be updated periodically to cause the CID block to begin generating a channel characteristic for a new phase.

The channel characteristics for the various phases may be cached at the CID block 102 using a cache 474. A CID best phase compute block 108 may periodically compute a best phase among the plurality of different channel characteristics that have been stored at the cache 474 and provide this channel characteristic to an update circuit 729 (described in more detail below, with respect to FIG. 7c), which may thus provide the optimum phase information associated with the channel characteristic to the TVPD block 196. The TVPD block 196 may perform a TVPD operation utilizing a channel characteristic provided by the CID best phase compute block 108. The TVPD block 196 also may receive a plurality of decision signals 310 from which (together with the optimum phase information/channel characteristic) it may generate a reference waveform (e.g., using reference waveform generator 703 of FIG. 7b) to be compared to an output of the interleaved ADCs 118, to thus obtain error information therebetween for determining a phase signal for instructing a PLL (e.g., the PLL 804 of FIG. 7b).

The fine timing recovery block 138 may receive the outputs of the interleaved ADCs 120(1)-120(N). Due to process variations the plurality of ADCs 120(1)-120(N), as well as circuitry related to driving the ADCs and/or the splitter 134, may encounter timing discrepancies. Based upon the inputs provide from the interleaved ADCS 120(1)-120(N), the fine timing recovery may provide a plurality of output signals to correct for timing variations for the ADCs 120(1)-120(N).

Finally in FIG. 4, a signal-to-noise (SNR) monitor 498 is illustrated that represents any suitable technique for detecting performance levels or characteristics of the EDC system 140. For example, the EDC system 140 may be required to maintain certain levels of bit error rate or other performance characteristic in order to stay in a stead-state operational mode, and if some error threshold is breached, then the EDC system 140 may be returned to a start-up state for recalibration of various settings of the EDC system, as described in more detail herein, e.g., with respect to the start-up state machine 126 and with respect to FIG. 11.

Although FIG. 4 shows particular functional operations as being associated with particular structures, this is merely exemplary and it will be understood by skilled practitioners that the organization and execution of particular operations or functions may be carried out by any combination of structures in FIG. 4. For example, although FIG. 4 shows a TVPD as being associated with a the timing recovery block 105, the TVPD operation or some portion of it may in fact be carried out at the CID block 102.

Figure 5A:
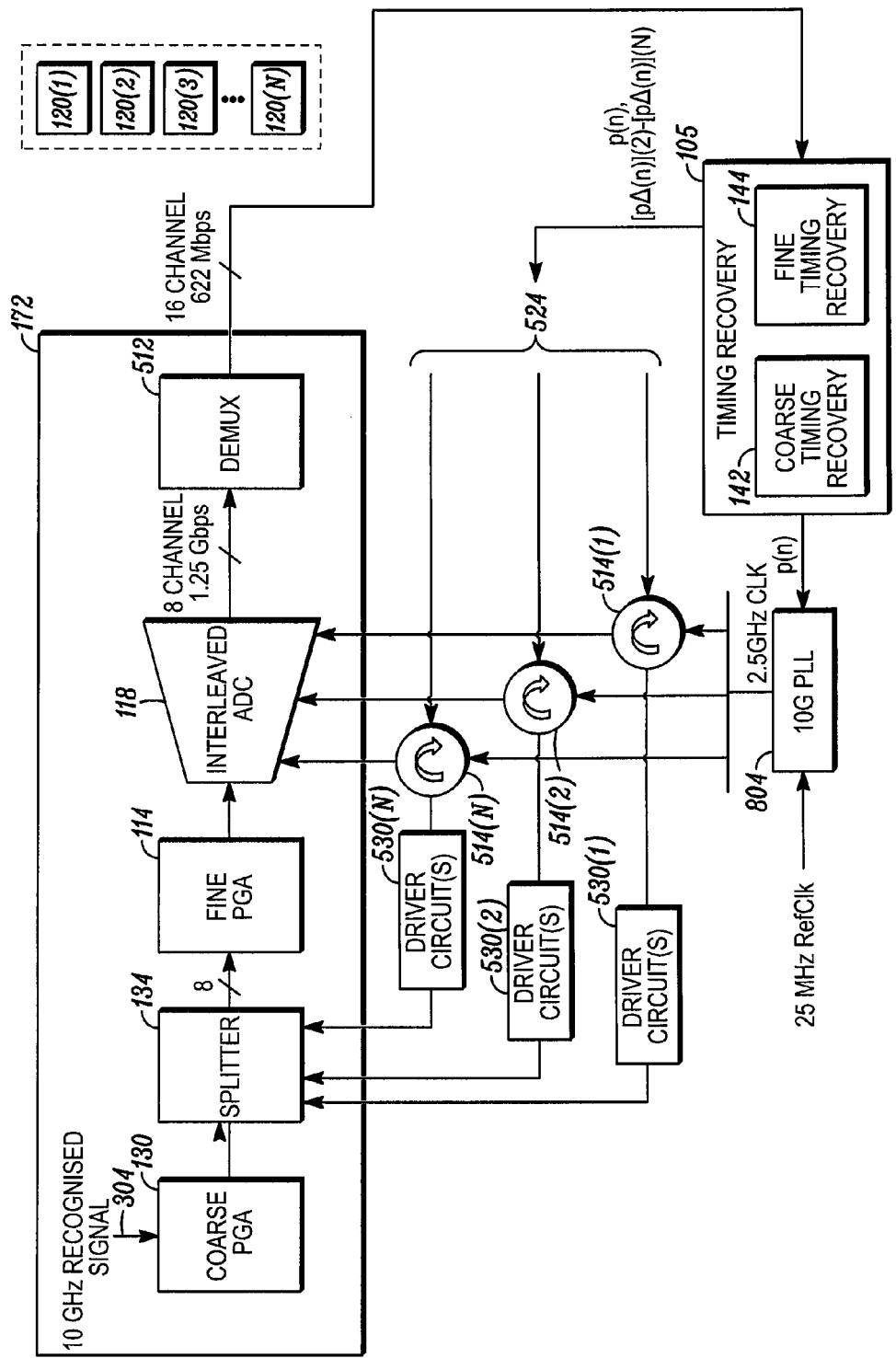
FIG. 5a depicts an example operation of an interleaved ADC according to one embodiment.

FIG. 5a depicts an operation of an interleaved ADC according to one embodiment. As noted with respect to FIGS. 3a, 3b and 4, an interleaved ADC may be provided in a data path 172 for correcting for waveguide dispersion and ISI. The data path may include among other components a coarse PGA 130, a splitter 134, a fine PGA 114 an interleaved ADC 118 and a DEMUX circuit 512.

The interleaved ADC 118 may operate to achieve an effective sampling rate commensurate with the baud rate or symbol rate of a received signal 304. For example, according to one embodiment the baud rate of the received signal 304 may be 10 Gbps. As noted with respect to FIG. 4, the interleaved ADC 118 may include a plurality of ADCs 120(1)-120(n). Each ADC 120(1)-120(n) may be driven by a common sampling clock signal, which may be adjusted by a timing recovery block 105 to correct for clock drift between the receiver and transmitter clocks, so that each ADC 120(1)-120(N) effectively has its own sampling clock.

In particular, the timing recovery block 105 may generate a phase signal p(n), as described below with respect to FIGS. 7a-7c, which may be provided to a PLL 804. The PLL 804 may generate an output signal for controlling a sampling phase of the plurality of ADCs 120(1)-120(n). According to one embodiment, the PLL 804 controls a single clock phase, which according to one embodiment may operate at 2.5 GHz. The single clock may be split into two 1.25 GHz clock signals, at least one of which may be replicated via a plurality of phase interpolators 514(1)-514(n). For example, each phase interpolator may generate one or more interpolated version(s) of the single clock signal and may respectively control operations of a particular ADC 120(1)-120(n). Further, as shown, each phase interpolator 514(1)-514(n) may control a corresponding circuit (e.g., a sample-and-hold circuit, as in the example of FIG. 5b) within the splitter 134. Between each phase interpolator 514(1)-514(n) and the splitter 134, corresponding driver circuit(s) 530(1)-530(n) may be used to drive or otherwise operate (corresponding circuits of) the splitter 134.

For example, the driver circuits may include buffering, amplifying, or timing circuits (e.g., clocks) that are used by the splitter 134 and/or the ADCs 120(1)-120(n). Further, as the splitter 134 may involve digital circuits, the driver circuits may include analog-to-digital converters. Still further, there may be relatively lengthy signal path on the chip between the interpolators 514(1)-514(n) and the splitter 134 and/the ADCs 118. Further specific examples of the driver circuits 530(1)-530(n) are provided below with respect to FIG. 5b and the illustrated sample-and-hold circuits 522(1)-522(n). In general, though, it may be appreciated that the referenced factors, and other factors, may lead to non-idealities in the operation of the splitter 134, and, thus, of the interleaved ADCs 120(1)-120(n).

For example, as described herein, it may occur that the timing recovery block 105 may seek to cause the interleaved ADC 118 to sample the incoming analog signal at intervals of 100 ps, in order to achieve a composite sampling rate of at least 10 GBps. More specifically, a first ADC 120(1) may be designed to perform a first sampling, and a second ADC 120(2) may be designed to perform a second sampling, 100 ps later in time. As described, the timing and spacing of the 100 ps sampling intervals may be designed so that the interleaved ADC 118 samples the input analog signal at an optimum (e.g., highest) point, so as, for example, to minimize an effect of ISI on the sampling operations.

In practice, however, the driver circuits 530(1)-530(n) may be mismatched with respect to one another. For example, the various components making up the driver circuits 530(1)-530(n) may be subject to various temperature or process variations during a fabrication thereof. Moreover, a length of a signal path of one driver circuit may be slightly different than that of another driver circuit, so that signals from the corresponding phase interpolators may take a relatively longer or shorter time to arrive at the splitter 134. As a consequence, the desired 100 ps intervals may be disrupted, so that, without correction, the splitter 134 may sample the incoming analog signal at some undesired interval(s), e.g., 90 ps or 110 ps.

Thus, a fine timing recovery block 138 in the timing recovery block 105 may be used to individually adjust each phase interpolator 514(1)-514(n) to account for such timing variations that may be related to these non-idealities, so that the interleaved ADCs 118 operate, for practical purposes, as a single ADC at the baud rate. For example, in one implementation, the phase interpolators 514(1)-514(n) may effectively divide the 1.25 GHz clock signal(s) from the PLL 804 into 512 phases (i.e., 512 copies of the 1.25 GHz clock, each separated in time by 1/512 of a cycle), and then (for 8 ADCs 120(1)-120(8)), each phase interpolator 514(1)-514(n) may output a corresponding clock signal(s) spaced 1/8 of a cycle (e.g., here, 64 phases) apart from one another (e.g., at phase 0, phase 64, phase 128 ... phase 448), which may be forwarded to the splitter 134 by way of the driver circuits 530(1)-530(n). In this example, the desired 100 ps intervals may initially be achieved at the outputs of the phase interpolators 514(1)-514(8).

As just explained however, a result of generating these clock signals at 100 ps intervals may not actually correspond to sampling at the 100 ps intervals, due to the intervening driver circuits 530(1)-530(n). For example, the (in this example) 8 clocks may be delayed relative to one another so that the splitter 134 actually samples at some other interval besides 100 ps. Thus, the fine timing recovery block 138 may receive a digital output of the interleaved ADC 118 (e.g., from the DEMUX 512, described in more detail herein). Then, the fine timing recovery block 138 may digitally compute an effect(s) of the offsets from each of the driver circuit(s) 530(1)-530(n), and may cause a composite output timing recovery signal to be output to each of the phase interpolators 514(1)-514(n).

For example, a first phase interpoloator/ADC pair may be selected as a reference, and the remaining phase interpolator/ADC pairs may be adjusted relative to this reference pair. Thus, a first phase interpolator/ADC pair 514(1)/120(1) may operate based on p(n), while each phase interpolator/ADC pair other than the reference pair may operate based on a corresponding difference or delta between p(n) and a phase necessary to maintain relative timing of each pair, i.e., [pΔ(n)](2)–[pΔ(n)](N). In other examples, a reference value may be selected as an average phase value, and all of the phase interpolators be adjusted with respect thereto.

Figure 5B:
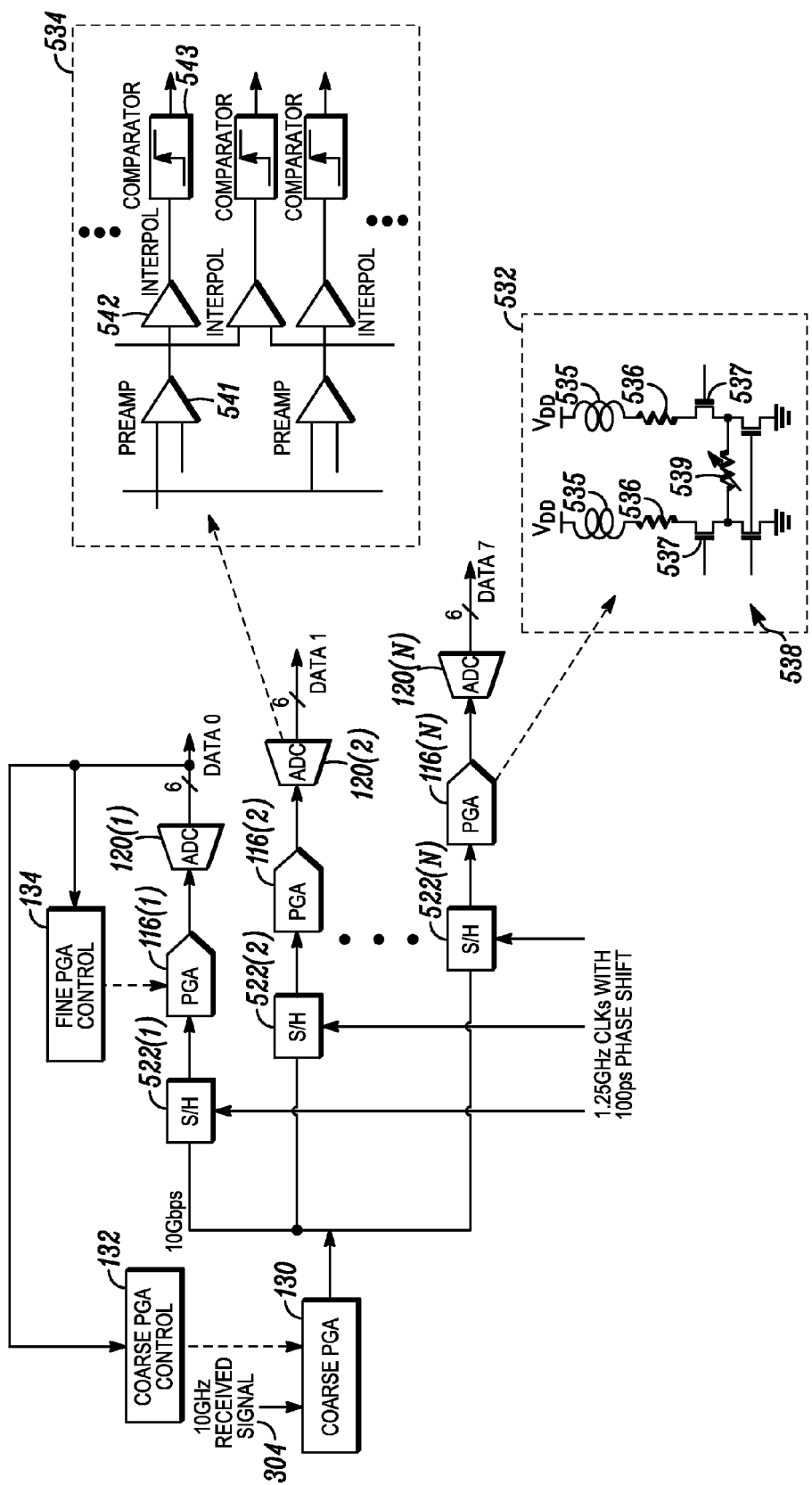
FIG. 5b shows a more detailed view of an ADC architecture according to one embodiment.

Thus, it may be appreciated that the timing recovery block 104 of FIG. 5a may generate a number (e.g., 8) of composite timing recovery signals, where, for example, each composite timing recovery signal is associated with a particular set of ADC-related circuits, i.e., a particular phase interpolator 514(1), driver circuit(s) 530(1), sample-and-hold circuit 522(1) of the splitter 134 (as shown in FIG. 5b), and ADC 120(1). Each composite timing recovery signal includes a coarse timing recovery signal from the coarse timing recovery block 142 (which is calculated as described herein, e.g., with respect to FIGS. 7a-8) combined with a fine timing recovery signal that is determined for the particular set of ADC-related circuits in question. Consequently, the input analog signal may be sampled at desired intervals (e.g., 100 ps), even in the presence of process non-idealities (such as in the construction and layout of the driver circuit(s) 530(1)-530(n). Because the fine timing recovery signal is calculated in the digital realm, the composite signals may be calculated accurately and with high efficiency and repeatability, and can be adjusted as needed to sample at desired intervals. Moreover, since the timing mismatches imparted by the driver circuit(s) 530(1)-530(n) may generally be static or time-invariant, the fine timing recovery block 138 may be configured to determine and store a timing offset for each individual ADC 120(n) and corresponding ADC-related circuitry, and may simply use these values in conjunction with the time-varying coarse timing recovery signal to generate the various composite timing recovery signals.

In other implementations, an additional phase interpolator (not shown in FIG. 5a) may be used to set the coarse timing recovery signal, e.g., may be placed between the PLL 804 and the phase interpolators 514(1)-514(n). Then, a common clock may be output from this coarse TR phase interpolator and sent to each of the phase interpolators 514(1)-514(n), acting here as fine TR phase interpolators, which would each then receive a corresponding fine timing recovery signal from the fine timing recovery block 138 to adjust the coarse/common clock signal accordingly to achieve the desired effect of common, discrete sampling intervals (e.g., 100 ps). Other implementations are also possible.

Thus, as referenced above, the fine timing recovery circuit 138 may be used to adjust timing information provided to the phase interpolators, so that a desired sampling interval (e.g., 100 ps) are maintained despite the presence of relative non-idealities in the various driver circuits 530(1)-530(N) (e.g., due to temperature, process, or other mismatches in the design and fabrication thereof).

FIG. 5b shows a more detailed view of an ADC architecture according to one embodiment. In FIG. 5b, as referenced above, the splitter 134 is shown to include a plurality of sample and hold circuits 522(1) to 522(N), which receive an input analog signal from the coarse PGA 130 and which individually drive fine PGAs 116(1)-116(N), as shown. Circuit 532 provides an example of a gain circuit in which a variable resistance is used to vary the overall gain of the PGA 116(N). Meanwhile, a circuit 534 provides an example of an ADC circuit using a flash ADC. Circuits 532 and 534 are merely examples, and other suitable circuits may be used, as well.

In the specific example of FIG. 5b, the circuit 532 for the fine PGA 116(N) includes inductors 535 connected to load resistors 536 and a pair of transistors 537 which provide a differential pair of transistors for setting the gain of the circuit 532. More specifically, with transistors 538 acting as a current source for the circuit 532, a variable resistor 539 may be implemented as a bank of parallel transistors, which receive digital code from the fine PGA controller 134 that determines how many of the bank of transistors should be activated to achieve a desired gain for an associated fine PGA 116(N). More specifically, the gain of the circuit 532 may generally be characterized as a ratio of the load resistance to a current value of the variable resistance 539. By activating more of the bank of parallel transistors, an overall resistance of the variable resistance 539 is decreased, so that the ratio of the load resistance thereto (and thus of the gain) is increased.

In the illustrated example, and as described herein, the ADC circuit 534 may present a large capacitive load (due, for example, to preamplifiers, comparators, or other circuit elements having a large capacitive load). This capacitive load is associated with a low available bandwidth for the ADC circuit 534, which may be compensated for with increased power. However, by including inductors 535 at an output of the fine PGA(s) 116(1)-116(N), an effect of the capacitive load may be minimized, and the available bandwidth may advantageously be increased, without a commensurate increase in power.

The ADC circuit 534 is an example of a flash ADC. In FIG. 5b, the flash ADC is implemented using preamplifiers 541, interpolators 542, and comparators 543. As the general operation of a flash ADC is known (e.g., here, a 6-bit flash ADC having 63 preamplifiers and 63 comparators), the general operation of circuit 534 is not described here in detail. However it may be appreciated that the interpolators 542 may allow the use of a reduced number of the pre-amplifiers 541 and comparators 543, e.g., where the interpolators 542 provide one-to-two interpolation, only 32 preamplifiers 541 and comparators 543 may be needed, in order to save power relative to a conventional operation.

As shown in FIG. 5b, and understood from FIG. 5a, the sample-and-hold circuits 522(1)-522(N) are designed to receive 1.25 GHz clock signals to thereby sample the incoming signal at 100 ps intervals. For example, the sample-and-hold block 522(1) may include a switch and a capacitor (not shown), so that when the switch is closed the capacitor may charge during a tracking mode, and when the switch is open the capacitor may store the charge during a hold mode, thus forming a track-and-hold circuit. By placing two such track-and-hold circuits back-to-back, the sample-and-hold 522(1) may be configured to sample at a defined point in time and to provide the sampled data to the fine PGA 116(1).

In the above configuration, each sample-and-hold block 522(1)-522(N) may use two clocks with opposite polarity that also are non-overlapping. To generate these clocks, a corresponding block may be included as part of each of the driver circuits 530(1)-530(n). These clocks also need to be appropriately amplified and buffered to be able to drive the required load(s) of the sample-and-hold blocks 522(1)-522(n), so that corresponding amplifiers and buffers may be included in the driver circuits 530(1)-530(N). Moreover, the sample-and-hold circuits 522(1)-522(n) and the ADCs 120(1)-120(N) may be located relatively far from the phase interpolators 514(1)-514(N), so that the phase interpolators need to drive a long interconnect(s), as well, where such long interconnect(s) may vary (relative to one another) between the different sample-and-hold blocks 522(1)-522(N) and the corresponding phase interpolators 514(1)-514(N). In addition, the phase interpolators 514(1)-514(N) may be implemented as analog blocks, while the sample-and-hold clock(s) is a digital (full swing) signal, so that an analog to digital (1 bit) converter is also needed within each of the driver circuits 530(1)-530(N).

As referenced above, with respect to FIG. 5a, some or all of the just-referenced components may be placed in all (e.g., 8) paths. As described, even if ostensibly-identical blocks are used in each path, random process mismatch can cause phase differences between the clocks supplied to the sample-and-hold blocks 522(1)-522(N). As described with regard to FIG. 5a, the timing recovery block 105, and specifically the fine timing recovery block 138, may be used to adjust the phase interpolators 514(1)-514(N) and thereby compensate for such timing mismatches to ensure that the sample-and-hold blocks 522(1)-522(N) sample at desired time intervals with respect to one another, e.g., 100 ps.

Further with regard to FIG. 5b, and as may be appreciated from the above, description, the coarse programmable gain amplifier (PGA) controller 132 may be configured to characterize the output digital signal of each of the analog-to-digital converters 120(1)-120(N) and to output a coarse gain control signal based thereon. The coarse programmable gain amplifier 130 may be configured to receive the coarse gain control signal and configured to amplify the input analog signal 304 based thereon and output an amplified signal to the splitter 134, e.g., to the sample-and-hold circuits 522(1)-522(N), in order to divide the amplified signal into a plurality of amplified signals.

The fine PGA controller 134 may be configured to determine a fine gain adjustment for each of the plurality of interleaved analog-to-digital converters 120(1)-120(N), and configured to output a fine gain control signal for each of the corresponding plurality of analog-to-digital converters, based thereon. The fine programmable gain amplifiers (116(1)-116(N), each corresponding to one of the plurality of interleaved analog-to-digital converters 120(1)-120(N), as shown, may thus receive one of the plurality of amplified signals from a corresponding sample-and-hold block, as well as a fine gain control signal (shown in FIG. 5b as going to fine PGA 116(1), although it will be appreciated that each fine PGA 116 may receive an individualized fine PGA control signal, as described herein), so as to output an individually-amplified signal to a corresponding one of the interleaved analog-to-digital converters.

The coarse PGA controller 132, which may be a digital controller, may be configured to characterize the output digital signal of each of the analog digital converters 120(1)-120(N) by taking an average value thereof to determine the coarse gain control signal. In some implementations, the coarse PGA may have a certain dynamic range that is relatively wide compared to a dynamic range of each of the fine PGAs (116(1)-116(N). For example, the coarse PGA may have a dynamic range of 60 mV-700 mV peak-to-peak, while the fine PGA(s) may have a dynamic range that is smaller by a factor of ten or more. In this way, the coarse PGA 130 may handle a wide range for the received signal 304, while smaller, lower-power amplifiers may be used for the fine PGAs (thereby reducing an overall power consumption). For example, a threshold voltage for the received signal 304 may be set to a midpoint of the available range (e.g., approximately 360 mV in the above example). Then, when an average voltage at the outputs of the ADCs is higher or lower than the desired output level of the coarse PGA 130, the coarse PGA controller 132 may raise or lower a gain of the coarse PGA accordingly to maintain the coarse PGA output at the desired level. In other implementations, the coarse PGA 130 (and coarse PGA controller 132) may be removed and both coarse and fine gain control may be performed at the fine PGAs 116(1)-116(N). In these implementations, a wider dynamic range may be required for each of the fine PGAs, which may result in higher power being consumed.

The fine PGA controller 134 may be a digital controller that is configured to determine a first analog-to-digital converter (e.g., ADC 120(1)) as having a reference fine gain adjustment of zero, and is configured to determine remaining ones of the fine gain adjustments relative to the reference fine gain adjustment. In this way, gain mismatches between the ADCs 120(1)-120(N), which may be due to various process or temperature effects during fabrication of the ADCs 120(1)-120(N), may be reduced or eliminated, and outputs of each of the ADCs 120(1)-120(N) may be maintained at substantially the same level. In other examples, the reference fine gain may be determined with respect to the average gain value, and then the fine gain adjustment for each fine PGA/ADC may be made with respect thereto.

Similarly to the fine timing recovery (phase control) described above, it may be appreciated that to the extent that the fine gain control is necessitated by the referenced fabrication artifacts, such effects are generally time-invariant. Consequently, once the fine PGA controller 134 calculates the various gain offsets for the PGAs 116(1)-116(N), these gain offsets may be frozen, e.g., maintained in a register or other memory, so that the calculations need not be performed again, or may be performed less frequently. Such freezing also may reduce or eliminate small gain changes that may be associated with quantization effects of having digitized the fine PGA control signal, whereby the desired gain may be between two quantized/digitized levels and may oscillate therebetween.

Figure 5C:
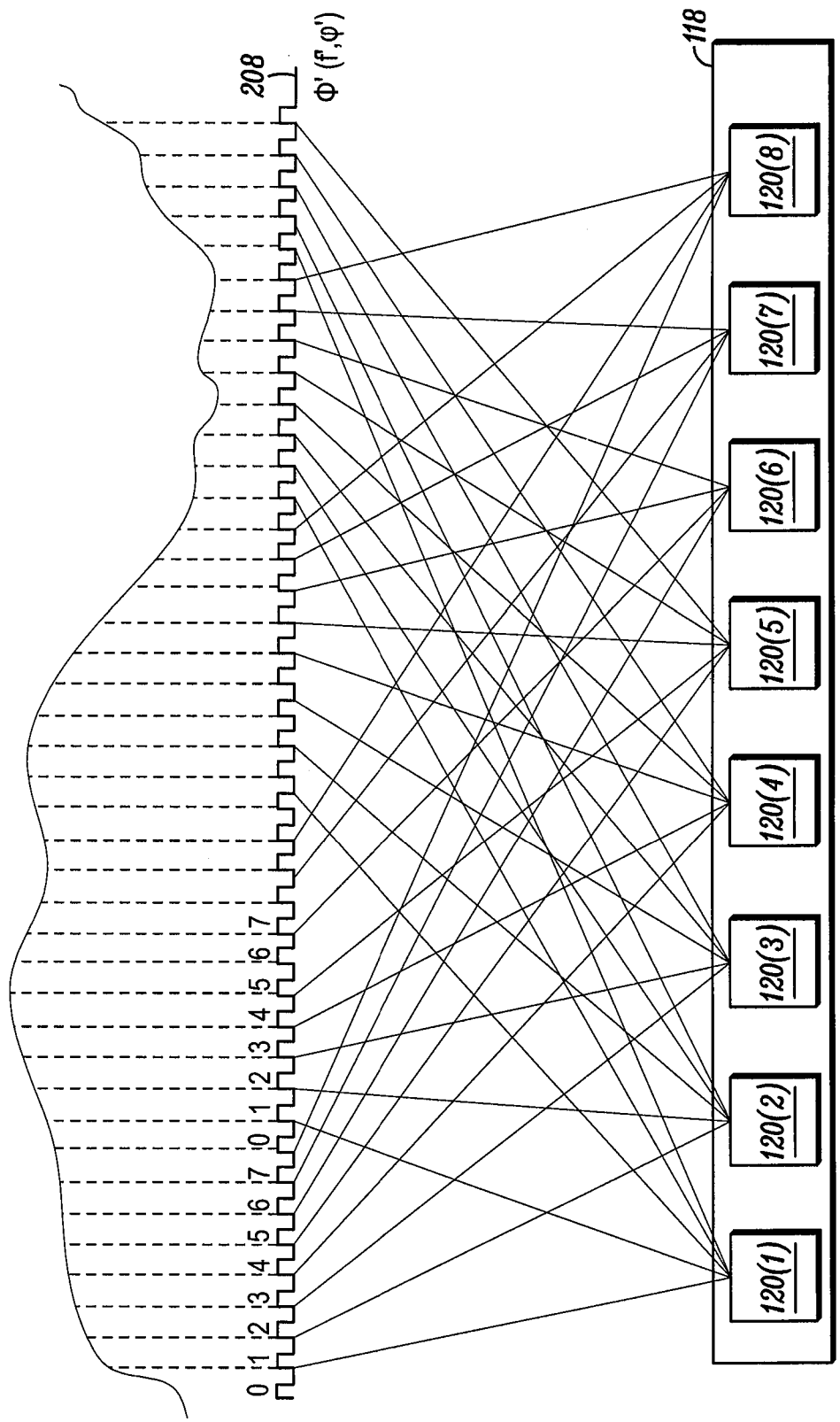
FIG. 5c depicts an overall operation of an interleaved ADC according to one embodiment.

FIG. 5c depicts an overall operation of an interleaved ADC according to one embodiment. As described above, an interleaved ADC 118 may include a plurality of ADCs 120(1)-120(n). Each ADC 120(1)-120(n), may be triggered by a receiver clock 208 on a particular cycle. The effective rate of the receiver clock 208 may be the baud rate of the transmitted signal. However, the clock rate of a particular ADC 120(1)-120(n) may be significantly lower than the baud rate.

Figure 6A:
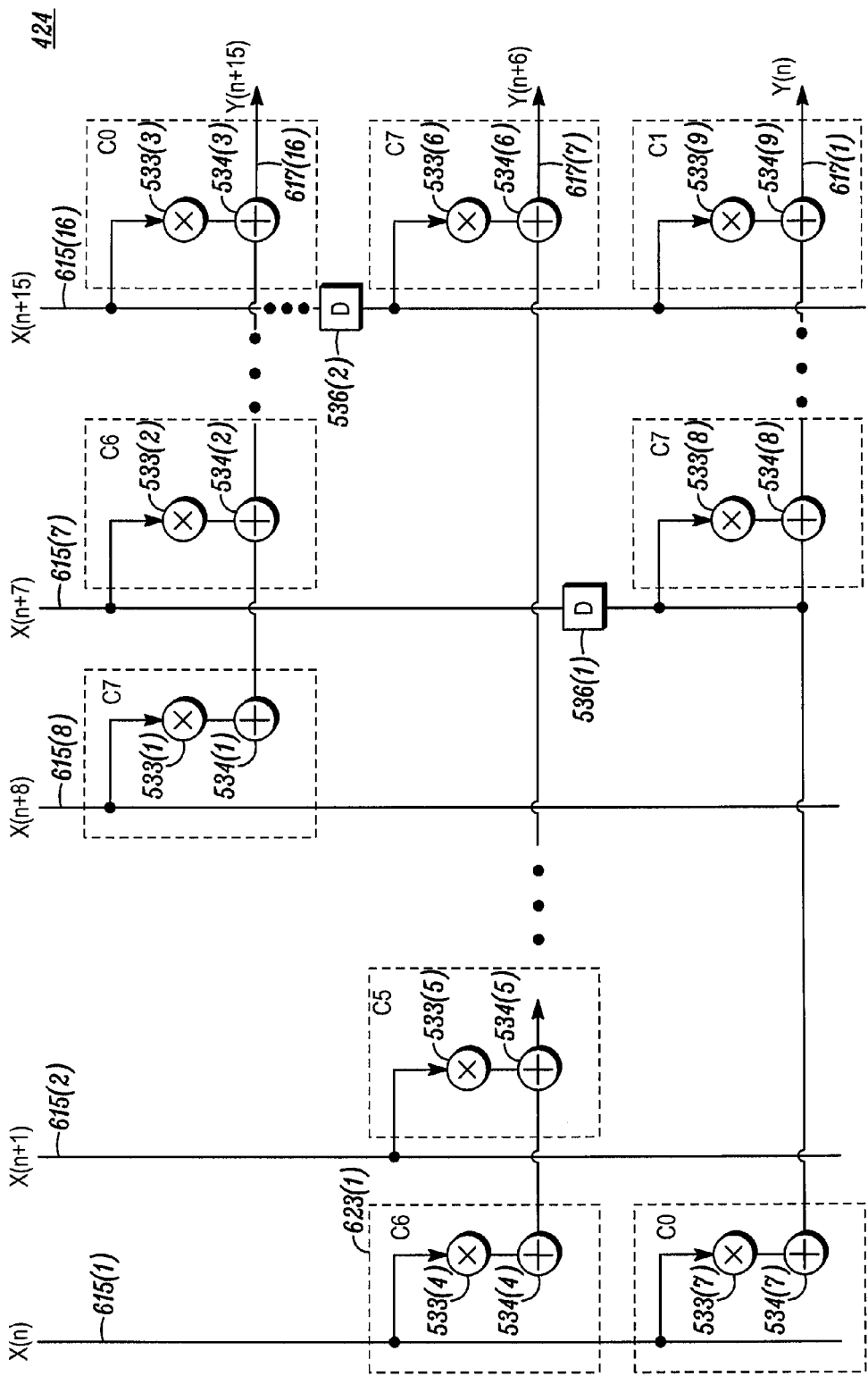
FIG. 6a depicts a signal path for an interleaved FFE.

FIG. 6a depicts a signal path for an interleaved FFE. According to one embodiment the interleaved FFE 424 may utilize a parallel structure of 16 FFE cells (124(1), 124(2) ... 124(16)) for receiving 16 input signals X(n)–X(n+15) and generating 16 output signals Y(n)–Y(n+15). This is merely exemplary, and an interleaved ADC may include any number of input signals and any number of output signals. For example, in another example embodiment, an interleaved FFE may include 32 FFE cells, with 32 inputs, 32 outputs, and 10 taps. A serial FFE with, for example, 8 taps may be implemented as a convolution of an input signal with an FIR.

$$y(n) = \sum_{i=0}^{7} c(i)x(n-i)$$

According to one embodiment, an interleaved FFE 424 may generate 16 outputs y(n)–y(n+15) as a function of 16 inputs x(n)–x(n+15) according to the following relationships.

$y(n)=c(0)x(n)+c(1)x(n-2)+c(2)x(n-2)+c3x(n-3)+\ldots +c(7)x(n-7)$ $y(n+1)=c(0)x(n+1)+c(1)x(n)+c2x(n-1)+c3x(n-2)+\ldots +c(6)x(n-6)$

. . .

$y(n+15)=c(0)x(n+15)+c(1)x(n+14)+c2x(n+13)+c3x(n+12)+\ldots +c(7)x(n+8)$

Each FFE cell (124) may generate one of these 16 outputs.

Referring to FIG. 6a, an interleaved FFE 424 may received a plurality of inputs x(n)–x(n+15) on a plurality of respective input lines 615(1)-615(16). The FFE 424 may generate a plurality of outputs y(n)–y(n+15) on a plurality of output lines 617(1)-617(16). Each input line 615(1)-615(16) may include a plurality of multiply and accumulate ("MAC") blocks 623(1)-623(n). Each MAC block 623(1)-623(n) may include a respective multiplication block 533 and summation block 534. Each MAC block 623(1)-623(n) may be coupled to a respective input line 615(1)-615(16) via its multiplication block 533, which provides an input port for the MAC block 623. Each MAC block 623 may be coupled to a different input line 615(1)-615(16) via its respective summation block 534, which serves as an output port for the MAC block 623.

An input (x(n)–x(n+15)) for a particular input line 615(1)-615(16) may be provided to the plurality of MAC blocks coupled to that input line via the MAC block's respective multiplication block 533, where it may be multiplied by a respective coefficient CX and then provided to a respective summation block 534 for that MAC block 623. The output of a respective summation block 534 may be combined with the outputs of other MAC blocks 623 coupled to different input lines.

Thus, according to an example embodiment, an equalizer may include an interleaved feed forward equalizer (FFE) 424 including a plurality of FFE cells (124). Each FFE cell may receive an FFE coefficient C for each of a plurality of FFE taps (or multiplication circuits). Each FFE cell (124) may be configured to generate a digital output signal by multiplying an input signal X by a corresponding FFE coefficient C to generate a product. These products may be summed or added together (or additively combined) for each of the taps or multiplication circuits to generate an output for the FFE cell. Multiple FFE outputs may be generated in parallel by providing multiple FFE cells 124, as shown in FIG. 4.

Figure 6B:
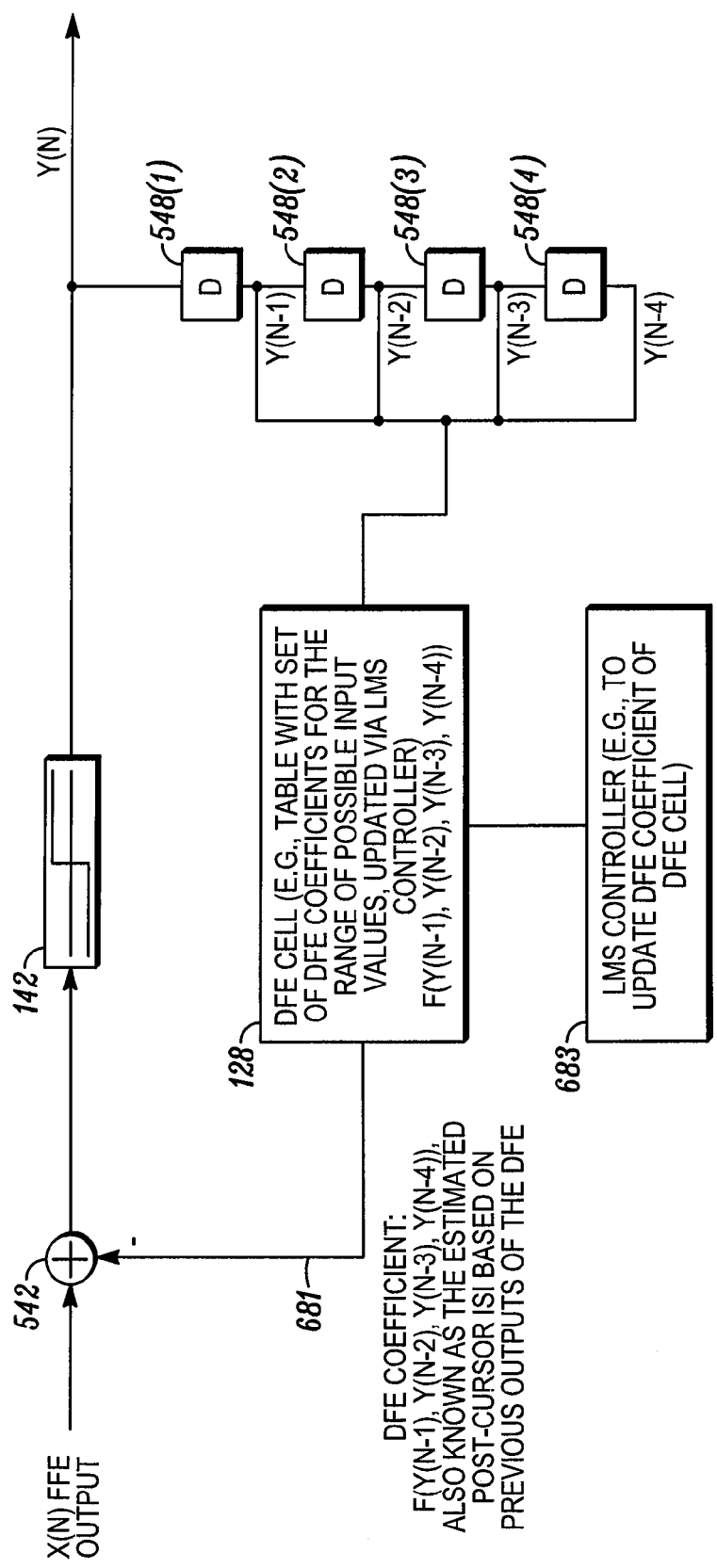
FIG. 6b depicts a serial DFE cell according to one embodiment.
Figure 6C:
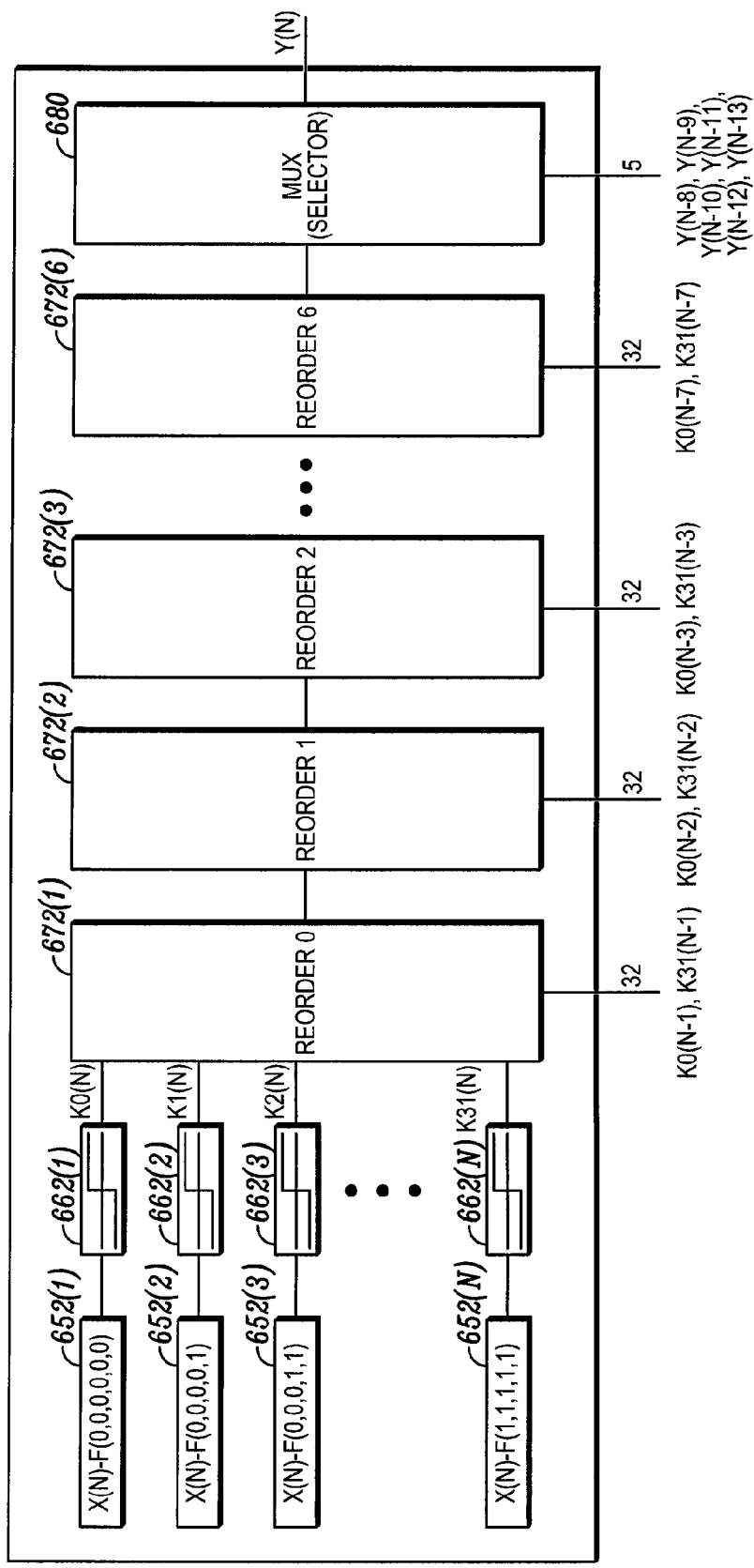
FIG. 6c is a diagram illustrating a decision feedback equalizer (DFE) block for a parallel DFE according to an example embodiment.
Figure 6D:
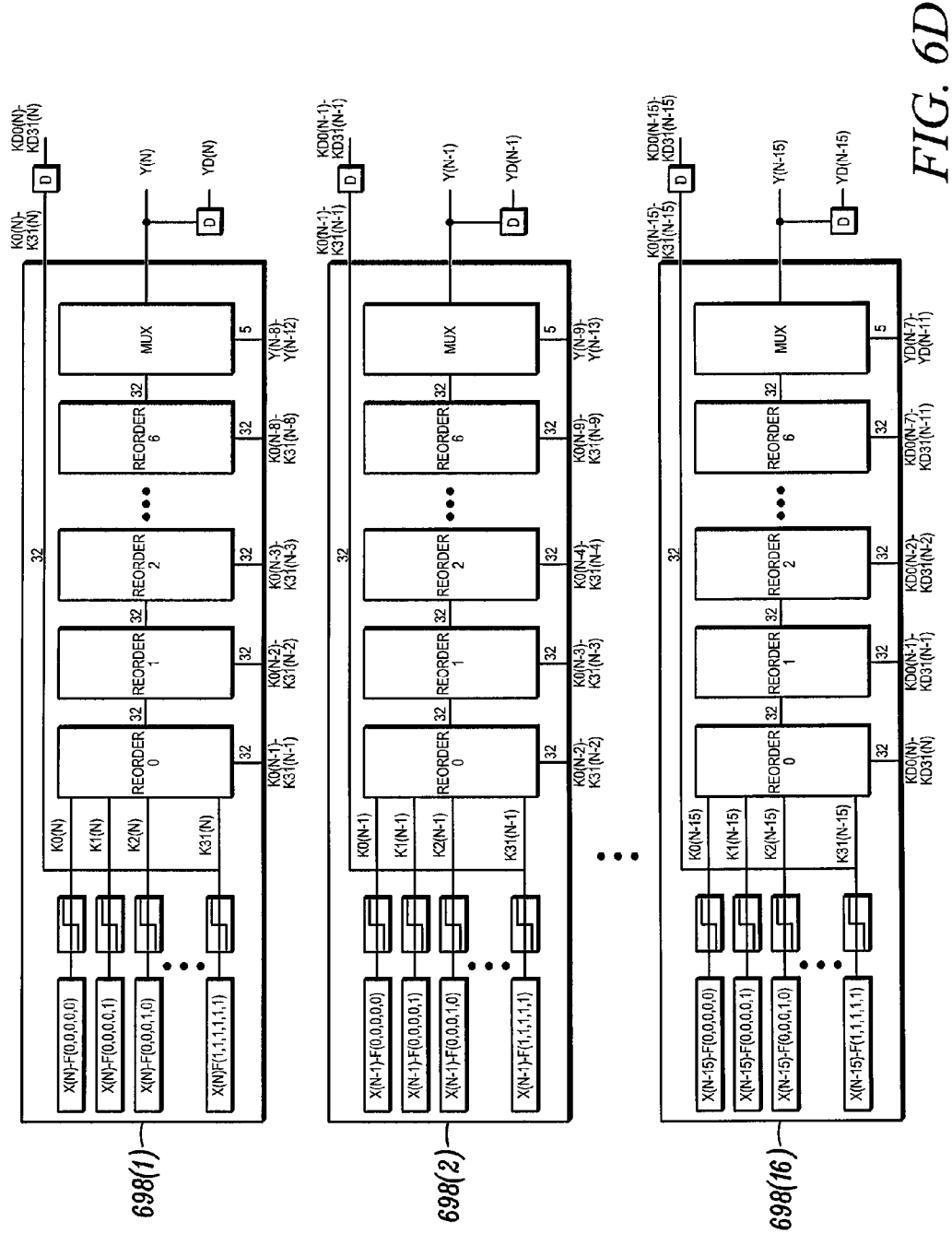
FIG. 6d is a diagram illustrating a parallel decision feedback equalizer (DFE) according to another example embodiment.
Figure 6E:
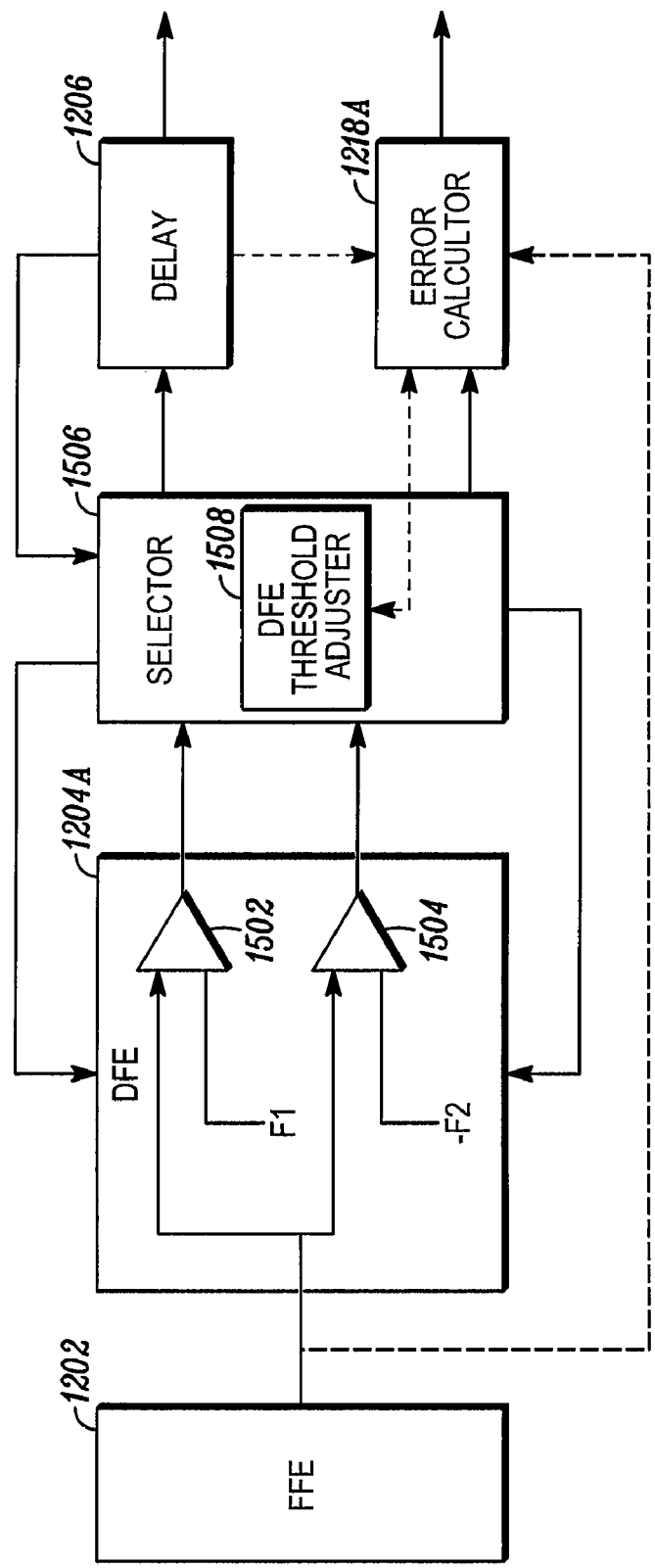
FIG. 6e is a diagram illustrating a non-linear, unrolled decision feedback equalizer (DFE) according to an example embodiment.
Figure 6F:
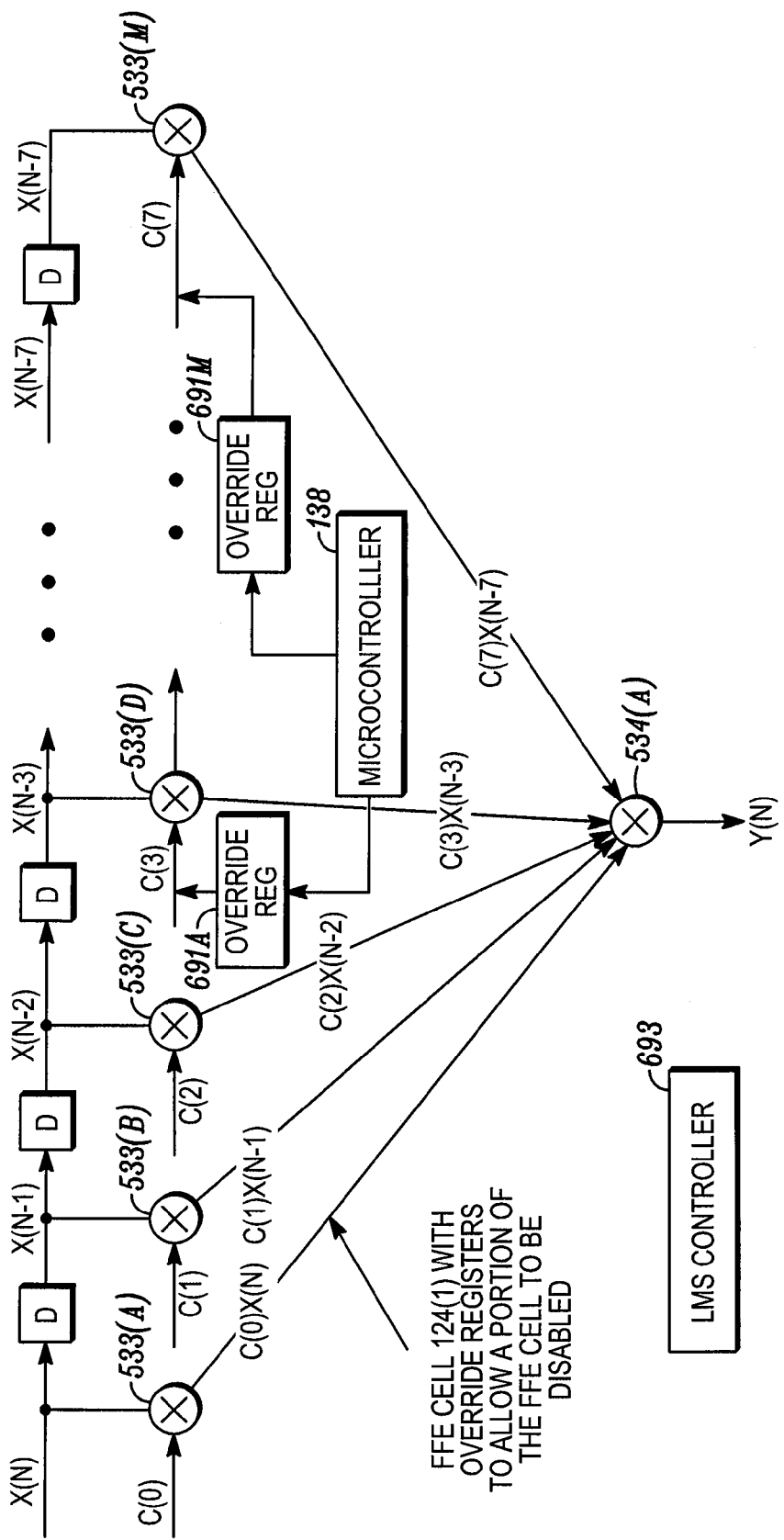
FIG. 6f is a diagram illustrating an FFE cell according to another example embodiment.

FIG. 6f is a diagram illustrating an FFE cell according to another example embodiment. The FFE cell may include a tapped delay line or FIR filter, which includes a number of FFE coefficients C, and receives an input x(n). Previous FFE inputs are shown as being separated by delay elements (D), including x(n−1), x(n−2), x(n−3), . . . x(n−7). A plurality of taps or multiplication circuits are provided, including multiplication circuits 533(*a*), 533(*b*), 533(*c*), 533(*d*), . . . 533(*m*).

FFE cell 124(1) may multiply, via multipliers 533, an input or previous input (x(n−k)) by a corresponding FFE coefficient Ck. Each of these products (X(n−k)*Ck) are summed or added together by adder 534(*a*) to generate the FFE output y(n) for the FFE cell 124(1). The FFE coefficients may be adapted or adjusted by LMS controller 693, using a LMS (least means square) or other algorithm, based on an error between the FFE outputs and the equalized sliced values output by the DFE, for example.

In the example embodiment, the FFE cell 124(1) may include 8 taps, or 8 multiplication circuits 533, although any number may be used. Each multiplication circuit 533 may include two inputs, including an FFE input (x(n)) or previous FFE input (x(n−k)), and a FFE coefficient or weight c(k), for k+1 taps or multiplication circuits. As noted, the FFE coefficients (c(0), c(1), c(2), . . . c(7)) may be adapted by LMS controller 693, e.g., to minimize or at least reduce error. For example, better performance of the FFE may be obtained through use or operation of a larger or increased number of taps or multiplication circuits in FFE cell 124(1), e.g., by allowing the FFE cell to converge more quickly. However, while a larger number of FFE taps may provide better performance, it may also consume more power. Thus, there may be a trade-off between performance and power consumption, where both may increase as the number of taps or multiplication circuits operating with the FFE cell increase.

Thus, in an example embodiment, FFE cell 124(1) may include one or more override registers 691 that may allow microcontroller 138 to load or write a zero to one or more of the override registers 691, e.g., to selectively disable a corresponding tap or multiplication circuit of FFE cell 124(1). In an example embodiment, when a zero (0) is written to an override register 691, the zero may override (or force to zero) the associated coefficient c(k) from LMS controller 693. Driving or overriding the coefficient input to the corresponding multiplication circuit to zero may effectively disable the corresponding multiplication circuit. For example, zero times any number is zero, and thus, the output from a multiplication circuit, having a zero in the override register (and thus as an input), will be zero, causing the output of the multiplication circuit to remain at zero, and not to toggle or change values or voltages.

For example, override register 691*a* may be coupled to an associated coefficient c(3), and override register 691*m* may be coupled to an associated FFE coefficient c(7). An override register 691 may be provided for one or more (or even all) taps or multiplication circuits of the FFE cell. There may be one override register for each of one or more taps or multiplication circuit, which may allow microcontroller 138 to selectively enable or disable each tap or multiplication circuit. Or, one register may be used for a group (two or more) taps or multiplication circuits, e.g., to allow microcontroller 138 to enable or disable a group of multiplication circuits together. In an example embodiment, an override register 691 may be provided for each of a plurality of multiplication circuits or taps, such as to allow multiplication circuits for coefficients c(3), c(4), c(5), c(6) and c(7) to be selectively disabled (e.g., to have a constant output, such as approximately 0, and thereby save power). This may allow the microcontroller 138, e.g., based on software, to configure, and/or reconfigure the number of operable taps for FFE cell 124(1), which may allow a number of taps to be increased for better performance, or the number of operable taps to be decreased to conserve power, for example.

FIG. 6b depicts a serial PDFE cell according to one example embodiment. The arrangement shown in FIG. 6b may represent one channel in a parallel array for an interleaved PDFE 428(1), 428(2). An input signal x(n) (which may be an output from an FFE cell) may be provided to a summation block 542 where it is additively combined with an output from a PDFE cell 128. The output of the summation block 542 may then be provided to a slicer 142, which may generate a binary signal (e.g., +1, −1) depending upon whether the input to the slicer 142 is less than or greater than zero (or less than or greater than a decision point). The output of the slicer 142 may be provided to a plurality of delay elements, for example, 548(1)-548(4), which generate respective delayed signals y(n)−y(n−4). The delayed output signals y(n)−y(n−4) may be provided back to the PDFE element 128, which generates an output signal F(y(n), y(n−1), y(n−2), y(n−3), y(n−4)). The output signal F(y(n), y(n−1), y(n−2), y(n−3), y(n−4)) may be a linear combination of the delayed signals y(n)−y(n−4). According to one embodiment, each binary signal y(n)−y(n−4) may be multiplied by a 16 bit coefficient to generate a 16 bit number. These 16 bit values may then be combined in a linear relationship via the PDFE element 128.

In an example embodiment, the PDFE circuit shown in FIG. 6b may be a 4 tap DFE, or other number of taps may be used. The number of taps may be the number of delayed output values that are input to DFE cell 128 (in this example, four delayed outputs are input to DFE cell 128). DFE cell 128 may output one of 16 DFE coefficients F((y(n−1), y(n−2), y(n−3, y(n−4)), based on four previous DFE outputs (y(n−1), y(n−2), y(n−3), y(n−4)). With four taps, there are $2^4$ or 16 different possible DFE coefficients that may be selected. The DFE cell 128 may be (or may include), for example, a lookup table or other structure, that may output 1 of 16 different DFE coefficients based on four previous DFE outputs y (e.g., input as 4 different bits). The selected DFE coefficient F( ) is the estimated post-cursor ISI, based on the one or more previous DFE outputs, as shown. The DFE coefficient F( ) may be output via line 681, and subtracted from the DFE input x(n). X(n), which is the input to the DFE circuit, is the current bit value after the pre-cursor ISI has been removed by the FFE. Thus, the adder circuit 542 may subtract the DFE coefficient from the DFE input x(n), to output a soft decision (or modified bit value) that may be the received bit after both the pre-cursor ISI has been removed (by the FFE) and post-cursor ISI has been removed (by the DFE). This soft decision, or modified bit value, may be sliced by slicer 142 to a high value (e.g., +1), or a low value (e.g., −1).

An LMS controller 683 may receive error signals and update both DFE coefficients F( ), and the FFE coefficients C. For example, LMS controller 683 may receive the soft decisions (or modified bit values) output from adder 542 and the resulting sliced bit values, and calculate an error between sliced bit value (or equalized output bit values) and the soft decision or modified bit values. The LMS controller 683, for example, may update the DFE coefficients to decrease the errors.

FIG. 6c is a diagram illustrating a decision feedback equalizer (DFE) block for a parallel DFE according to an example embodiment. A DFE block 698 may, for example, generate a sliced bit value (or DFE output), based on a DFE input x(n) and a selected DFE coefficient F( ). The sliced bit value y(n) output by the DFE block 698 may be a 1 bit value, e.g., a +1 or −1 (or 1 or 0), which may be the received bit value after the pre-cursor ISI and post-cursor ISI have been removed, which may be referred to as an equalized bit value. Multiple DFE blocks 698 may be provided in parallel to provide for a parallel or interleaved DFE circuit, providing a multi-bit output (see, e.g., FIG. 6d).

Referring to FIG. 6c, in an example embodiment, the DFE block 698 may be a 7 stage look ahead 5 tap DFE, as an example. In an example embodiment, the DFE may be provided as a parallel structure or arrangement, to relax the clocking requirements. For example, a parallelized DFE may be clocked or operated at a lower clock rate, as compared to a serial DFE. For example, in the DFE circuit (or DFE block) 698 shown in FIG. 6c, all of the DFE coefficients F( ) are generated (precomputed) in parallel, to allow a DFE output to be selected, and this may relax the clocking requirements for the DFE.

Referring to FIG. 6c, although not shown, the DFE block 698 may receive x(n) as an input, where x(n) is the FFE output or current bit value after pre-cursor ISI has been removed (or at least decreased) by the FFE. The DFE block 698 may also receive as inputs (or generate), all 32 DFE coefficients F( ). These DFE coefficients may be updated by a controller, e.g., by the LMS controller 683 (see FIG. 6b).

As shown in FIG. 6c, a DFE block 698 may include a plurality of DFE cells 652, including DFE cells 652(1), 652(2), 652(3), ... 652(n), where n may be 32, for example. Thus, for a 5 tap DFE circuit, there may be $2^5$ or 32 possible DFE coefficients F(y(n−1), y(n−2), y(n−3), y(n−4), y(n−5)) based on the 5 previous DFE outputs (5 previous DFE sliced bit values). Each DFE cell 652 may determine or precompute a soft decision (or modified bit value) corresponding to one of the possible DFE coefficients F( ). DFE cell 652(1), may precompute a modified bit value for the current bit by subtracting the DFE coefficient F(0,0,0,0,0) from the DFE input x(n). This value (x(n)−F(0,0,0,0,0)), is output as a precomputed modified bit value corresponding to the first DFE coefficient F(0,0,0,0,0). Similarly, the other DFE cells 652(2), 653(3), etc. may determine or precompute a different modified bit value based on the DFE input x(n) and one of the 32 DFE coefficients. Each of these modified bit values may be considered to be precomputed because they may typically be computed before it is determined which of the 32 modified bit values is correct.

In FIG. 6c, 32 slicers 662 are provided, including slicer 662(1), 662(2), (662(3), ... (662(n). Each slicer 662 is coupled to a corresponding DFE cell 652, and slices the modified bit value to a precomputed sliced bit value Ki(n) for the current bit. For example, slicer 662(1) slices the modified bit value from DFE cell 652(1) and outputs a precomputed sliced bit value K0(n), for the current bit; Slicer 662(2) slices the modified bit value output by by DFE cell 652(2) to a precomputed sliced bit value K1(n), etc. In a similar fashion, slicers 662(1) ... 662(32) may output sliced bit values K0(n) ... K31(n), respectively. As noted, these 32 sliced bit values K0(n) ... K31(n) correspond to the input of a corresponding one of the 32 DFE coefficients F(0000) ... F(11111) in DFE cells 652, as shown in FIG. 6c.

In an example embodiment, each of the DFE coefficients may be based on the 5 immediately previous (or adjacent group) DFE outputs, e.g., y(n−1), y(n−2), y(n−3), y(n−4) and y(n−5). Thus, in this example, the 32 precomputed sliced bit values Ki(n) may be based on the 5 immediately previous DFE outputs, such as y(n−1), y(n−2), y(n−3, y(n−4), y(n−5). In an example embodiment, mux 680 in FIG. 6c could simply select one of the sliced bit values Ki(n) based on the 5 immediately previous DFE outputs y(n−1), y(n−2), y(n−3, y(n−4), y(n−5). However, this may require a fairly strict clocking or timing requirement, since the previous output (y(n−1)) must be available to select the sliced bit value K for the next clock cycle (n).

In another example embodiment, through DFE unrolling, as shown in FIG. 6c, the current DFE output y(n) may be selected based on a group of non-adjacent previous DFE outputs. This may further relax or loosen the clocking or timing requirements, (e.g., which may allow operating the DFE at a slower clock rate).

For example, In a DFE without reordering (or without unrolling the DFE), the DFE output y[n] is typically dependent on an adjacent group of previous outputs, y[n−1], y[n−2], y[n−3], y[n−4] for a 4 tap DFE.

If the DFE is reordered and/or unrolled, the DFE will have a DFE output y[n] dependent on a non-adjacent group of previous outputs, such as y[n−2], y[n−3], y[n−4], y[n−5] for a 4 tap DFE, so that the immediately previous (or adjacent) DFE output y[n−1] is not needed to generate y[n].

The DFE may be further unrolled, so that y[n] can be dependent on y[n−8], y[n−9], y[n−10], y[n−11], which makes it easier on timing to provide y[n−8] to generate y[n] compared to providing y[n−1].

For example, based on mathematical properties, the current DFE output, Y(n), can be written as a function of the current sliced bits values Ki(n) and the adjacent group of DFE outputs (y(n−1), y(n−2), y(n−3), y(n−4), y(n−5)).

$$Y(n)=K0(n)\overline{(Y(n-1)Y(n-2)Y(n-3)Y(n-4)Y(n-5))}+K1(n)\overline{(Y(n-1)Y(n-2)Y(n-3)Y(n-4)Y(n-5))}+\ldots+K31(n)(Y(n-1)Y(n-2)Y(n-3)Y(n-4)Y(n-5))$$

And Y(n−1) may be determined as $$Y(n-1)=K0(n-1)\overline{(Y(n-2)Y(n-3)Y(n-4)Y(n-5)Y(n-6))}+K1(n-1)\overline{(Y(n-2)Y(n-3)Y(n-4)Y(n-5)Y(n-6))}+\ldots+K31(n-1)(Y(n-2)Y(n-3)Y(n-4)Y(n-5)Y(n-6))$$

Then substituting Y(n−1) into Y(n) we will get Y(n) as a function of a non-adjacent group of DFE outputs, such as a function of: Y(n−2)Y(n−3) ... Y(n−6). An adjacent group of DFE outputs or bits may be a group of previous DFE outputs adjacent to or starting in the next previous cycle, such as a group that includes Y(n−1), Y(n−2), Y(n−3), etc. A group of non-adjacent bits or DFE outputs may include a group of DFE outputs where a closest DFE output in the group is two or more cycles or bits away from Y(n). Thus, a gap of two or more cycles or DFE outputs is typically present between the current DFE output Y(n) and a group of non-adjacent DFE outputs, such as Y(n−2), Y(n−3) ... , or Y(n−8), Y(n−9), Y(n−10), ... .

This process of substitution and calculation may be repeated until Y(n) is obtained as a function of a more distant (eight cycles or DFE outputs ago) non-adjacent group of DFE outputs: Y(n−8)Y(n−9) ... Y(n−13). This may allow more relaxed timing requirements for operation of the DFE.

Referring to FIG. 6c, a plurality of reorder blocks 672 may each provide successively delayed or previous versions of the sliced bits values Ki(j). For example, the reorder block 672(1)

may receive 32 inputs including previous sliced bit values K0($n$–1) ... K31($n$–1). The pre-computed or current sliced bit values K0($n$) ... K31($n$) are provided in numerical order, e.g., going top to bottom, and corresponding to DFE coefficients F(00000) ... F(11111), respectively, as output from slicers 662. However, reorder block 672(1) may reorder the arrangement of the current sliced bit values K0($n$–1) ... K31($n$–1) based on one or more previous sliced bit values (e.g., K0($n$–1)-K31($n$–1)). Mux 680 may select one of the reordered sliced bit values in one of the reorder blocks 672 based on the inputs to the mux 680. This may allow a current DFE output Y(n) to be selected based on one or more previous (or even non-adjacent) DFE outputs, for example, which may allow relaxation in the timing requirements for the DFE.

For example, mux 680 may select one of the reordered sliced bit values from a last reorder block 672, based on a plurality (or group) of non-adjacent DFE outputs Y used as selection values, e.g., Y(n–8), Y(n–9), ... Y(n–13), for example. Each successive reordering block 672(1), 672(2), ... may include a set of the next previous sliced bit values. Each reorder block may reorder the received set of sliced bit values based on equations or mathematical properties (e.g., that describe the relationship between adjacent sliced bit values), to allow mux 680 to select the current DFE output Y(n) based not on current DFE outputs (Y(n)), or even an adjacent DFE output (e.g., Y(n–1), but based on one or more non-adjacent DFE outputs, such as Y(n–2), Y(n–3), ... ), for example.

A simple example may be a two tap DFE, with four possible sliced bit values K0($n$), K1($n$), K2($n$) and K3($n$), where the sliced bit values Ki(n) are selected based on two previous (non-adjacent) DFE outputs Y(n–2), Y(n–3). In this simple example, Y(n) may be represented by the following equation, with + being OR (or Mux), and * indicating inversion or NOT operator.

$$Y(n)=K0(n)(Y(n-1)*Y(n-2)*+ \ldots +K3(n)Y(n-2)Y(n-3)).$$

Likewise, Y(n–1) may be represented by the following equation:

$$Y(n-1)=K0(n-1)(Y(n-2)*Y(n-3)*+ \ldots +K3(n-1)(Y(n-2)Y(n-3)).$$

Substituting the equation for Y(n–1) into the equation for Y(n) results in the following equation for Y(n) expressed in terms of Y(n–2), Y(n–3):

$$Y(n)=(K0(n)(K0(n-1)*+K2(n)K0(n-1))(Y(n-2)*Y(n-3)*)+$$

$$(K0(n)(K1(n-1)*+K2(n)K1(n-1))(Y(n-2)*Y(n-3))+$$

$$(K1(n)(K2(n-1)*+K3(n)K2(n-1))(Y(n-2)Y(n-3)*)+$$

$$(K1(n)(K3(n-1)*+K3(n)K3(n-1))(Y(n-2)Y(n-3)).$$

Thus, based on this equation, Y(n) may be represented as a function of (or based on) a group of non-adjacent sliced bit values, such as Y(n–2) and Y(n–3). Non-adjacent may refer to bit values that are not in an adjacent cycle (or clock cycle), such as n, n–1. For example, Y(n–2) and Y(n–3) are not adjacent to Y(n) since two or more cycles separate these bit values.

Figure 6G:
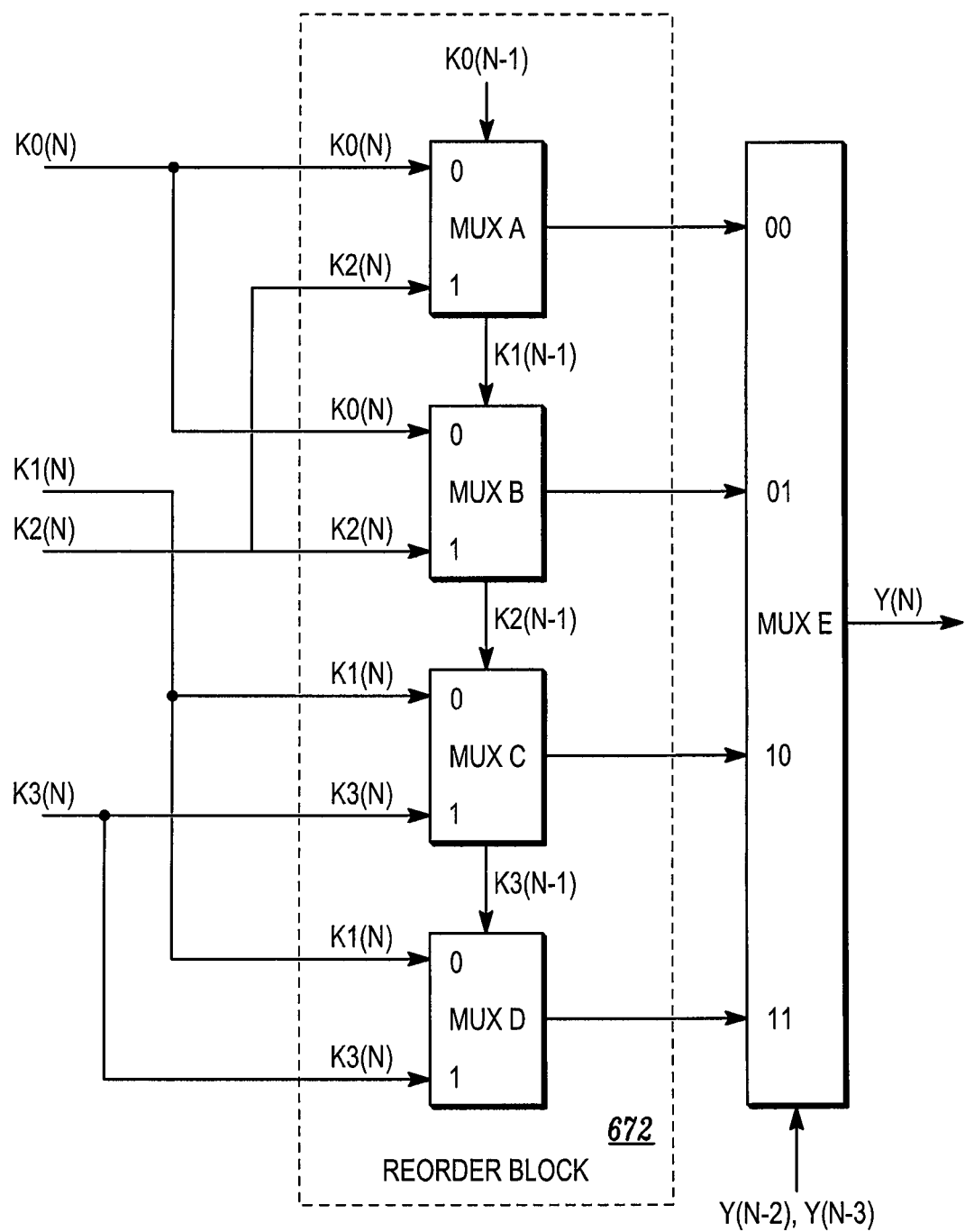
FIG. 6g is a diagram illustrating operation of a reorder block according to an example embodiment.

FIG. 6g is a diagram illustrating operation of a reorder block according to an example embodiment. Four current sliced bit values K0($n$), K1($n$), K2($n$), K3($n$) are input to reorder block 672. Reorder block 672 includes four muxes, including mux A, mux B, mux C and mux D. Mux A may select either K0($n$) o K2($n$) based on the select input, K0($n$–1). Thus, if K0($n$–1) is a 0, then mux A outputs K0($n$); and if K0($n$–1) is a 1, then mux A outputs K2($n$). The output from mux A corresponds to location 00, as shown by mux E. Thus, the sliced bit value for location 00 (of mux E) may be changed or reordered based on the previous sliced bit value K0($n$–1), e.g., to be either K0($n$) or K2($n$). The other muxes B, C and D operate in a similar fashion and may reorder the current sliced bit values (e.g., by selecting a different sliced bit value K for output) based on one or more previous sliced bit values, for example.

Mux E in FIG. 6g receives the four outputs from muxes A, B, C and D, and selects one of the inputs to be output based on the select signals, that include a two-bit value that includes a group of non-adjacent (with respect to the current DFE output, Y(n)) DFE outputs, Y(n–2), Y(n–3).

The other reorder blocks 672(2), 672(3), ... 672(6) in FIG. 6c may similarly reorder their received sliced bit values based on previous sliced bit values. The reorder blocks are provided in series, and may output their reordered sliced bit values to the next reorder block, where the sliced bit values may again be reordered. This may allow mux 680 to select the current DFE output Y(n) based on one or more non-adjacent DFE outputs, e.g., Y(n–8), Y(n–9), ... Y(n–13), although any number of selector bits may be used.

FIG. 6d is a diagram illustrating a parallel decision feedback equalizer (DFE) according to another example embodiment. In this example, a 16× parallel, 5 tap, 7 stage look ahead DFE is illustrated. It has 16 DFE blocks operating in parallel, including DFE block 698(1) to output Y(n), DFE block 698(2) to output DFE output Y(n–1), ... and DFE block 698(16) to output a DFE output Y(n–15), although any size DFE may be used. Each of the DFE blocks 698( ) of FIG. 6d may have a similar structure and operation to the DFE block 698 in FIG. 6c.

The DFE in FIG. 6d is 7 stage since there are 7 reorder blocks for each DFE block. Each DFE block may operate on a different set of DFE input values, e.g., x(n), x(n–1), ... x(n–15), and generating a different set of sliced bit values K( ). The DFE inputs x(n), set of sliced bit values output from slicers K( ), the K inputs to each reorder block, and the Y inputs to the mux for selection, may be offset by one cycle for each successive reorder block. Each DFE block 698 may also output a delayed set of sliced bit values, e.g., KD0($n$)–KD31($n$), which may be used as inputs to reorder blocks, if offset by one cycle.

The last or 7$^{th}$ reorder block in each DFE block may reorder the current sliced bit values K0($n$)–K31($n$) based on one or more previous sliced bit values K0($n$–7)–K31($n$–7). Note that this total reordering of sliced bit values K(n) at the last reorder block may also be a function of the reordering that was performed by earlier reorder blocks (and hence based on other previous sliced bit values). Thus, in an example embodiment, the mux for each DFE block 698 may select as a current DFE output Y(n) one of the reordered sliced bit values K0($n$)–K31($n$) from the last reorder block based on a group of non-adjacent DFE outputs (e.g., Y(n–8), Y(n–9) ... ).

As described above with respect to FIG. 6b and, a DFE may, for example, receive an FFE output and subtract a DFE coefficient to provide a soft value or modified bit value. The DFE coefficient may be based on one or more previous DFE output bits. The modified bit value may typically be sliced to a sliced bit value, which may typically be a high or low value, such as +1 or –1.

However, due to high clock rates, in some cases, a previous bit value may not be known at the time the current DFE output is generated. Therefore, to increase performance, or to allow a more relaxed timing requirement, one tap (or one or more taps) of immediate feedback equalization may be added to the DFE. This may be accomplished through loop unrolling and may avoid the bottleneck in the latency of the feedback loop. This may allow a DFE to determine two output bits per clock cycle, e.g., to determine a current DFE output y(n) and a previous DFE output y(n−1) in one clock cycle, for example.

FIG. 6e is a diagram illustrating a non-linear, unrolled decision feedback equalizer (DFE) according to an example embodiment. Referring to FIG. 6e, an FFE 1202 (similar, for example, to interleaved FFE 424 of FIG. 4), may output a soft value which may typically have been equalized or otherwise operated upon to remove pre-cursor ISI. DFE 1204 may operate to reduce post-cursor ISI, for example, by calculating a factor by which to modify a current value of the soft value, based on one or more previous, equalized bit values and/or an error level associated with the bit values. Thus, as shown, the decision feedback equalizer 1204a may receive an output (or soft value) from FFE 1202. The DFE 1204a may receive the soft value from the FFE 1202 and may associate each soft value with either an expected high value or low value. A summation of the soft value(s) of the FFE output and an appropriate DFE threshold (e.g., f1 or −f2) associated with previously sliced bits may generally have values within a range that is associated with the expected high value and the expected low value. For example, the range may be from approximately −1 to 1.

DFE 1204a may include comparators 1502 and 1504, each associated, respectively, with a DFE threshold f1 and −f2 (DFE thresholds may also be referred to as a DFE coefficient). A selector 1506 may be used to select between the outputs of these two comparators 1502, 1504, based on one or more previous bits of the DFE 1204a (as reported to the selector 1506 from the delay 1206). Thus, the selector 1506 may select an output of either comparator 1502 or 1504 based on one or more previous bits output by selector 1506.

Comparators 1502 and 1504 each have two inputs, including a soft value output from FFE 1202, and a respective DFE threshold f1 or −f2. The threshold f1, which may be a positive value, such as +1 (or other value), is input to comparator 1502. Threshold −f2, which may be a negative value, such as −1 (or other value) is input to comparator 1504. In an example embodiment, a threshold input (f1 or −f2) to the DFE 1204a may be determined based on a summation of the FFE soft values and a DFE threshold value f1 or −f2 that was used to determine the previous bit(s).

In an example embodiment, comparator 1502 may compare the FFE output or soft value to the DFE threshold f1. If the soft value is greater than or equal to the DFE threshold, then comparator output will be 1, and otherwise will be zero (0). Similarly, comparator 1504 will output a 1 if FFE output or the FFE soft value is greater than or equal to −f2, and otherwise is 0. This comparison between FFE output (soft value) and a DFE threshold or DFE coefficient is very similar to the operation shown in FIGS. 6c and 6d, for example. In FIG. 6c, a DFE block 652 sums or subtracts the FFE output (X) with the DFE coefficient F( ). A slicer, which basically operates as a comparator, slices this difference to a +1 or −1. Thus, the difference of X−F (FIGS. 6c, 6d) is compared to zero or sliced to a value, is very similar, as that shown in FIG. 6d where the two values (FFE output and DFE threshold fi) are compared via a comparator (1502 or 1504).

The FFE output or soft value may be input (as an upper input) to comparators 1502 and 1504. A first threshold f1 is a lower input into comparator 1502, and a second threshold −f2 is a lower input to comparator 1504. As noted, first threshold f1 may be a positive number, such as +1, and second threshold −f2 may be a negative number, such as −1, as examples. Comparators 1502 and 1504 may output a high (e.g., +1) if the upper input is greater than or equal to the lower input, and may output a low (e.g, 0) if the lower input is greater than the upper input, for example.

Therefore, DFE 1204a may precompute the current DFE output y(n) for both possibilities for the previous selected bit y(n−1). The output of comparator 1502 is the current bit (e.g., current sliced bit or DFE output) y(n) if the previous bit y(n−1)=1; and the output of comparator 1504 is the current bit (or DFE output) if the previous bit y(n−1)=0. In other words, if the previous selected bit (output by delay 1206) is a 1, then the output from the current bit y(n) is taken or received from comparator 1502; otherwise, if the previous selected bit (output by delay 1206) is a 0, then the current bit is taken or received from comparator 1504, for example.

Here is an example:

Transmit bits=1010011110

After AC coupling (mapping 0→−1, and 1→1), the input to DFE 1204a may be shown as: x=1 −1 1 −1 −1 1 1 1 1 −1.

After channel of [11], where current bit is sum of current and prvious bit due to ISI: channel_out=1 0 0 0 −2 0 2 2 2 0.

With f1=+1, and f2=−1, the output of the two comparators are:

1502 out→1 0 0 0 0 0 1 1 1 0
1504 out→1 1 1 1 0 1 1 1 1 1

The selector 1506 may be initialized to 0. The top comparator 1502 or the bottom comparator 1504 is selected for output, based on previous selector output:

Thus, the output of selector 1506 is: 1 0 1 0 0 1 1 1 1 0

An error calculator 1218a may determine an error separately for each of the comparators 1502 and 1504. An error may be calculated based on the current selected bit y(n) output by selector 1506 and the modified bit value input to DFE 1204a. Thus, an error may be calculated based on the current selected bit y(n), the FFE output, and the threshold used for the current bit, e.g., f1 if the previous bit is a 1, and −f2 if the current bit was 0 or −1. The error may be represented as: DFE error=y(n)−FFE_out(n)−fi(n), where fi(n)=f1 if previous bit was a 1, and fi(n)=−f2 if previous bit was a −1 (or 0).

A DFE threshold adjuster 1508 may be configured to dynamically adjust the DFE thresholds f1, −f2 independently. The magnitude of DFE thresholds f1 and −f2 may be different. In an example embodiment, the first DFE threshold f1 and the second DFE threshold −f2 may each be a non-linear combination of one or more previous outputs of selector 1506 (or a non-linear combination of one or more DFE outputs, as selected, and delayed by delay 1206).

In an example embodiment, the following may describe how an updated threshold may be adjusted, based on the previous threshold (of the same type) and the error associated with the corresponding comparator.

f1new=f1old+u*DFE error, where u is a number typically less than 1, and the DFE error is the DFE error for the first threshold f1. A similar equation may be provided to adjust or update the second DFE threshold f2, as f2new=f2old+u*DFE error. An adaptive algorithm, such as LMS, may be used to adapt the DFE thresholds.

As will be appreciated, one or more delay elements 1206 (or similar delay element(s)) may be used to provide the previous, equalized bit values to the DFE for use in modifying the current soft value to reduce post-cursor ISI therein.

As noted above, a signal-to-noise (SNR) monitor 498 is illustrated in FIG. 4 that represents any suitable technique for detecting performance levels or characteristics of the EDC system 140. In another example embodiment, the error for the DFE, as described above, may also be a suitable metric for controlling or triggering a number of different events in EDC system 140, since the DFE threshold may, at least in some cases, provide a reliable and measurable metric relating to noise or other performance measurement. For example, if the DFE error exceeds a threshold, then the EDC system 140 may be returned to a start-up state for recalibration of various settings of the EDC system, as described in more detail herein, e.g., with respect to the start-up state machine 126 and with respect to FIG. 11.

While the DFE shown in FIG. 6e is for only one tap, a similar DFE may be provided for multiple taps. For example, for a two tap unrolled, non-linear DFE, four different thresholds and four comparators may be used, and the DFE may still select and output one bit for y(n). In the 2 tap DFE, the two previous selected bits output from selector 1506 (y(n−1), y(n−2) may be used to select the one of four comparators for output.

Figure 7A:
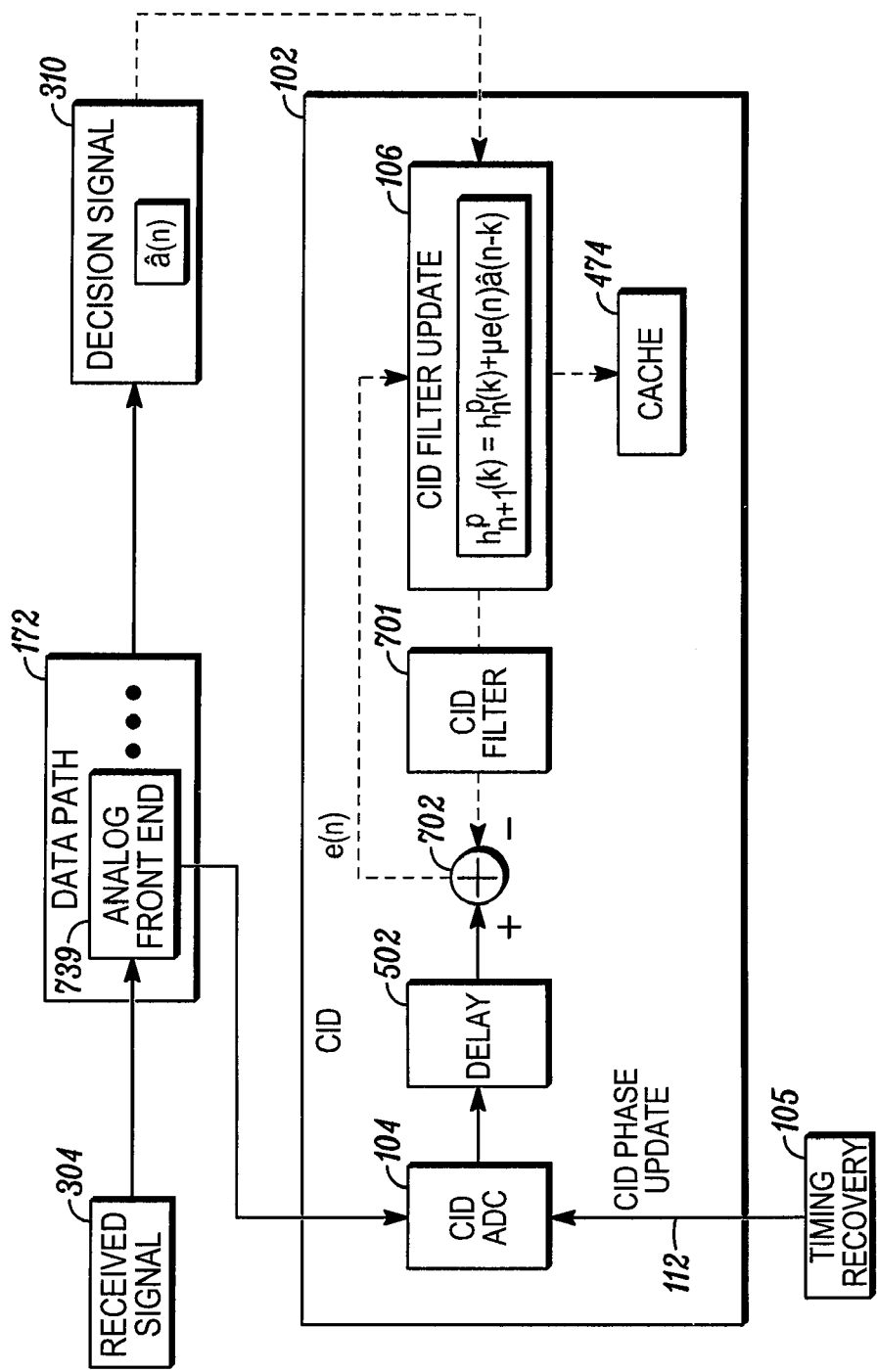
FIG. 7a depicts an operation of a channel identification filter update block according to one embodiment.
Figure 7B:
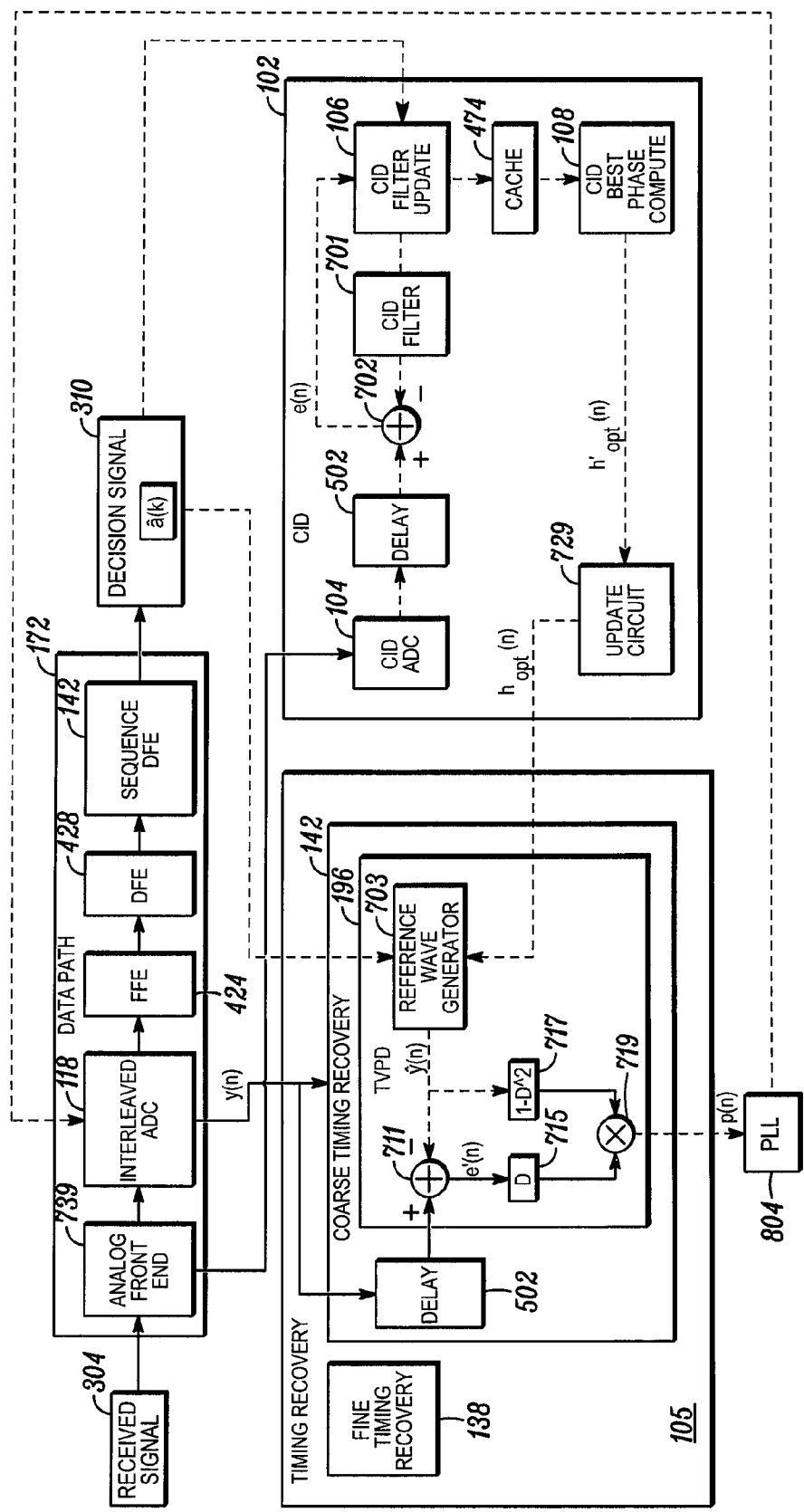
FIG. 7b depicts an operation of a channel identification block to determine channel characteristic information for assisting a timing recovery operation according to one embodiment.

FIG. 7a depicts a partial operation of a CID filter update block 106 according to one embodiment. A more detailed example of a timing recovery and channel identification operation(s) is provided below, with respect to FIGS. 7b and 7c. In FIG. 7a, the CID filter update block 106 may be included within a TVPD 196 or CID 102 and may perform an update of an estimated channel characteristic for a communication channel 182. As noted above, the channel characteristic may be an impulse response for the communication channel 182. The CID filter update block 106 may calculate a plurality of channel characteristics for a plurality of different sampling phases for the communication channel 182. Thus, for example, in the case where the channel characteristic is an impulse response, the CID filter update may compute a plurality of estimated channel impulse responses parameterized by a phase parameter (p) and an iteration parameter (n), $h_n^P(k)$. As described below, a CID best phase compute block 108 may compute a best phase channel characteristic from the plurality of channel characteristics, which may be utilized to provide a timing recovery assist signal to a timing recovery block 105 to assist in timing recovery (not shown in FIG. 7).

The CID filter update block 106 may update a next iteration of the estimated channel impulse response for a given phase $h_{n+1}^P(k)$ by computing an error signal e(n). The error signal e(n) may be computed by taking a difference between the sampled received signal 304 and the decision signal â(n) 310 after processing by the CID filter 701. For example, the CID filter update block 106 may provides coefficients "h" for each phase $h_{n+1}^P(k)$ to the CID filter 701, for generation thereby of a waveform for comparison to the delayed output of the CID ADC 104, as shown, and subsequent determination of e(n).

Referring again to FIG. 7a, a received signal 304 may be provided to a data path 172 (described above with respect to FIGS. 3a, 3b and 4). After processing via the data path 172, a decision signal â(n) 310 may be rendered. As noted above with respect to FIG. 4, the data path 172 may render a plurality of decision signals, wherein only a subset of the decision signals are selected for routing to a CID block 102, for example via a multiplexer or router. This may be possible due to the fact that the CID block may operate at a lower clock rate than the baud rate. The decision signal(s) 310 may then be provided to a CID filter update block 106 at a CID block 102.

As shown in FIG. 7a, the received signal 304 may also be provided to a CID ADC 104, which performs analog to digital conversion on the received signal. The CID ADC 104 may operate at a clock rate sufficient to perform tracking of the time varying nature of a channel characteristic. According to one embodiment, for example, the CID ADC 104 may operate at 10 MHz. The timing recovery block 105 may provide a CID phase update signal 112 to the CID ADC 104 to control the sampling phase of the CID ADC 104. The timing recovery block 105 may update the CID phase update signal 112 on a periodic basis. According to one embodiment, the CID block 102 may compute estimated channel impulse responses for 16 different phases $h_{n+1}^P(k)$.

After sampling by the CID ADC 104, a sampled version of the received signal may be provided to a delay block 502. The delay block may be necessary to compensate for delay of the received signal 304 through the data path 172. The delayed version of the sampled version the received signal 304 may then be provided to a summation block 702, which may compute the difference of the sampled and delayed received signal 304 and the output of the CID filter 701 to generate an error signal e(n). The error signal e(n) may then be provided to the CID filter update block 106 for processing a subsequent iteration of the estimated channel impulse response.

According to one embodiment, the CID filter update block 106 may calculate a next iteration $h_{n+1}^P(k)$ of the estimated channel impulse response utilizing the decision signal â(n), the error signal e(n), a previous iteration of the estimated channel impulse response $h_n^P(k)$ and a parameter μ. According to one embodiment the CID filter update block 106 may compute a next iteration of the estimated channel impulse response utilizing the relation:

$$h_{n+1}^P(k) = h_n^P(k) + \mu e(n) \hat{a}(n-k)$$

FIG. 7b depicts an operation of a CID block to determine channel characteristic information for assisting a timing recovery operation according to one embodiment. In general, the optimal estimated impulse response $h_{opt}(n)$ and the decision signal may be utilized by a reference wave generatore 703 to regenerate an estimate of the received signal y(n) which may serve as a timing recovery assist signal ŷ(n). The timing recovery assist signal ŷ(n) 312 may be provided to assist in a timing recovery operation. In particular, the coarse timing recovery block 142 in the timing recovery block 105 may receive the timing recovery assist signal y(n) 312 and utilize the timing recovery assist signal 312 in a Mueller-Muller algorithm to perform timing recovery operations such that a phase signal p(n) is generated to drive a PLL 804 controlling a sampling phase of an interleaved ADC 118.

Although FIG. 7b, ascribes particular functional blocks to perform certain functions and/or operations, it will be understood by skilled practitioners that this is merely exemplary. The utilization of a channel characteristic (e.g., an estimated impulse response of a communication channel) to assist and/or perform timing recovery operations for a communication system may be performed by a single functional unit or multiple function units. Furthermore, the operations ascribed to the TVPD 196 may be performed in fact by a CID block 102 rather than by a timing recovery block 105. As another example, the CID filter 701 may be performed by the same or similar block as the reference wave generatore 703.

According to an exemplary embodiment, a CID block 102 may in include a CID ADC 104, a delay 502, a summation block 702, a CID filter update block 106, a cache 474 and an update circuit 729. A received signal 304 is provided to a data path 172 including an analog front end 739, an interleaved ADC 118, an FFE 424, a DFE 428 and a sequence DFE 142 in a signal processing system 140. The analog front end 739 may perform analog processing on the received signal 304 including amplitude adjustment of the received signal. The output of the analog front end 739 may be provided to a CID ADC 104 in the CID 102. The CID ADC 104 may perform analog to digital conversion of the output of the analog front end 739. The CID ADC 104 may operate at a data rate significantly lower than the baud rate.

The output of the analog front end 739 may also be provided to an interleaved ADC 118, followed by an interleaved FFE 424, an interleaved DFE 429 and a sequence DFE 142. The sequence DFE 142 may output a decision signal 310, which may be provided to a CID filter update block 106 in the CID 102 and the reference wave generator 703. The operation of a CID filter update block 106 has already been described with respect to FIG. 7a. That is, after analog to digital conversion is completed by CID ADC 104, the output of the CID ADC 104 may be provided to a delay 502. The output of delay 502 may be provided to a summation block 702 where a difference signal (e(n)) is computed with the output of the CID filter update block 106, which may then be provided back to the CID filter update block 106 and thus to the CID filter 701.

The CID 102 may also include a cache 474. The updated estimated channel impulse responses as calculated by the CID filter update block 106 may be provided to and stored in the cache 474. As described in more detail below, the cached estimated channel responses parameterized by a phase parameter (p) may be analyzed periodically by a best phase compute block 108, which may compute an optimal estimated channel impulse response (i.e., best phase) utilizing a predefined metric.

The optimal estimated channel impulse response ($h'_{opt}(n)$) may be provided to the update circuit 729 (described in detail below with respect to FIG. 7c), and thus to the reference wave generator 703 within the TVPD 196, as shown. The TVPD 196 may thus utilize the optimal estimated channel impulse response $h_{opt}(n)$ to perform a TVPD operation in order to generate a timing recovery assist signal ($\hat{y}(n)$) 312, which it may provide to assist in timing recovery operations. In particular, the TVPD 196 also may receive the decision signal 310 and may utilize the decision signal 310 to generate a reconstructed or regenerated version of the received signal y(n) using the current estimated optimal impulse response $h_{opt}(n)$. The regenerated version of the receive signal $\hat{y}(n)$ may serve as a timing recovery assist signal that may be provided to a timing recovery block 105 to be used for a timing recovery operation. According to one embodiment, the timing recovery assist signal $\hat{y}(n)$ 312 may be computed as a convolution of the current optimal estimated impulse response $h_{opt}(n)$ and the decision signal 310 according to:

$$\hat{y}(n) = \sum_j h_{opt}(j)\hat{a}(n-j)$$

Upon receiving the timing recovery assist signal 310, the timing recovery block 105 may perform a timing recovery operation utilizing the Mueller-Muller algorithm. In particular, the timing recovery block 105 may compute a slope of the regenerated waveform $\hat{y}(n)$ and multiply this slope with the error between the actual data received by a data ADC y(n) and the regenerated waveform $\hat{y}(n)$. In order to perform this operation, the timing recovery block may include a plurality of delay elements to align the actual data signal and the regenerated signals. Referring to FIG. 7b, the timing recovery block 105 may include a coarse timing recovery block 142. The coarse timing recovery block 142 may generate a phase signal p(n) for controlling the overall sampling phase of the ADCs comprising the interleaved ADC 118 (described in detail below).

The coarse timing recovery block may include a delay block 502, a summation block 711, a first delay element 715, a second delay element 717 and a multiplication block 719. At least one output from the plurality of ADCs comprising the interleaved ADC 118 may be provided to a delay 502 in the coarse timing recovery block 142 in order that it may be aligned with the reconstructed signal $\hat{y}(n)$. The output of the delay 502 may be provided to a summation block 711 where it is combined with the timing recovery assist signal $\hat{y}(n)$ 312 to produce a difference signal e'(n). The difference signal e'(n) may be computed as:

$$e'(n) = y(n-k) - \hat{y}(n)$$

The difference signal e'(n) may be provided to a delay element 715, which generates a one sample delayed version of the error signal e(n-1), which may be provided to a multiplication block 719. The timing recovery assist signal $\hat{y}(n)$ 312, may also be provided to a second delay element 717, which may generate a copy of the timing recovery assist signal $\hat{y}(n)$ 312 and a delayed version of the timing recovery assist signal $\hat{y}(n)$ 312 delayed by two samples. The outputs of the first and second delay elements 715 and 717 may be provided to a multiplication block 719, which multiples the two signals to generate a phase signal p(n) as output. Thus, the phase signal p(n) may be computed as the multiplication of the error signal e'n and the slope of the (regenerated) waveform.

$$p(n) = e'(n) * [\hat{y}(n-1) - \hat{y}(n+1)]$$

In other words, it may be understood from the above explanation that $\hat{y}(n)$ represents the convolution of the computed impulse response to the decision of the DFE (or sequence DFE), and thus the expected value of y(n) assuming the impulse response is valid. Consequently the error signal e'(n) multiplied by the slope of the regenerated waveform $\hat{y}(n)$ as represented by $[\hat{y}(n-1)-\hat{y}(n+1)]$, and according to the Mueller Muller algorithm, results in the phase signal p(n). The phase signal p(n) may be provided to a PLL 804, which is utilized to control the sampling phase of the interleaved ADCs comprising the interleaved ADC block 118.

Figure 7C:
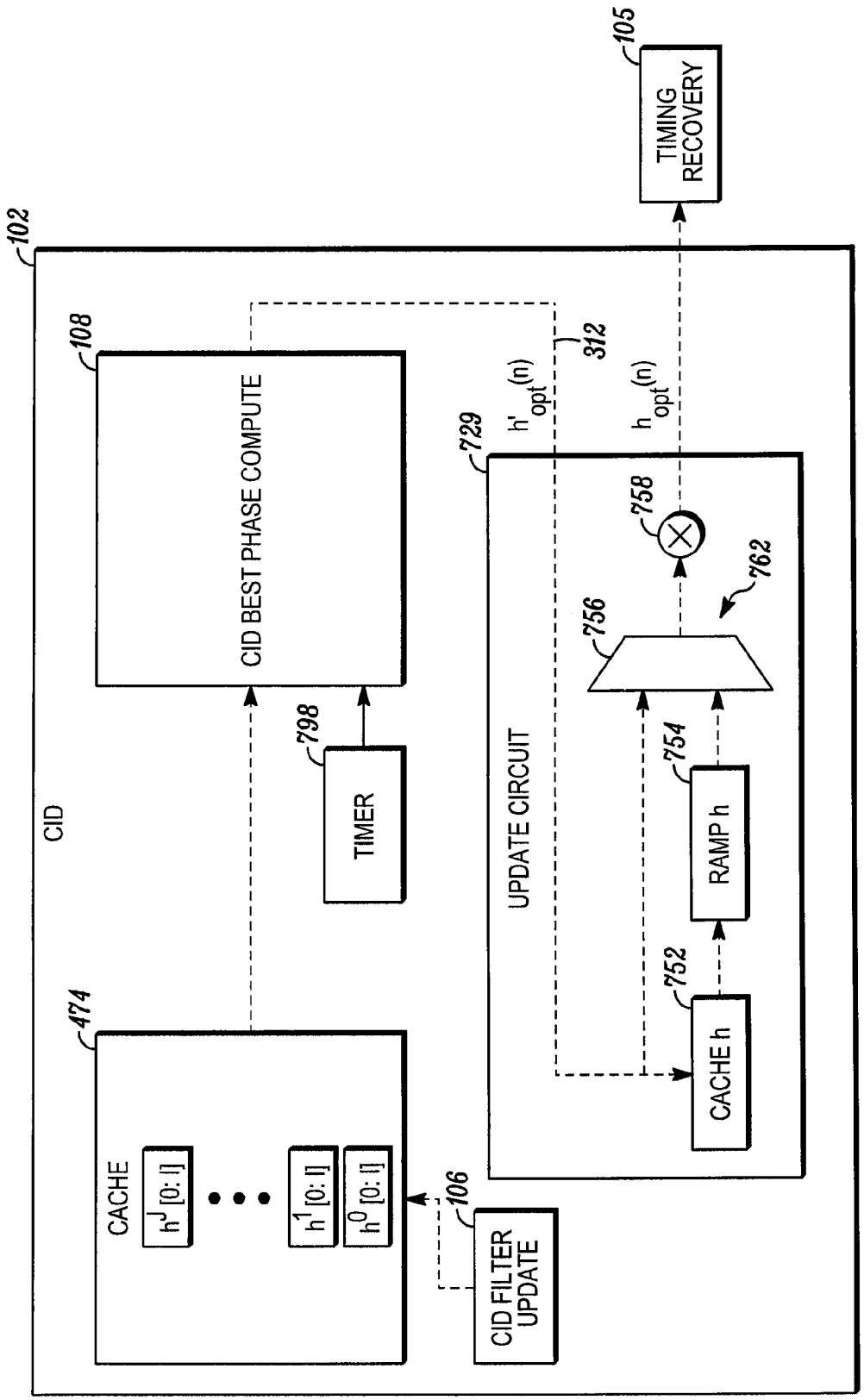
FIG. 7c depicts an operation of a best phase compute block according to one embodiment.

FIG. 7c depicts an operation of a best phase compute block according to one embodiment. The best phase compute block 108 may be included within a CID block 102 and may determine an optimal estimated impulse channel characteristic $h'_{opt}(n)$ 312 for a plurality of channel characteristics parameterized by a phase. As noted previously, a CID filter update block 106 may store in a cache 474 a plurality of estimated impulse responses $h^0[0:I]-h^i[0:I]$, each of which may be parameterized by a distinct phase from 0–i. According to one embodiment, each estimated impulse response $h^0[0:I]-h^i[0:I]$ stored in the cache may be associated with a plurality of taps, for example i may be 6.

On a periodic basis, a CID best phase compute block 108 may determine an optimal impulse response $h'_{opt}(n)$ from among the plurality of impulse responses $h^0[0:I]-h^i[0:I]$ each associated with a respective phase and stored in cache 474. The CID best phase compute block 108 may attempt to minimize or maximize a particular metric to determine $h'_{opt}(n)$. That is, on a periodic basis the CID best phase compute block 108 may apply a metric to the plurality of impulse response signals $h^0[0:I]-h^i[0:I]$ stored in the cache 474. For example, the CID may include a timer 798. Upon the running of the timer 798, a signal may be sent to the CID best phase compute block 108 to cause the determination of $h'_{opt}(n)$ from $h^0[0:I]-h^i[0:I]$. Upon determination of $h'_{opt}(n)$, the timer may be reset and the process re-initiated. According to one embodiment, the CID best phase compute block 108 utilizes a metric to minimize the ISI energy of the estimated channel impulse response signals relative to a main tap. For example, according to one embodiment the metric to be maximized is (where the first term h(3) is for a main tap and other terms are ISI terms):

$$[h^p(3)]^2-[h^p(2)]^2-[h^p(1)]^2-[h^p(0)]^2-[h^p(4)]^2-[h^p(5)]^2$$

Upon determination of $h'_{opt}(n)$ 312, for example, utilizing the minimum ISI energy metric described above, $h'_{opt}(n)$ may be provided to a TVPD 196 for utilization in a timing recovery assist operation (i.e., to generate a phase signal p(n)) in conjunction with a timing recovery block 105. However, according to one embodiment, before $h'_{opt}(n)$ is provided to the TVPD 196, $h_{opt}(n)$ may be processed by an update circuit 729. It may be desirable because of tracking errors not to update the phase of the TVPD 196 too rapidly. The update circuit 729 may function to cause a slow updating of the $h'_{opt}(n)$ provided to the TVPD 196, where the updated parameter that is provided is shown herein as $h_{opt}(n)$.

The update circuit 729 may include a cache 752, a ramp circuit 754, a multiplexer 756 and a multiplication block 758. $h'_{opt}(n)$ may be provided to a cache 752 which stores a plurality of $h'_{opt}(n)$'s as they are provided by the CID best phase compute block 108. A threshold circuit 756 may at each clocking instant determine difference between the current best phase $h'_{opt}(n)$ and the $h_{opt}(n)$ stored in the cache 752. In particular, the update circuit may function only when the change in $h'_{opt}(n)$ exceeds a certain programmable threshold so as to update the cache This error may be divided by a large value and the divided value may slowly update the $h_{opt}(n)$'s provide into the TVPD 196.

Figure 8:
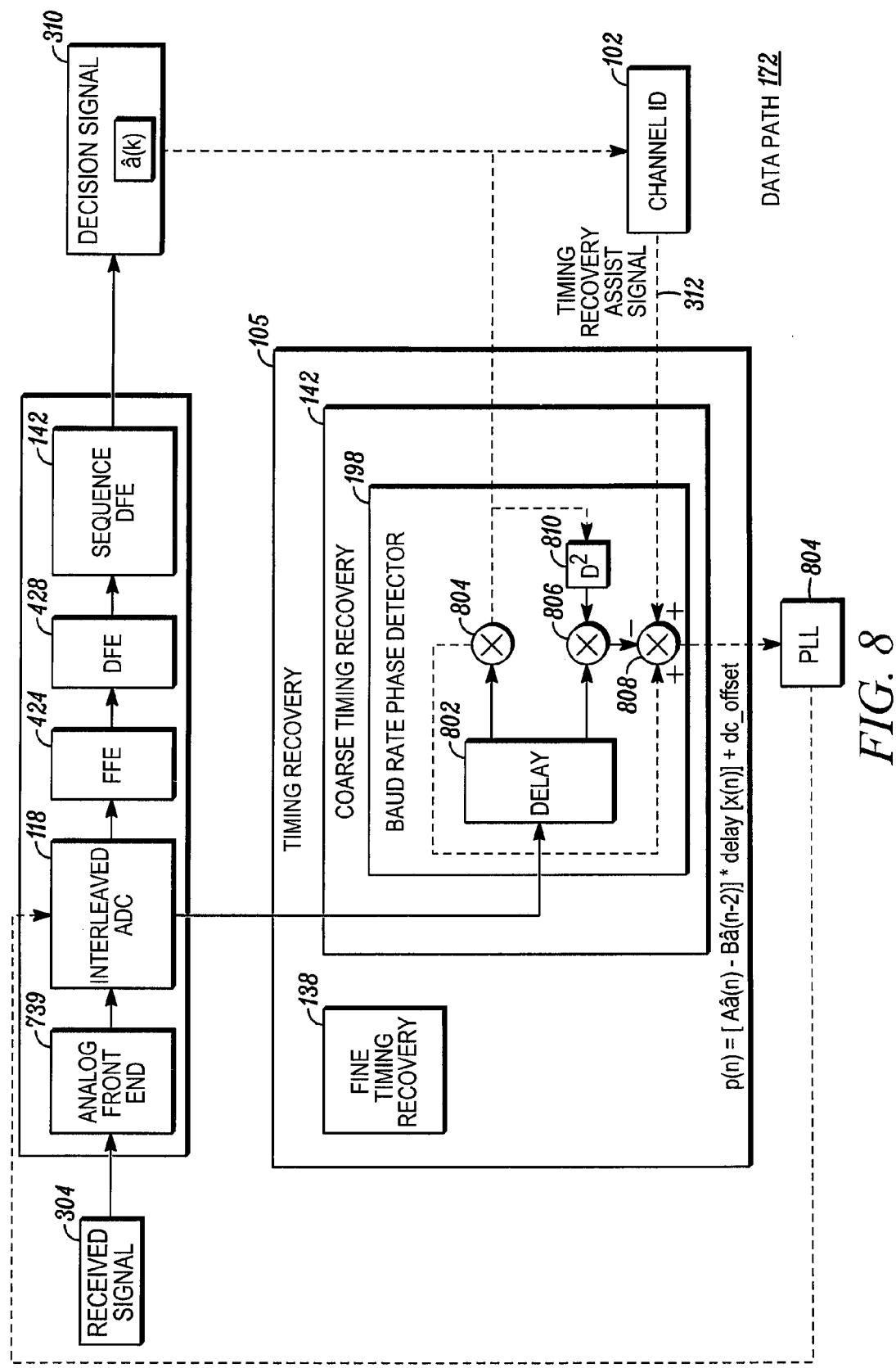
FIG. 8 depicts an operation of a baud rate phase detector.

FIG. 8 depicts an operation of a baud rate phase detector. The signal path shown in FIG. 8 may be operative before an estimated channel impulse response has been determined by the CID 102 (i.e., when the signal processing system 140 is in a startup mode). As shown in FIG. 8, a timing recovery block 105 may include a coarse timing recovery block 142 and a fine timing recovery block 138. The coarse timing recovery block 142 may include a baud rate phase detector 198. The baud rate phase detector may include a delay 802, a first multiplication block 804, a second multiplication block 806, a delay element 810 and a summation block 808.

A received signal 304 may be provided to data path 172 that includes an analog front end 739, an interleaved ADC 118, an interleaved FFE 424, an interleaved DFE 428 and a sequence DFE 142. The received signal 304 may be provided to an analog front end 739, which performs analog signal processing on the received signal. The processed output of the analog front end 739 may then be provided to an interleaved ADC 118, which may perform analog to digital conversion on the processed analog signal. The output of the interleaved ADC 118 may be provided to an interleaved FFE 424. The output of the interleaved FFE 424 may be provided to an interleaved DFE 428. The output of the interleaved DFE 428 may be provided to a sequence DFE 142. The sequence DFE 142 may generate a decision signal â(k) 310. The decision signal â(k) 310 may also be provided to a channel ID block 102, which may generate a timing recovery assist signal 312 herein referred to as the dc_offset signal (that is, the assist signal 312 in start-up mode, which includes at least a dc_offset value).

At least one digital output of the interleaved ADC 118 may be provided to a delay 802 in the baud rate phase detector 198. The decision signal â(k) 310 generated by the sequence DFE 142 may be provided to a first multiplication block 804 and a delay element 810 in the baud rate phase detector 198. The output of the delay 802 may also be provided to the first multiplication element 804, where it is multiplied by the decision signal â(k) 310. Delay element 810 may generate a two sample delayed version of the decision signal â(k) 310, which it may provide to a second multiplication block 806, where the delayed decision signal â(k) 310 may be multiplied by the output of the delay 802. The output of the second multiplication block may then be provided to the summation block 806 where it is combined with the timing recovery assist signal 312 (dc_offset) provided by the channel ID.

The summation block 808 may generate a phase signal p(n) by combining the output of the first multiplication block 804, the second multiplication block 806 utilizing the following relation, where A & B are scalar constants, where this relation may be referred to herein as the dc phase detector relation:

$$p(n)=[Aâ(n)-Bâ(n-2)]*\text{delay}[x(n)]+dc\_\text{offset}$$

Figure 9:
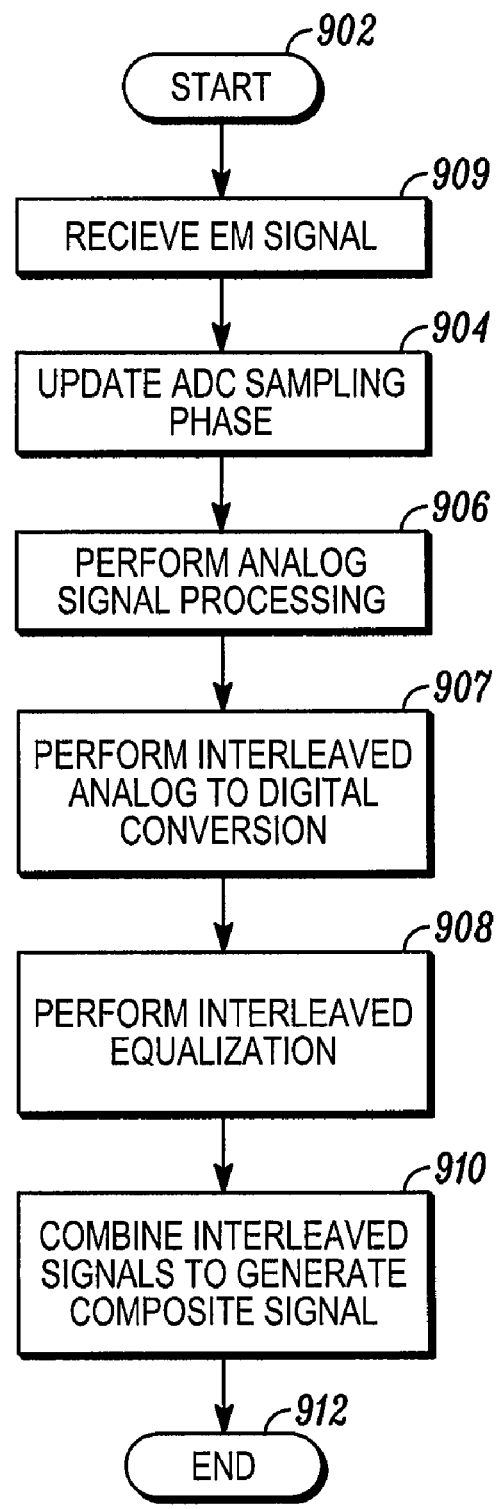
FIG. 9 is a flowchart depicting an operation of a signal processing system according to one embodiment.

FIG. 9 is a flowchart depicting an operation of a signal processing system according to one embodiment. The process is initiated in step 902. In step 909 an electromagnetic signal is received. The electromagnetic signal may be received by a receiver over a communication channel 182. In step 904 a sampling phase of an interleaved ADC may be updated. As described herein, the interleaved ADC may be controlled by a timing recovery operation performed by a baud rate phase detector, a TVPD or a combination thereof. As previously noted, the phase detectors (TVPD or baud rate) may generate a phase signal p(n), which may be provided to a PLL to control a sampling clock of the interleaved ADC. Although FIG. 9 suggests that this step occurs serially, the update of the ADC sampling phase 904 may be occurring in parallel with the other steps depicted in FIG. 9.

In step 906, analog signal processing may be performed on the received signal. According to one embodiment, the analog signal processing may comprise variable gain amplification or other processing. In step 907, analog to digital conversion may be performed on the processed analog signal. According to one embodiment, the analog to digital conversion may be performed in an interleaved fashion using an interleaved ADC. In step 908, digital equalization may be performed on the output of the ADC. According to one embodiment, the equalization may be performed in an interleaved manner using an interleaved equalizer block. According to one embodiment, the interleaved equalizer may include an interleaved FFE, an interleaved DFE and a sequence DFE. In step 910, the interleaved signals provided by the interleaved structures (ADC and equalizers) may be combined to generate a composite signal. The process ends in step 912.

Figure 10:
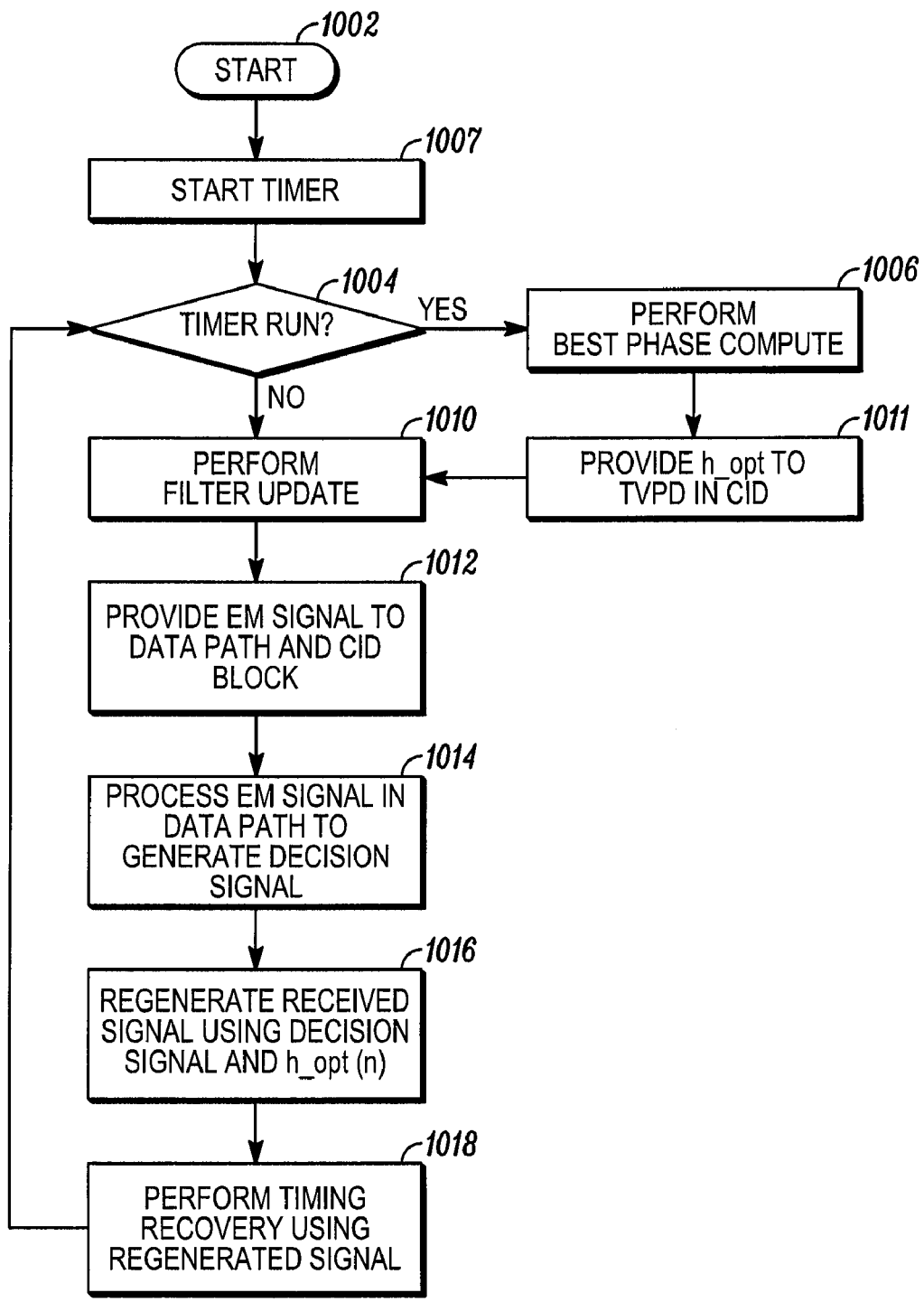
FIG. 10 is a flowchart of an operation performed by a signal processing system according to one embodiment.

FIG. 10 is a flowchart of an operation performed by a signal processing system according to one embodiment. The process shown in FIG. 10 may be executed during a steady state operation of the signal processing system (i.e., after startup operations have been completed). Thus, it is assumed that h_opt(n) has been determined and the system has settled (i.e., the filter routines have converged). The process is initiated in step 1002. In 1007, a timer may be initialized. In 1004, a test is performed to determine whether the timer has run. If not ('no' branch of 1004), in 1010 a filter update is performed. The filter update may be a routine to estimate of an impulse response of a communication channel.

In 1012, a received signal 304 may be provided to both a data path and a CID block of the signal processing system 140. In 1014, the EM signal may be processed by the data path to generate a decision signal 310. In step 1016, a regenerated signal ŷ(n) may be generated using the decision signal 310 to determine the optimal impulse response for the communication channel h_opt(n). According to one embodiment, the regenerated signal may be generated via a TVPD. In 1018, a timing recovery operation may be performed using the regenerated signal ŷ(n). According to one embodiment, the timing recovery operation may utilize a variant of the Mueller-Muller algorithm. Flow then continues with 1004.

If the timer has run ('yes' branch of 1004), in 1006 a best phase compute operation may be performed. The best phase compute operation may determine an optimal estimated impulse response for a communication channel using a pre-defined metric. In 1011, the optimal estimated impulse response may be provided to a TVPD. Flow then continues with 1012.

Figure 11:
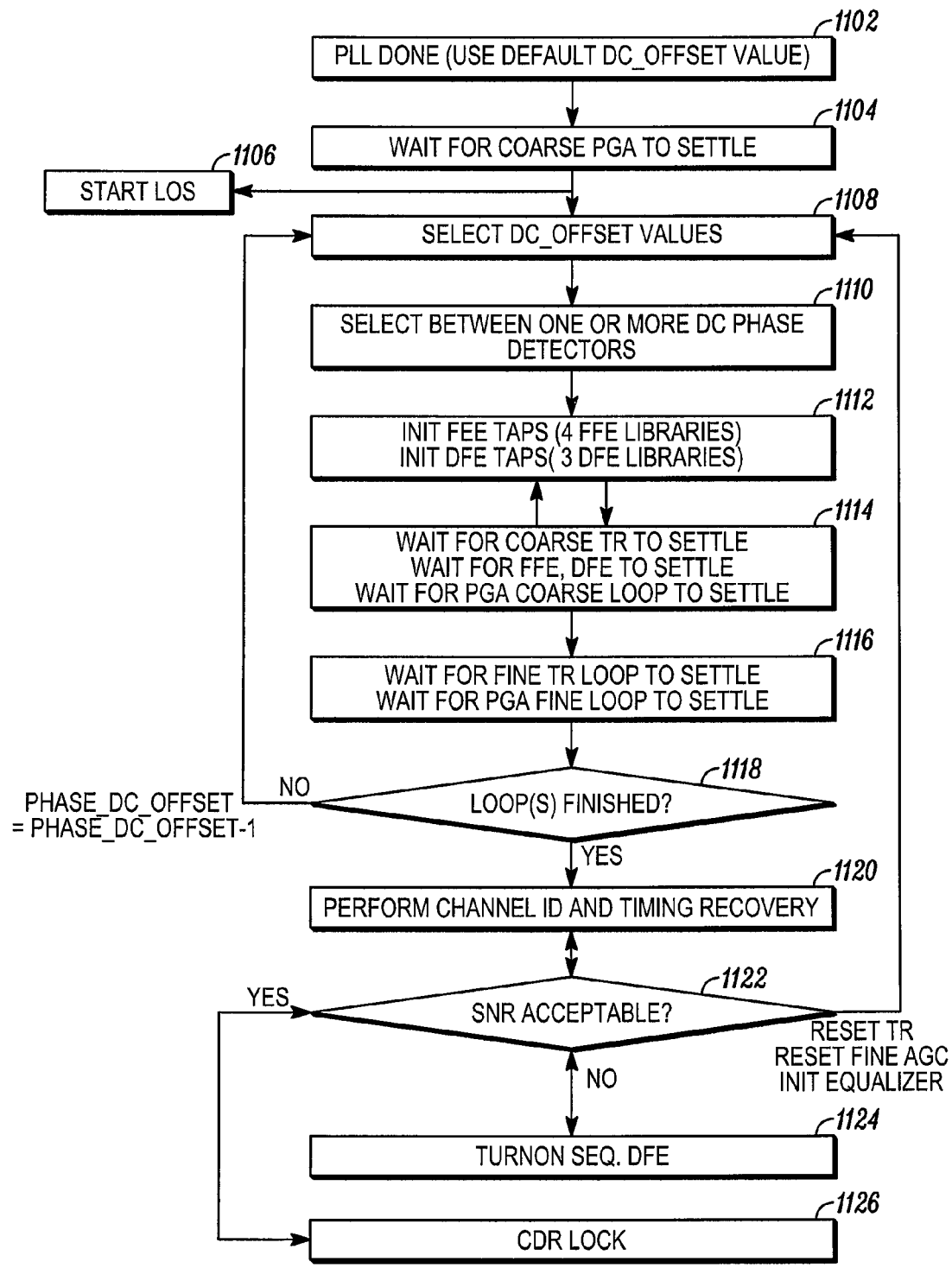
FIG. 11 is a flowchart of an operation performed by a start-up state machine of one embodiment.

FIG. 11 is a flowchart of an operation performed by a start-up state machine of one embodiment, such as the start-up state machine 126 of FIG. 1. In general FIG. 11 describes techniques for starting, executing, or otherwise managing a state of the EDC system 140 of FIG. 1. As such, FIG. 11 is intended to provide a description of the start-up state machine 126 of FIG. 1, but does not provide an exhaustive or comprehensive description. For example, conventional functions or techniques of a start-up state machine may be performed by the start-up state machine 126 that are not described here in detail. For example, a number of registers and timers, not shown or described explicitly with respect to FIG. 11, may be maintained that may be used to store and control the various states of the EDC system 140. Further, the start-up state machine 126 may implement some or all of the functionality described above with respect to FIGS. 1-10, or comparable functionality, although not all such functionality is necessarily described or referenced with respect to FIG. 11.

In FIG. 11, and generally, the start-up state machine 126 seeks to find optimal settings for the various blocks, including the ADC(s) 120, the equalizer(s) 132, the coarse and fine PGA 132/134, the CID 102, and the timing recovery 105. As such, the start-up state machine 126 may seek to implement a number of known settings, and to select from such settings the appropriate values for obtaining a desired performance of the EDC system 140. Once the desired performance level(s) is reached, then the start-up state machine 126 may be responsible for monitoring this performance level(s) and for re-calibrating or re-starting when necessary to maintain or regain this performance level(s).

Thus, in FIG. 11, in an initial state the PLL 804 may be converged using a default initial value for the dc_offset value (e.g., a value of 1) from the baud rate phase detector 198 (1102). Then the coarse PGA 130 may be allowed to settle (1104), e.g., to settle to a pre-set value that is within an available gain range. A loss of signal (LOS) module (not pictured) may be started (1106), which may be operable to detect a signal loss or absence (e.g., by monitoring the ADC signal relative to reference thresholds).

Next, the dc_offset may be selected (1108) and implemented for three available phase detectors (1110). For example, with reference to FIG. 8, some initial values for dc_offset may be selected, and the baud rate phase detector 198 may be implemented as a dc phase detector, e.g., as one or more of a pre-cursor phase detector, a post-cursor phase detector, and/or a symmetrical phase detector. That is, assumptions about the channel characteristics may be made, and the channel impulse response may be determined accordingly. Then a channel impulse response may be selected that is relatively close to an actual channel impulse response when the timing recovery converges.

In one example, the baud rate phase detector 198 may assume dc_offset values within some range (e.g., –0.5 to 0.5), and may sweep through these values at pre-determined increments. For each incremental value, some or all of the dc phase detectors may be executed, until timing recovery convergence occurs and/or some performance threshold is reached, and/or until all values are exhausted (whereupon an optimal value may be selected). For example, in the dc phase detector relation defined above, certain assumptions about the channel characteristic (e.g., as having pre-cursor, post-cursor, or symmetric ISI) may allow one or more terms to be known or assumed, and the phase signal may be calculated accordingly.

In the example of FIG. 11, the equalizer(s) 132 also may be initialized, somewhat analogously, by selected tap values from available libraries of values (1112). With these selected values in place, the coarse TR 142, the FFEs 124(1)-124(n), and the DFEs 128(1)-128(M) may be turned on and allowed to settle according to a pre-set timer value, and the coarse PGA may be allowed to (re-)settle, as well (1114). These operations (1112, 1114) may be repeated until acceptable tap values are determined, whereupon the fine TR and fine PGA loops may be turned on and allowed to settle (1116).

In FIG. 11, an outer loop may continue with a next value of the dc_offset (1118), or, if a suitable dc_offset has been determined, then channel ID and timing recovery may commence (1120), e.g., as described above with respect to FIG. 10. If the SNR monitor 498 determines that current SNR values are not acceptable during this operation (1122), then the sequence DFE 142 may be turned on (1124) for additional performance gains. In other implementations, the sequence dfe 142 may be continually turned on. If the performance gains are insufficient to maintain the SNR at acceptable levels, then, re-initialization of the dc phase detector(s), equalizers, and other components may occur (1108-1118). Of course, other metrics besides SNR may additionally or alternatively be monitored in order to determine whether to re-initialize. As long as acceptable SNR levels are maintained, the clock and data recovery (CDR) lock may occur (1126) and CID and timing recovery may continue (1120).

Figure 12:
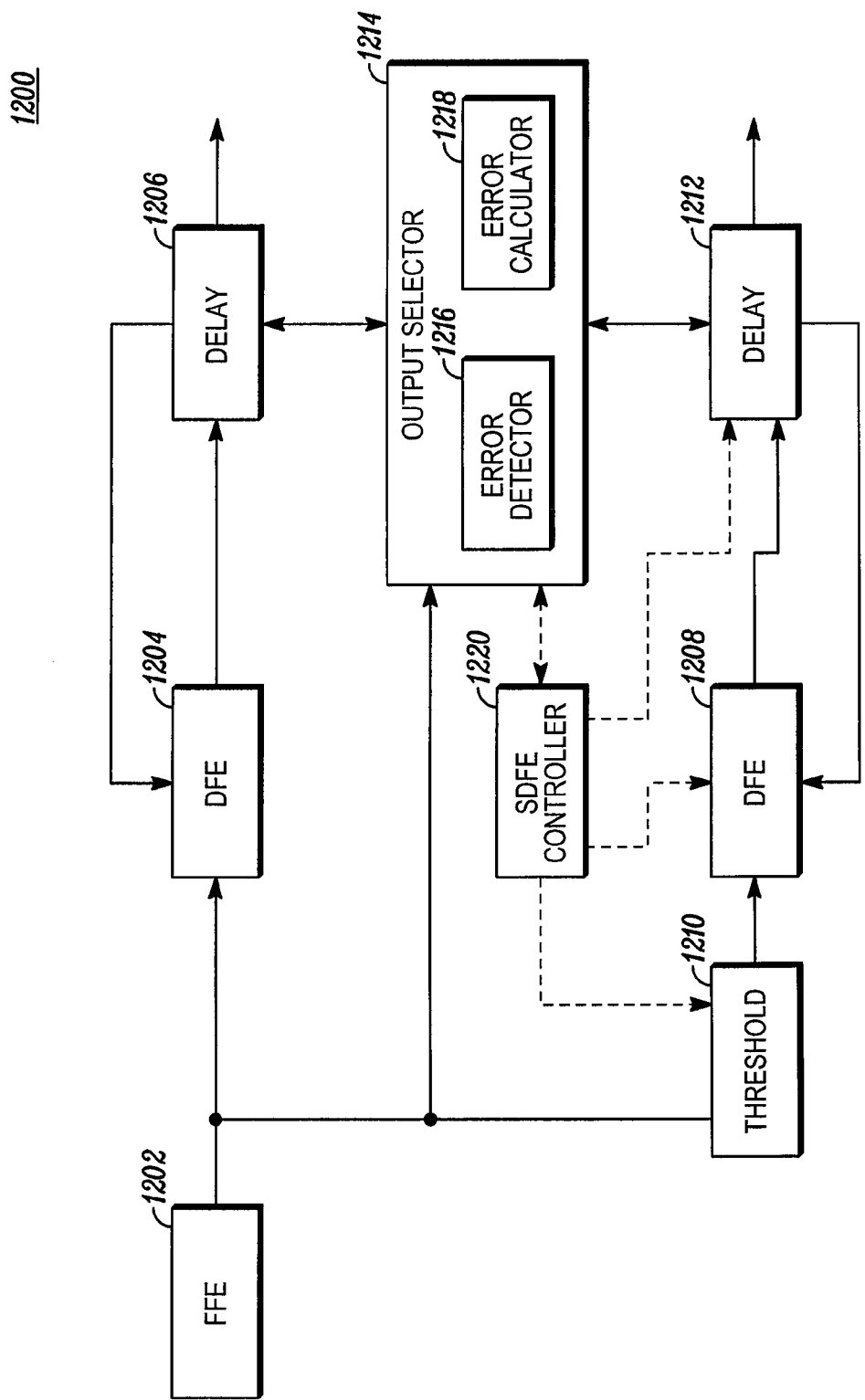
FIG. 12 is a block diagram of a sequence decision feedback equalizer (SDFE) 1200.

FIG. 12 is a block diagram of a sequence decision feedback equalizer (SDFE) 1200. As may be understood from the above discussion of Sequence DFE 142, PDFE 128, PDFE 132 and decision logic block 460 of FIG. 4, the SDFE 1200 generally operates to improve a performance (e.g., reduce an error rate, reduce SNR, or improve some other performance metric) of the EDC system 140, or other system that utilizes one or more decision feedback equalizers.

More particularly, in the example of FIG. 12, an FFE 1202 (similar, for example, to interleaved FFE 424 of FIG. 4), may output a soft value which, as already described, has been equalized or otherwise operated upon to remove pre-cursor ISI. As is known, and as may be appreciated from the above description, such soft values represent values expressed along a continuum between/around otherwise discrete bit values, such as (–2, 0, 2), using, e.g., multiple integer bits and multiple fractional bits to express numbers based within the continuum (e.g., –0.2, or 0.9). The extent to which these soft values vary from the discrete bit values is a function primarily of postcursor interference, presuming that the FFE 1202 has functioned to largely remove precursor interference. Therefore, as described above, and in general in the operation of conventional DFEs, a sum of these soft values with information determined based on previous output values of the DFE (e.g., such information may be based on the DFE coefficients), should remove postcursor interference and result in an expected value (e.g., 1 or –1), from which an original transmitted bit value of 1 or 0 may be determined.

Thus, as shown, a first decision feedback equalizer (DFE) 1204 may receive these soft values and may associate each soft value with either an expected high value or low value (e.g., in association with slicing the soft value to receive the decoded bit of 1 or 0, as just referenced). For example, as referenced above with regard to FIG. 6E, and as described below in the specific implementation of FIG. 15, a summation of the soft value(s) of the FFE output and an appropriate DFE threshold (e.g., f1 or −f2) associated with previously sliced bits may generally have values within a range that is associated with the expected high value and the expected low value. For example, the range may be from approximately −1 to 1.

In theory (e.g., if there were no post-cursor ISI), these sliced bit values would correspond to the originally-transmitted bit values. In practice, however, due (for example) to post-cursor ISI that is still contained within the soft values following the FFE 1202, the actual soft values may not correlate directly with the ideal/expected high or low values. Therefore, as already explained, the first DFE 1204 may operate to reduce post-cursor ISI, for example, by calculating a factor by which to modify a current value of the soft value, based on one or more previous, equalized bit values and/or an error level associated with the bit values. Then, the modified current bit value may be sliced by a slicer (e.g., the slicer 142(1) of FIG. 4, not shown in FIG. 12). As will be appreciated, one or more delay elements 1206 (or similar delay element(s)) may be used to provide the previous, equalized bit values to the DFE for use in modifying the current soft value to reduce post-cursor ISI therein.

In theory, then, the DFE 1204, as already explained above and as already known for conventional DFEs) may output equalized values having post-cursor ISI reduced or eliminated, for use, e.g., in the EDC system 140. In practice, however, the DFE 1204 may not be sufficiently accurate to maintain a desired performance level in performing equalization. In particular, due to the nature of a DFE, a small number of erroneously-sliced values may lead to a burst of errors, because the DFE 1204 operates based on previous values.

For example, it may occur that a soft value output by the FFE 1202 is very close to a mid-way point at which slice decisions are difficult to make. For example, and with reference again to FIGS. 6E and 15, if the high value/low value of a given slicer is +1 or −1, it may occur that a current bit value output by the summation of the soft value output from the FFE 1202 and an appropriate DFE threshold associated with previously sliced bits is 0.05 or −0.1, e.g., the value is so close to the mid-point (here, zero) that a likelihood of error in the sliced decision is increased. Such bit values may be referenced herein as indeterminate soft values, e.g., which exist within an uncertainty range defined relative to the high value and low value. For example, if an originally-transmitted bit value were 1, but due to ISI in the channel the slicer input corresponding to the summation of the soft FFE output and an appropriate DFE threshold associated with previously sliced bits is −0.2, then the DFE (slicer) may have an output of −1 (i.e., may slice the −0.2 to −1), which would not correspond to the originally-transmitted bit.

Therefore, in FIG. 12, and as referenced above, e.g., with respect to FIG. 4, a second DFE 1208 may be included in parallel with the first DFE 1204. The second DFE 1208 may operate on the soft values of the bit stream output by the FFE 1202, but adjusted for a threshold 1210, also referred to herein as the sequence dfe threshold 1210 or as "Δ.". In this way, the indeterminate soft values referenced above, i.e., which include indeterminate bit values within an uncertainty range within a range associated with the high value and low value, may be sliced oppositely to corresponding values of the first DFE 1204, with respect to the same (indeterminate) bit value.

Figure 13:
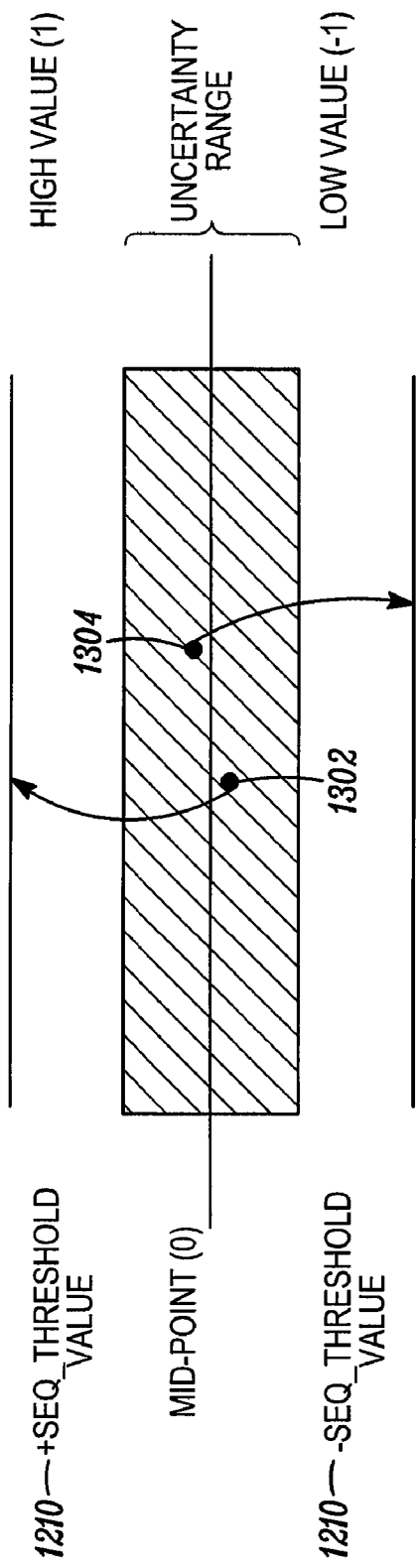
FIG. 13 is a block diagram illustrating an uncertainty range used by the SDFE of FIG. 12.

FIG. 13 provides an example of this effect. Specifically, as shown, the DFE 1208 may receive a summation of a soft value output by the FFE 1202 and a corresponding DFE threshold value(s), relative to a high value of 1 and a low value of −1, and may perform equalization on the received bit values followed by (or in association with) a slicing on the result to obtain equalized bit values. For example, a first bit value 1302 may be approximately −0.1, but, due to the threshold value 1210 and the inverse (here, negative) threshold value 1210, the bit value 1302 (which would normally be sliced to −1 due to being below the mid-point zero), may be sliced to 1. Similarly, the bit value 1304 may be 0.1, but if the bit value 1304 is within the uncertainty range, e.g., if the threshold adjustment value is approximately ±0.2 or approximately ±0.25, then the bit value may be sliced to the low value of −1.

Thus, the net effect of the second DFE 1208 and the threshold 1210 is that an output of the second DFE will be different from that output by the first DFE 1204, when the bit value falls within the uncertainty range. E.g., if the bit value 1302 of FIG. 13 is of −0.1, then the first DFE 1204 (and associated slicer, not shown in FIG. 12) may output a sliced value of −1, wherein the second DFE, due to the threshold 1210, may output a sliced value of 1. As will be appreciated by symmetry between the two DFEs and associated circuitry, a delay 1212 may be included to, among other functions, provide previous equalized bit values to the second DFE 1208.

Further in FIG. 12, it may be appreciated that an output selector 1214 may be configured to select either the first equalized bit stream from the first DFE 1204 or the second equalized bit stream, based on a relative error there between. That is, the output selector 1214 may select either the first equalized bit stream or the second equalized bit stream, based on which of the two has a lower error relative to the other.

For example, during normal operation, the first DFE 1204 may execute to output the first equalized bit stream. By not activating the second DFE 1208 or other components, power can be saved. However, if increased accuracy is needed, then a controller (SDFE controller 1220) may be configured to activate the second DFE 1208, the delay 1212, and some or all of the output selector 1214. For example, the output selector 1214 may include an error detector 1216 and an error calculator 1218. The error detector 1216 may determine a likelihood as to whether the first equalized bit stream of the first DFE 1204 contains sufficient errors to activate at least the second DFE 1208 and the secondary delay 1212. Then, the error calculator 1218 may be configured to collect the previous "N" values of the delay elements 1206, 1212, and to process these values together using the output bit stream of the FFE 1202 (where "N," for example, may equal 8). Based on the results of the error calculator 1218, the output selector 1214 may select which of the data paths is more accurate, and then output the resulting bit stream.

Figure 14:
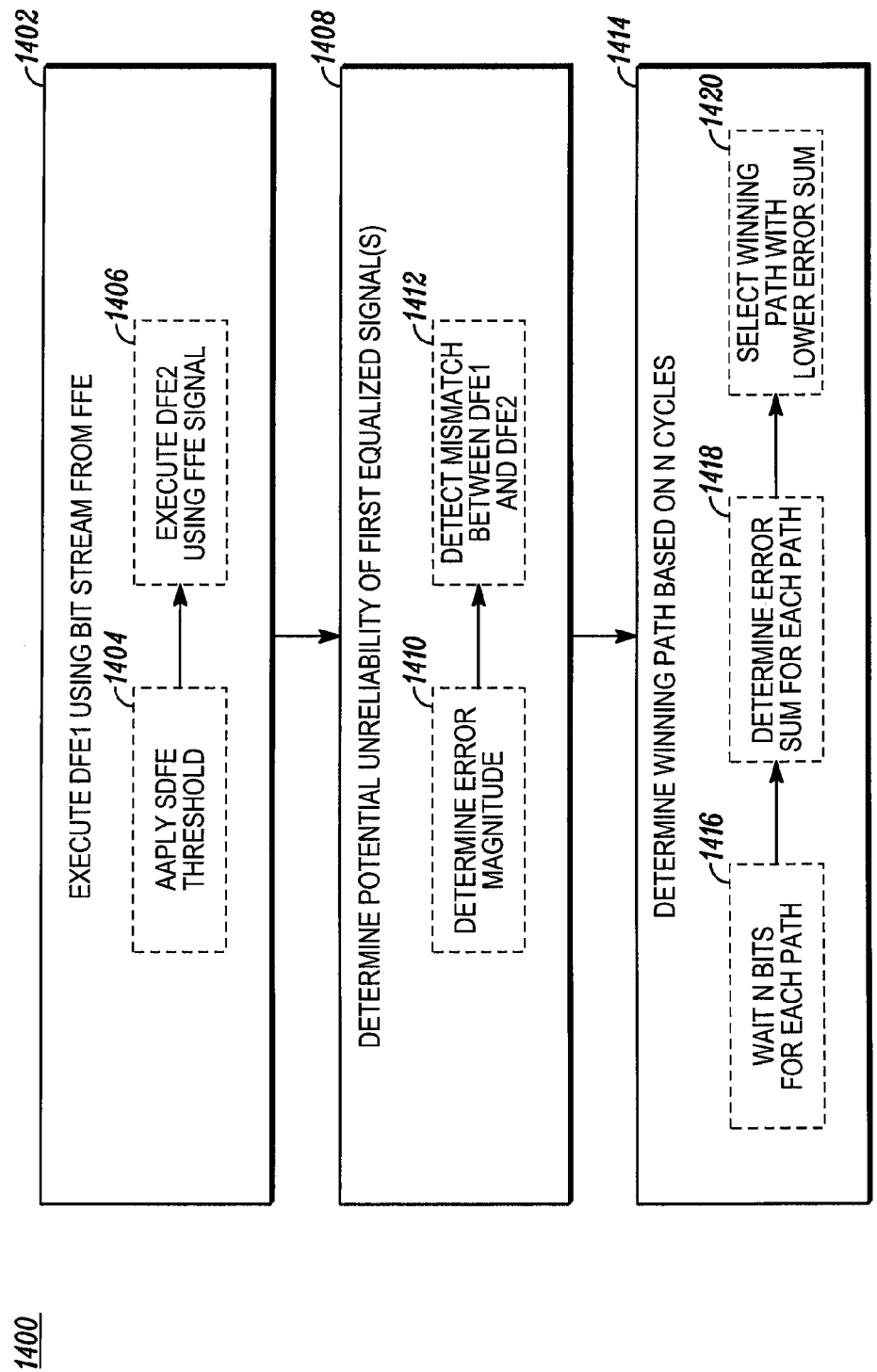
FIG. 14 is a flowchart illustrating operations of the SDFE of FIG. 12.

FIG. 14 is a flowchart 1400 illustrating operations of the SDFE 1200 of FIG. 12. In FIG. 14, DFE1 1204 is executed using bit values from the FFE 1202 (1402). In some implementations, as referenced above, the first DFE 1204 may initially or periodically execute by itself, without the concurrent execution of the second DFE 1208, in order to save power as long as the first DFE 1204 outputs satisfactory results. In other implementations, the SDFE threshold 1210 may be applied (1404) and the second DFE 1208 executed (1406) in conjunction with the first DFE 1204, and both DFEs 1204/1208 may operate together so that the output selector 1214 may select the less error-prone of the two paths at any given time. The SDFE threshold 1210 may be applied in a number of manners, a specific example of which is shown below with respect to FIG. 15. But in general, a sequence DFE threshold adjuster may be included with the FFE 1202 and/or the DFE 1208. In a case where the high/low values are 1/−1, then the sequence DFE threshold adjuster may act to invert a sign of indeterminate bit values within the uncertainty region. In other implementations, the slicer may be set to slice all values between the midpoint and the positive SDFE threshold 1210 to the low value, and to slice all values between the midpoint and the negative SDFE threshold 1210 to the high value (or similarly for schemes that are not symmetrical around zero). Other techniques also may be used.

Figure 15:
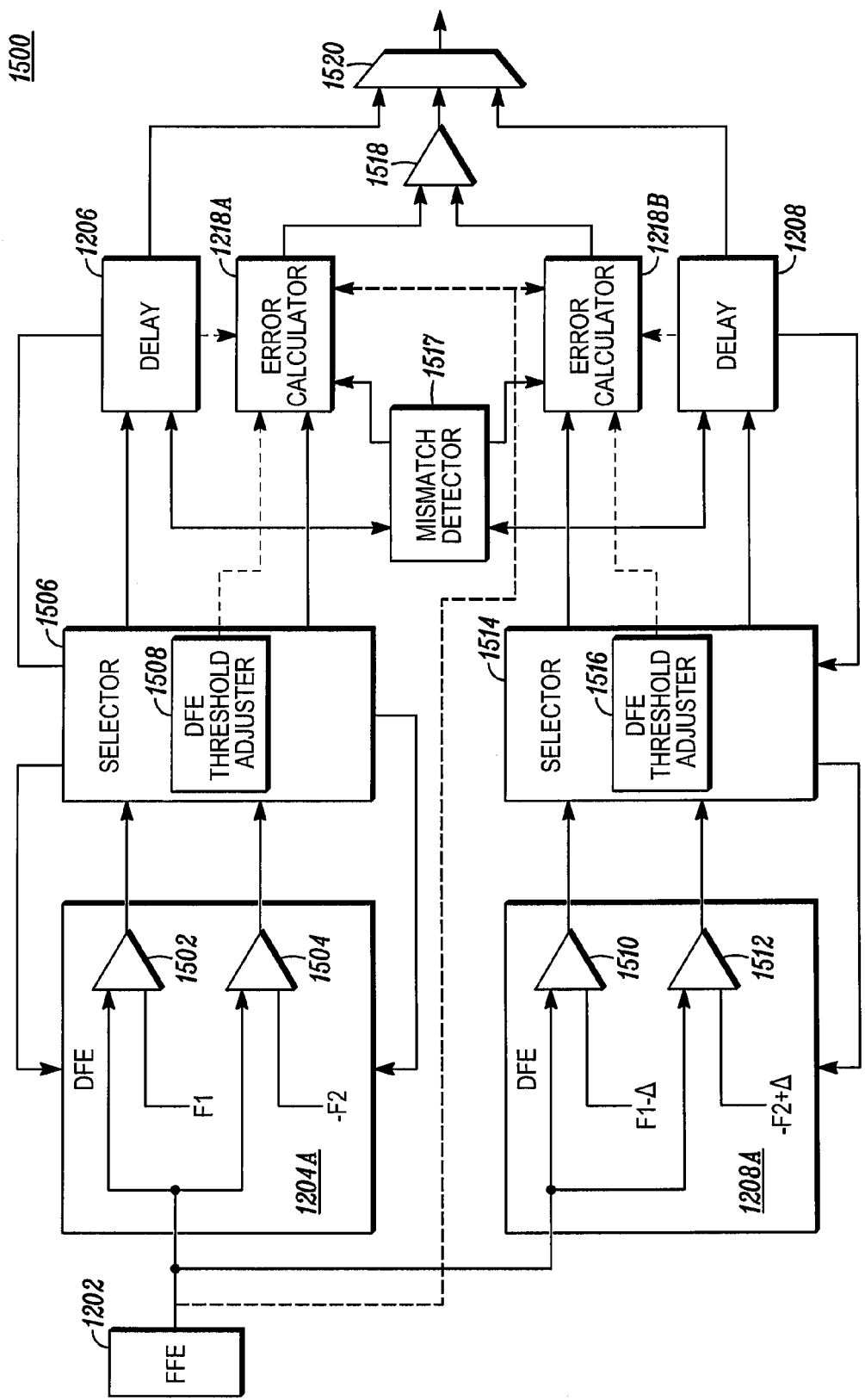
FIG. 15 is a block diagram of an example implementation of the SDFE of FIG. 12.

Whether the two DFEs 1204/208 are operating concurrently or not, action may be taken to determine a potential unreliability of the first equalized signal, e.g., from the first DFE 1204 (1408). This may occur in a number of ways. For example, the error detector 1216 and/or the error calculator 1218 (which in some embodiments may be the same component) may periodically measure the output of the DFE 1204 or the delay 1206 relative to the bit stream from the FFE 1202, in order to determine a potential error or unreliability of the DFE 1204 (1410). The error of the DFE 1204 also may be determined relative to the SDFE threshold 1210. In other implementations, the error detector 1216 may include a mismatch detector that detects that an output of the first DFE 1204 is different from the output of the second DFE 1208 (e.g., the first DFE 1204 outputs "1" while the second DFE outputs "−1") (1412). In this case, the assumption may be made that such a condition is only likely to exist when the SDFE threshold has been met (i.e., an indeterminate bit value is occurring within the uncertainty range, as shown in FIG. 13 for indeterminate bit values 1302, 1304). In the examples of FIGS. 6E and 15, as referenced herein, error may be based on an extent to which a summation of the soft value output by the FFE and the DFE threshold associated with a previously-selected bit varies from the high value or the low value.

Once both DFEs 1204, 1208 are executing and the need for increased accuracy is determined, then the output selector 1214 may act to determine a winning path between the first DFE path and the second DFE path, over some pre-determined number "N" cyles (1414). This operation may include waiting N bits for each path (1416), e.g., collecting N bits in each of the delay elements 1206, 1210. Then, for the N bits, the error calculator 1218 may determine an error sum for each, using, e.g., the bit stream from the FFE 1202 (1418). Here again, the error for each bit may be based on the summation of the soft value output by the FFE 1202 and a corresponding DFE threshold associated with a previously selected bit(s). Finally, the output selector 1218 may select the winning path (i.e., the path determined to be more reliable or less error-prone) by selecting the path with the lower error sum (1420).

Of course, the above description is merely for illustration and example, and is not intended to be limiting. For example, other error metrics may be used, such as squared error, absolute value of error, or other error metrics.

Once a path decision has been made, the corresponding DFE output may be selected as the output bit stream. Further, the bit values from the wining delay element may be transferred to the losing delay element, so that these bit values may be used by the losing DFE in deciding current bit values. That is, as referenced above, DFE errors may be self-replicating to some extent, since current bit values are decided on previous bit values. By clearing erroneous bit values from the losing delay element and using the more accurate bit values of the winning delay element, then the sequence DFE 1200 increases the chance that the losing DFE will begin to output more accurate decisions.

FIG. 15 is a block diagram 1500 of an example implementation of the SDFE 1200 of FIG. 12. In particular, the example DFE 1500 includes the DFEs 1204 and 1208 as non-linear, unrolled DFEs 1204a and 1208a. The structure and operation of non-linear, unrolled DFEs are described above with respect to FIG. 6E. Consequently, it will be appreciated that the DFE 1204a may include comparators 1502 and 1504, each associated, respectively, with a DFE threshold f1 and −f2. A selector 1506 may be used to select between the outputs of these two comparators 1502, 1504, based on one or more previous bits of the DFE 1204a (as reported to the selector 1506 from the delay 1206). A DFE threshold adjuster 1508 may be configured to dynamically adjust the DFE thresholds f1, −f2, as described above.

The DFE 1208a operates similarly, except that the SDFE threshold 1210, shown in FIG. 15 as "Δ," is subtracted/added to the DFE thresholds to obtain f1−Δ, −f2+Δ. The DFE 1208a has an output of comparators 1510, 1512 selected by the selector 1514, and, as just referenced, the selector 1514 may include a DFE threshold adjuster 1516 configured to adjust f1, −f2. Although FIG. 15 illustrates two separate DFE threshold adjusters 1506, 1516, it will be appreciated that in fact a single DFE threshold adjuster may be used.

In operation, the DFE 1204a outputs equalized bit values from the delay 1206, as may be appreciated from the above description. A mismatch detector 1517 (as an example of the error detector 1216) may be used to determine that an output of the DFE 1204a is different from an output of the DFE 1208a, and may therefore activate the error calculators 1218a, 1218b.

As described, each error calculator 1218a, 1218b may determine an error sum (or other error metric) associated with the equalized bit values contained in each delay element 1206, 1208. Based on these two error measurements, the error calculators 1218a, 1218b may output a decision using comparator 1518, which provides a signal indicating either the delay element 1206 or the delay element 1208 to a multiplexer 1520. Consequently, the multiplexer 1520 may select either the top or bottom path as the winning (i.e., more accurate) path. Then, as referenced above, the equalized bit values in the winning delay element may be stored in the losing delay element, so that the losing DFE may thereafter may decide on subsequent bit values with more accuracy.

As referenced above, the DFE 1208a operates to invert a value (high to low or low to high) whenever the summation of a soft value from the FFE 1202 and a DFE threshold associated with the previously-selected bit results an indeterminate soft value (such as the values 1302, 1304 of FIG. 13). For example, as referenced above, the DFE thresholds f1 and −f2 may be updated using an LMS algorithm that adapts each threshold based on a previously selected bit. In the context of FIG. 15 and the DFE 1208a, the result is that the size of a noise event required to trigger a possible error is reduced, e.g., from a value of 1 to a value of 1−Δ (e.g., 1−0.25 or 0.75). Thus, as described above with respect to FIG. 13, values which are indeterminate may be sliced oppositely than the same values are sliced in the DFE 1204a.

Although the above discussion provides an example(s) of the operations of the SDFEs 1200, 1500, it may be appreciated that other example techniques may be used. For example, in FIG. 15, the SDFE controller 1220 (not shown in FIG. 15) may activate the DFE 1208a, selector 1514, error calculator 1218b, and delay 1208, in response to a determination that the value abs(+/31 1−(ffe+dfe_threshold)>=(1−SDFEL_threshold), where again the dfe threshold refers to the particular dfe threshold (e.g., f1 or −f2) that was used in the selection of the previously-selected bit(s). Other implementations would also be apparent. For example, counting mismatches between the DFEs 1204a, 1208a, may provide a proxy for the actual BER in a system. This parameter can be used to optimize various system parameters instead of, for example, SNR (e.g., as described above with regard to the SNR monitor 498). For example, the use of a parameter related to actual BER can improve the system performance when the noise is not guassian.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A decision feedback equalizer (DFE) comprising:
a first comparator configured to receive as inputs a soft value and a first threshold;
a second comparator configured to receive as inputs the soft value and a second threshold;
a selector configured to select an output of either the first comparator or the second comparator as a DFE output based on one or more previous bits output by the selector;
an error calculator configured to determine an error for the first comparator and the second comparator; and
a threshold adjuster configured to adjust the first threshold and the second threshold, the first threshold and the second threshold each being a non-linear combination of one or more previous outputs of the selector.

2. The decision feedback equalizer of claim 1 wherein the soft value is based upon an FFE output and one of the thresholds that was used to output a previous bit.

3. The decision feedback equalizer of claim 1 wherein the error calculator comprises an error calculator configured to determine an error for either the first comparator or the second comparator based on a current selected bit y(n), an FFE output, and the threshold used for the current bit, where the error may be represented as error=y[n]−ffe[n]−dfe[n].

4. The decision feedback equalizer of claim 1 wherein the threshold adjuster is configured to independently adjust the first threshold and the second threshold.

5. The decision feedback equalizer of claim 1 wherein the threshold adjuster comprises a threshold adjuster configured to independently adjust the first threshold and the second threshold based on a previous value of a same threshold and an error associated with a corresponding comparator.

6. The decision feedback equalizer of claim 1 further comprising a delay element configured to output a delayed or previous output of the selector.

7. The decision feedback equalizer of claim 1 wherein the decision feedback equalizer comprises an unrolled, non-linear DFE provided in a parallel DFE circuit.

8. An apparatus comprising:
a first parallel decision feedback equalizer (DFE) having a first plurality of DFE inputs and a first plurality of DFE outputs; and
a second parallel decision feedback equalizer (DFE) having second a plurality of DFE inputs and a second plurality of DFE outputs,
wherein the first parallel decision feedback equalizer and the second decision feedback equalizer each include a plurality of DFE blocks, each of the DFE blocks including:
a first comparator configured to receive as inputs a soft value and a first threshold;
a second comparator configured to receive as inputs the soft value and a second threshold;
a selector configured to select an output of either the first comparator or the second comparator as a DFE output based on one or more previous bits output by the selector;
an error calculator configured to determine an error for the first comparator and the second comparator; and
a threshold adjuster configured to independently adjust the first threshold and the second threshold, the first threshold and the second threshold each being a non-linear combination of one or more previous outputs of the selector.

9. An apparatus comprising:
a first parallel decision feedback equalizer (DFE); and
a second parallel decision feedback equalizer (DFE);
wherein the first parallel DFE and the second parallel DFE each include one or more unrolled DFE blocks, each unrolled DFE block including:
a plurality of comparators, each comparator being configured to receive one of a plurality of DFE thresholds; and
a DFE threshold adjuster configured to independently adapt the plurality of DFE thresholds, each threshold being a non-linear combination of one or more previous outputs of its corresponding DFE block.

10. The apparatus of claim 9 wherein each unrolled DFE block further includes:

a first comparator configured to receive as inputs a soft value and a first threshold;

a second comparator configured to receive as inputs the soft value and a second threshold;

a selector configured to select an output of either the first comparator or the second comparator as a DFE output based on one or more previous bits output by the selector;

an error calculator configured to determine an error for the first comparator and the second comparator; and a threshold adjuster configured to independently adjust the first threshold and the second threshold, the first threshold and the second threshold each being a non-linear combination of one or more previous outputs of the selector.

11. The apparatus of claim 9 further comprising a parallel feed forward equalizer (FFE) coupled to both the first and second parallel DFEs.

12. The apparatus of claim 9 further comprising a parallel feed forward equalizer (FFE) coupled to both the first and second parallel DFEs, the FFE including a plurality of taps, one or more of the taps being configured to be disabled.

* * * * *